(12) United States Patent
Ross et al.

(10) Patent No.: US 9,114,449 B2
(45) Date of Patent: Aug. 25, 2015

(54) MODULAR NUT PLATES WITH CLOSED NUT ASSEMBLIES

(75) Inventors: James Ryunoshin Ross, Seattle, WA (US); Timothy Howard Johnson, Seattle, WA (US); Scott Harlow Gulick, Seattle, WA (US)

(73) Assignee: Fatigue Technology, Inc., Seattle, WA (US)

(*) Notice: Subject to any disclaimer, the term of this patent is extended or adjusted under 35 U.S.C. 154(b) by 275 days.

(21) Appl. No.: 13/523,641

(22) Filed: Jun. 14, 2012

(65) Prior Publication Data

US 2012/0317787 A1  Dec. 20, 2012

Related U.S. Application Data

(60) Provisional application No. 61/497,473, filed on Jun. 15, 2011.

(51) Int. Cl.
| | | |
|---|---|---|
| F16B 39/28 | (2006.01) | |
| B21D 39/04 | (2006.01) | |
| F16B 37/04 | (2006.01) | |
| F16B 17/00 | (2006.01) | |

(52) U.S. Cl.
CPC .............. B21D 39/04 (2013.01); F16B 37/043 (2013.01); F16B 37/044 (2013.01); *F16B 17/006* (2013.01); *Y10T 29/49938* (2015.01)

(58) Field of Classification Search
CPC ...... B23P 9/025; F16B 37/062; F16B 37/044; Y10T 29/4994
USPC .................................................. 411/111–113
See application file for complete search history.

(56) References Cited

U.S. PATENT DOCUMENTS

| | | | |
|---|---|---|---|
| 295,593 | A | 3/1884 | Thayer |
| 810,430 | A | 1/1906 | Pfluger et al. |
| 1,081,496 | A | 12/1913 | Gillmor |
| 1,106,964 | A | 8/1914 | Pahler |
| 1,226,090 | A | 5/1917 | Ludlum |

(Continued)

FOREIGN PATENT DOCUMENTS

| | | |
|---|---|---|
| AU | 2007204888 B2 | 7/2007 |
| BR | PI0706509-4 A2 | 3/2011 |

(Continued)

OTHER PUBLICATIONS

Merriam Webster's Collegiate Dictionary, Tenth Edition, 1997, p. 154.

(Continued)

*Primary Examiner* — Gary Estremsky
(74) *Attorney, Agent, or Firm* — Seed IP Law Group PLLC

(57) ABSTRACT

A nut plate assembly includes a nut retainer and a bushing for expanding a tubular body of the retainer. The retainer assembly is used to cold work an opening of a workpiece in order to fix the nut retainer assembly relative to the workpiece. A nut can be snapped into the retainer. A method of installation includes passing a mandrel through the bushing to radially expand the bushing into a tubular body of the retainer. The tubular body is compressed between the workpiece and bushing as the bushing is displaced radially causing corresponding radial displacement of the tubular body. The expanded bushing applies pressure to the tubular body for a desired fit between the nut retainer and workpiece.

19 Claims, 46 Drawing Sheets

(56) References Cited

U.S. PATENT DOCUMENTS

| | | |
|---|---|---|
| 1,297,142 A | 3/1919 | Gibbons |
| 1,480,298 A | 1/1924 | Pearson |
| 1,881,867 A | 10/1932 | Nelson |
| 1,979,686 A | 11/1934 | Hall et al. |
| 2,092,358 A | 9/1937 | Robertson |
| 2,146,461 A | 2/1939 | Bettington |
| 2,150,361 A | 3/1939 | Chobert |
| 2,188,596 A | 1/1940 | Hobert |
| 2,275,451 A | 3/1942 | Maxwell |
| 2,282,711 A | 5/1942 | Eklund |
| 2,357,123 A | 8/1944 | Maxwell |
| 2,385,294 A | 9/1945 | Lowy |
| 2,405,399 A | 8/1946 | Bugg et al. |
| 2,430,554 A | 11/1947 | Bugg et al. |
| 2,433,425 A | 12/1947 | Burckle |
| 2,468,985 A | 5/1949 | Krotz |
| 2,501,567 A | 3/1950 | Huck |
| 2,528,180 A | 10/1950 | Roehl |
| 2,538,623 A | 1/1951 | Keating |
| 2,583,719 A | 1/1952 | White |
| 2,608,751 A | 9/1952 | Hutton |
| 2,661,182 A | 12/1953 | Kipp |
| 2,672,175 A | 3/1954 | Howard |
| 2,695,446 A | 11/1954 | Meyer |
| 2,700,172 A | 1/1955 | Rohe |
| 2,808,643 A | 10/1957 | Weatherhead, Jr. |
| 2,887,003 A | 5/1959 | Brilmyer |
| 2,943,667 A | 7/1960 | Ewing et al. |
| 3,107,572 A | 10/1963 | Orloff |
| 3,128,999 A | 4/1964 | Schmitt |
| 3,129,630 A | 4/1964 | Wing et al. |
| 3,137,887 A | 6/1964 | Mannino et al. |
| 3,149,860 A | 9/1964 | Hallesy |
| 3,164,054 A | 1/1965 | Biesecker |
| 3,222,977 A | 12/1965 | Vaughn |
| 3,244,034 A | 4/1966 | Severdia |
| 3,252,493 A | 5/1966 | Smith |
| 3,262,353 A | 7/1966 | Waeltz et al. |
| 3,290,770 A | 12/1966 | Silverman et al. |
| 3,345,730 A | 10/1967 | Laverty |
| 3,358,492 A | 12/1967 | Richter |
| 3,377,907 A | 4/1968 | Hurd |
| 3,399,435 A | 9/1968 | Ackerman |
| 3,434,746 A | 3/1969 | Watts |
| 3,443,474 A | 5/1969 | Blakeley et al. |
| 3,498,648 A | 3/1970 | Hallesy |
| 3,537,163 A | 11/1970 | Steidl |
| 3,566,662 A | 3/1971 | Champoux |
| 3,578,367 A | 5/1971 | Harvill et al. |
| 3,596,948 A | 8/1971 | Spoehr |
| 3,601,771 A | 8/1971 | Dozier |
| 3,643,544 A | 2/1972 | Massa |
| 3,646,982 A | 3/1972 | Cushman |
| 3,657,956 A | 4/1972 | Bradley et al. |
| 3,674,292 A | 7/1972 | Demler, Sr. |
| 3,677,684 A | 7/1972 | Platz |
| 3,678,535 A | 7/1972 | Charles |
| 3,693,247 A | 9/1972 | Brown |
| 3,695,324 A | 10/1972 | Gulistan |
| 3,763,541 A | 10/1973 | Jaffe |
| 3,765,078 A | 10/1973 | Gulistan |
| 3,778,090 A | 12/1973 | Tobin |
| 3,787,945 A | 1/1974 | Pasek et al. |
| 3,820,297 A | 6/1974 | Hurd |
| 3,835,525 A | 9/1974 | King, Jr. |
| 3,835,688 A | 9/1974 | King, Jr. |
| 3,837,208 A | 9/1974 | Davis et al. |
| 3,875,649 A | 4/1975 | King, Jr. |
| 3,878,760 A | 4/1975 | Jeal et al. |
| 3,879,980 A | 4/1975 | King, Jr. |
| 3,892,121 A | 7/1975 | Champoux et al. |
| 3,895,409 A | 7/1975 | Kwatonowski |
| 3,915,052 A | 10/1975 | Ruhl |
| 3,934,325 A | 1/1976 | Jaffe |
| 3,943,748 A | 3/1976 | King, Jr. |
| 3,949,535 A | 4/1976 | King, Jr. |
| 3,997,193 A | 12/1976 | Tsuda et al. |
| 4,003,288 A | 1/1977 | Jeal |
| 4,010,519 A | 3/1977 | Worthing |
| 4,044,591 A | 8/1977 | Powderley |
| 4,089,247 A | 5/1978 | Dahl et al. |
| 4,142,439 A | 3/1979 | Landt |
| 4,143,580 A | 3/1979 | Luhm |
| 4,157,675 A | 6/1979 | King, Jr. |
| 4,164,807 A | 8/1979 | King, Jr. |
| 4,168,650 A | 9/1979 | Dahl et al. |
| 4,186,787 A | 2/1980 | Husain |
| 4,187,708 A | 2/1980 | Champoux |
| 4,230,017 A | 10/1980 | Angelosanto |
| 4,237,768 A | 12/1980 | Volkmann |
| 4,249,786 A | 2/1981 | Mahoff |
| 4,295,691 A | 10/1981 | Rubenthaler |
| 4,295,766 A * | 10/1981 | Shaw .......................... 411/113 |
| 4,355,612 A | 10/1982 | Luksch |
| 4,364,697 A | 12/1982 | Binns |
| 4,370,081 A | 1/1983 | Briles |
| 4,371,154 A | 2/1983 | Winbigler |
| 4,386,515 A | 6/1983 | Starke |
| 4,397,061 A | 8/1983 | Kanzaka |
| 4,405,256 A | 9/1983 | King, Jr. |
| 4,423,619 A | 1/1984 | Champoux |
| 4,425,780 A | 1/1984 | Champoux |
| 4,447,944 A | 5/1984 | Mohrman |
| 4,457,652 A | 7/1984 | Pratt |
| 4,471,643 A | 9/1984 | Champoux et al. |
| 4,482,089 A | 11/1984 | Lindahl et al. |
| 4,491,358 A | 1/1985 | Choung |
| 4,494,398 A | 1/1985 | Svoboda |
| 4,522,378 A | 6/1985 | Nelson |
| 4,524,600 A | 6/1985 | Champoux et al. |
| 4,530,527 A | 7/1985 | Holmberg |
| 4,557,033 A | 12/1985 | Champoux |
| 4,557,650 A | 12/1985 | Molina |
| 4,579,491 A | 4/1986 | Kull |
| 4,583,388 A | 4/1986 | Hogenhout |
| 4,595,324 A | 6/1986 | Sadri |
| 4,597,282 A | 7/1986 | Hogenhout |
| 4,609,315 A | 9/1986 | Briles |
| 4,627,775 A | 12/1986 | Dixon |
| 4,640,479 A | 2/1987 | Shely et al. |
| 4,659,271 A | 4/1987 | Pratt et al. |
| 4,659,272 A | 4/1987 | Pratt |
| 4,665,732 A | 5/1987 | Hogenhout |
| 4,678,384 A | 7/1987 | Sparling et al. |
| 4,699,212 A | 10/1987 | Andersson et al. |
| 4,699,552 A | 10/1987 | Jeal |
| 4,702,655 A | 10/1987 | Kendall |
| 4,732,518 A | 3/1988 | Toosky |
| 4,752,169 A | 6/1988 | Pratt |
| 4,755,904 A | 7/1988 | Brick |
| 4,759,237 A | 7/1988 | Fauchet et al. |
| 4,787,793 A | 11/1988 | Harris |
| 4,809,420 A | 3/1989 | Landy et al. |
| 4,832,548 A | 5/1989 | Strobel |
| 4,869,091 A | 9/1989 | Shemeta |
| 4,872,332 A | 10/1989 | Potzas |
| 4,877,363 A | 10/1989 | Williamson et al. |
| 4,885,829 A | 12/1989 | Landy |
| 4,900,205 A | 2/1990 | Sadri |
| 4,905,766 A | 3/1990 | Dietz et al. |
| 4,934,038 A | 6/1990 | Caudill |
| 4,934,170 A | 6/1990 | Easterbrook et al. |
| 4,950,115 A | 8/1990 | Sadri |
| 4,967,463 A | 11/1990 | Pratt |
| 4,985,979 A | 1/1991 | Speakman |
| 4,999,896 A | 3/1991 | Mangus et al. |
| 5,025,128 A | 6/1991 | Derbyshire |
| 5,038,596 A | 8/1991 | Noonan et al. |
| 5,066,179 A | 11/1991 | Pratt |
| 5,083,363 A | 1/1992 | Ransom et al. |
| 5,093,957 A | 3/1992 | Do |
| 5,096,349 A | 3/1992 | Landy et al. |
| 5,103,548 A | 4/1992 | Reid et al. |
| 5,110,163 A | 5/1992 | Benson et al. |

(56) References Cited

U.S. PATENT DOCUMENTS

| | | |
|---|---|---|
| 5,123,792 A | 6/1992 | Strobel |
| 5,127,254 A | 7/1992 | Copple et al. |
| 5,129,253 A | 7/1992 | Austin et al. |
| 5,178,502 A | 1/1993 | Sadri |
| 5,207,461 A | 5/1993 | Lasko |
| 5,213,460 A | 5/1993 | Sadri et al. |
| 5,218,854 A | 6/1993 | Jarzebowicz et al. |
| 5,238,342 A | 8/1993 | Stencel |
| 5,245,743 A | 9/1993 | Landy et al. |
| 5,253,773 A | 10/1993 | Choma et al. |
| 5,256,017 A | 10/1993 | Smirnov et al. |
| 5,305,627 A | 4/1994 | Quincey et al. |
| 5,341,559 A | 8/1994 | Reid et al. |
| 5,350,266 A | 9/1994 | Espey et al. |
| 5,380,111 A | 1/1995 | Westrom |
| 5,380,136 A | 1/1995 | Copple et al. |
| 5,390,808 A | 2/1995 | Choma et al. |
| 5,399,052 A | 3/1995 | Volkmann et al. |
| 5,405,228 A | 4/1995 | Reid et al. |
| 5,433,100 A | 7/1995 | Easterbrook et al. |
| 5,466,016 A | 11/1995 | Briody et al. |
| 5,468,104 A * | 11/1995 | Reid et al. ............... 411/113 |
| 5,478,122 A | 12/1995 | Seabra |
| 5,496,140 A | 3/1996 | Gossmann et al. |
| 5,498,110 A | 3/1996 | Stencel et al. |
| 5,607,194 A | 3/1997 | Ridenour |
| 5,609,434 A | 3/1997 | Yehezkieli et al. |
| 5,632,582 A | 5/1997 | Gauron |
| 5,634,751 A | 6/1997 | Stencel et al. |
| 5,666,710 A | 9/1997 | Weber et al. |
| 5,702,215 A | 12/1997 | Li |
| 5,713,611 A | 2/1998 | Kurimoto et al. |
| 5,722,312 A | 3/1998 | Kristensen |
| 5,806,173 A | 9/1998 | Honma et al. |
| 5,813,808 A | 9/1998 | Wu |
| 5,816,761 A | 10/1998 | Cassatt et al. |
| 5,860,213 A | 1/1999 | Knudson |
| 5,885,318 A | 3/1999 | Shimizu et al. |
| 5,943,898 A | 8/1999 | Kuo |
| 5,947,326 A | 9/1999 | O'Hern et al. |
| 5,947,667 A | 9/1999 | Cassatt et al. |
| 6,036,418 A | 3/2000 | Stencel et al. |
| 6,058,562 A | 5/2000 | Satou et al. |
| 6,077,009 A | 6/2000 | Hazelman |
| 6,077,010 A | 6/2000 | Reid et al. |
| 6,131,964 A | 10/2000 | Sareshwala |
| 6,183,180 B1 * | 2/2001 | Copple et al. ............ 411/107 |
| 6,217,082 B1 | 4/2001 | Orcutt et al. |
| 6,266,991 B1 | 7/2001 | Kuo |
| 6,289,577 B1 | 9/2001 | Tanaka et al. |
| 6,325,582 B1 | 12/2001 | Sadri et al. |
| 6,328,513 B1 | 12/2001 | Niwa et al. |
| 6,347,663 B1 | 2/2002 | Hunzinger et al. |
| 6,487,767 B1 | 12/2002 | Reid et al. |
| 6,488,460 B1 | 12/2002 | Smith et al. |
| 6,499,926 B2 | 12/2002 | Keener |
| 6,537,005 B1 | 3/2003 | Denham |
| 6,623,048 B2 | 9/2003 | Castel et al. |
| 6,651,301 B1 | 11/2003 | Liu |
| 6,705,149 B2 | 3/2004 | Cobzaru et al. |
| 6,761,380 B2 | 7/2004 | Pachciarz et al. |
| 6,773,039 B2 | 8/2004 | Muenster et al. |
| 6,792,657 B2 | 9/2004 | Reid et al. |
| 6,796,765 B2 | 9/2004 | Kosel et al. |
| 6,826,820 B2 | 12/2004 | Denham et al. |
| RE38,788 E | 9/2005 | Satou et al. |
| 6,990,722 B2 | 1/2006 | Reid et al. |
| 7,024,908 B2 | 4/2006 | Poast et al. |
| 7,024,909 B2 | 4/2006 | Cobzaru et al. |
| 7,047,596 B2 | 5/2006 | Sucic et al. |
| 7,059,816 B2 | 6/2006 | Toosky |
| 7,100,264 B2 | 9/2006 | Skinner et al. |
| 7,127,792 B2 | 10/2006 | Wakamori et al. |
| 7,156,051 B2 | 1/2007 | Lorton et al. |
| 7,273,338 B2 | 9/2007 | Summerlin |
| 7,303,366 B2 | 12/2007 | Smith |
| 7,325,796 B2 | 2/2008 | Moreland |
| 7,375,277 B1 | 5/2008 | Skinner et al. |
| 7,406,777 B2 | 8/2008 | Grover et al. |
| 7,448,652 B2 | 11/2008 | Poast et al. |
| 7,509,829 B2 | 3/2009 | Johnson |
| 7,575,404 B2 | 8/2009 | Toosky et al. |
| 7,617,712 B2 | 11/2009 | Glenn |
| 7,641,430 B2 | 1/2010 | Johnson et al. |
| 7,695,226 B2 | 4/2010 | March et al. |
| 7,926,318 B2 | 4/2011 | Glenn |
| 7,926,319 B2 | 4/2011 | Johnson |
| 7,946,628 B2 | 5/2011 | Poast et al. |
| 8,061,178 B2 | 11/2011 | Glenn |
| 8,069,699 B2 | 12/2011 | Glenn et al. |
| 8,117,885 B2 | 2/2012 | Glenn |
| 8,191,395 B2 | 6/2012 | Glenn |
| 8,297,897 B2 | 10/2012 | Auriol et al. |
| 8,312,606 B2 | 11/2012 | Reid et al. |
| 8,322,015 B2 | 12/2012 | Pratt et al. |
| 8,348,566 B2 | 1/2013 | Pratt |
| 8,353,193 B2 | 1/2013 | Johnson |
| 8,387,436 B2 | 3/2013 | Glenn |
| 8,402,806 B2 | 3/2013 | Glenn et al. |
| 8,506,222 B2 | 8/2013 | Reid et al. |
| 2003/0110618 A1 | 6/2003 | Magnuson |
| 2003/0133771 A1 | 7/2003 | Dohm |
| 2004/0111864 A1 | 6/2004 | Skinner et al. |
| 2004/0213492 A1 | 10/2004 | Kim et al. |
| 2006/0045649 A1 | 3/2006 | Johnson et al. |
| 2006/0251490 A1 | 11/2006 | Kleinman et al. |
| 2007/0053761 A1 * | 3/2007 | Cohen et al. ............ 411/113 |
| 2007/0110541 A1 | 5/2007 | Rawlins et al. |
| 2007/0224016 A1 | 9/2007 | Toosky et al. |
| 2007/0266756 A1 | 11/2007 | Shuster et al. |
| 2007/0289351 A1 | 12/2007 | Glenn |
| 2008/0005887 A1 | 1/2008 | Glenn et al. |
| 2008/0034831 A1 | 2/2008 | Glenn |
| 2008/0066518 A1 | 3/2008 | Glenn et al. |
| 2008/0250603 A1 | 10/2008 | Skinner et al. |
| 2009/0304315 A1 | 12/2009 | Johnson |
| 2010/0000280 A1 | 1/2010 | Reid et al. |
| 2010/0260572 A1 | 10/2010 | Wehrmeister et al. |
| 2011/0150599 A1 | 6/2011 | Bakken et al. |
| 2011/0182689 A1 | 7/2011 | Avetisian |
| 2012/0304577 A1 | 12/2012 | Reid et al. |
| 2013/0192331 A1 | 8/2013 | Ross et al. |
| 2013/0200543 A1 | 8/2013 | Ross et al. |
| 2013/0204422 A1 | 8/2013 | Ross et al. |
| 2013/0239399 A1 | 9/2013 | Reid et al. |

FOREIGN PATENT DOCUMENTS

| | | |
|---|---|---|
| CN | 1846092 A | 10/2006 |
| DE | 2203217 | 7/1973 |
| DE | 3301849 C1 | 7/1984 |
| DE | 3545554 A1 | 7/1987 |
| DE | 8901317 U1 | 3/1989 |
| EP | 0054592 A1 | 6/1982 |
| EP | 0140516 A1 | 5/1985 |
| EP | 0248122 A2 | 12/1987 |
| EP | 0 425 292 A1 | 5/1991 |
| EP | 0581385 B1 | 5/1997 |
| EP | 0785366 A1 | 7/1997 |
| EP | 0643231 B1 | 12/1998 |
| EP | 0891007 A1 | 1/1999 |
| EP | 0696686 B1 | 7/1999 |
| EP | 0945919 B1 | 9/1999 |
| EP | 1166951 A1 | 1/2002 |
| EP | 1202458 A1 | 5/2002 |
| EP | 1525952 A1 | 4/2005 |
| EP | 1061276 B1 | 9/2005 |
| EP | 1611976 A1 | 1/2006 |
| EP | 1624202 A2 | 2/2006 |
| EP | 1032769 B1 | 5/2006 |
| EP | 1779964 A1 | 5/2007 |
| EP | 1803526 A1 | 7/2007 |
| EP | 1872895 A2 | 1/2008 |
| EP | 1903221 A2 | 3/2008 |

(56) References Cited

FOREIGN PATENT DOCUMENTS

| | | |
|---|---|---|
| EP | 1751432 B1 | 7/2008 |
| EP | 1893875 B1 | 3/2011 |
| EP | 1280621 B1 | 10/2011 |
| EP | 2388104 A1 | 11/2011 |
| EP | 2019739 B1 | 12/2011 |
| EP | 1644142 B1 | 10/2012 |
| EP | 2568183 A2 | 3/2013 |
| EP | 2061626 B1 | 4/2013 |
| EP | 1651365 B1 | 6/2013 |
| FR | 2645052 | 10/1990 |
| GB | 593607 | 10/1947 |
| GB | 1395009 | 5/1975 |
| GB | 2239917 A | 7/1991 |
| JP | 57137031 | 8/1982 |
| JP | 60238046 A | 11/1985 |
| JP | 61157846 | 7/1986 |
| JP | 09-072097 | 3/1997 |
| JP | 10-274366 | 10/1998 |
| JP | 10-299735 | 11/1998 |
| JP | 2001-177964 | 6/2001 |
| JP | 2004-176254 | 6/2004 |
| JP | 2007-500828 A | 1/2007 |
| JP | 2009-535218 A | 10/2009 |
| JP | 2009-535577 A | 10/2009 |
| JP | 2011-513672 A | 4/2011 |
| JP | 9-99334 A | 1/2014 |
| KR | 10-2009-0064401 A | 6/2009 |
| SU | 632463 | 11/1978 |
| WO | 84/00120 A1 | 1/1984 |
| WO | 87/01418 | 3/1987 |
| WO | 91/11273 A1 | 8/1991 |
| WO | 99/27262 A1 | 6/1999 |
| WO | 00/28221 A2 | 5/2000 |
| WO | 02/059489 A1 | 8/2002 |
| WO | 2006/026413 A1 | 3/2006 |
| WO | 2006/132936 A1 | 12/2006 |
| WO | 2007/082077 A1 | 7/2007 |
| WO | 2007/121932 A1 | 11/2007 |
| WO | 2008/144440 A2 | 11/2008 |
| WO | 2009/052325 A1 | 4/2009 |
| WO | 2009-111745 A2 | 9/2009 |
| WO | 2010/009442 A2 | 1/2010 |
| WO | 2010/118366 A1 | 10/2010 |
| WO | 2011/084624 A2 | 7/2011 |
| WO | 2012/167136 A2 | 12/2012 |
| WO | 2012/174215 A2 | 12/2012 |
| WO | 2013/116111 A1 | 8/2013 |

OTHER PUBLICATIONS

Extended European Search Report dated Mar. 9, 2015, for corresponding EP Application No. 12799904.3-1758 / 2721311, 7 pages.

Callinan et al., "Analysis of Fatigue Crack Growth from Cold-expanded/interference Fitted Stop Drilled Holes," DSTO-TR-0704, Airframes and Engines Division, Aeronautical and Maritime Research Laboratory, Melbourne, Australia, Jul. 1998, 39 pages.

* cited by examiner

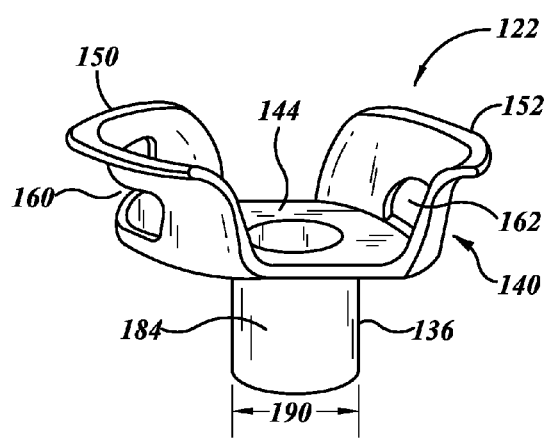
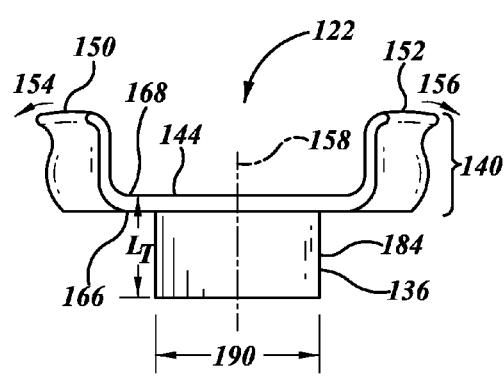
FIG. 3  FIG. 4
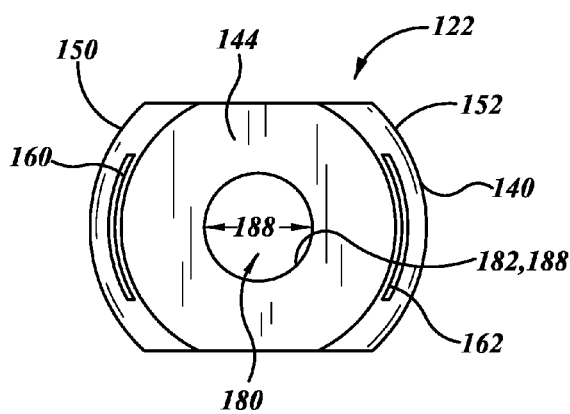
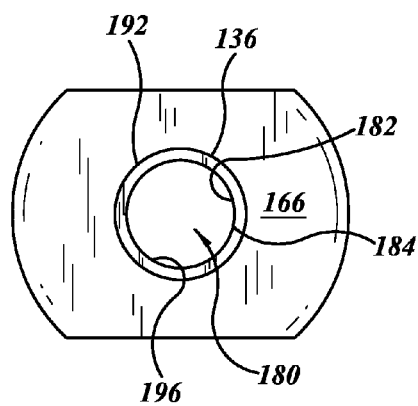
FIG. 5  FIG. 6

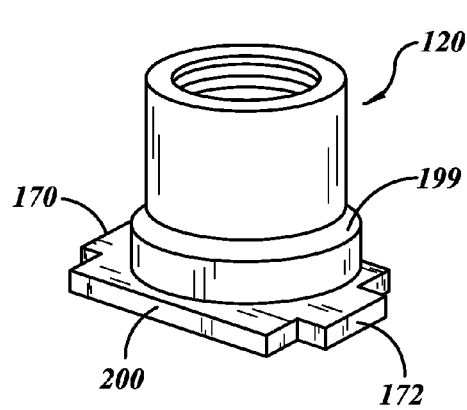
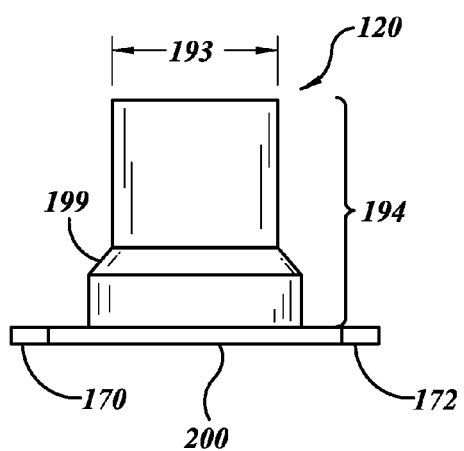
FIG. 7    FIG. 8
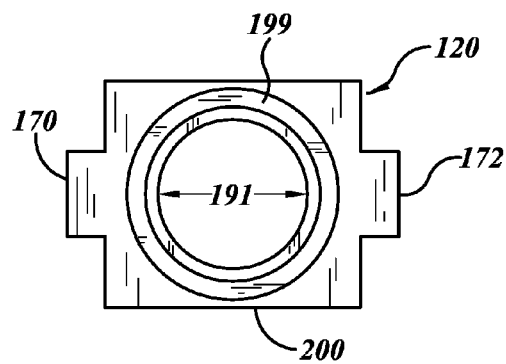
FIG. 9

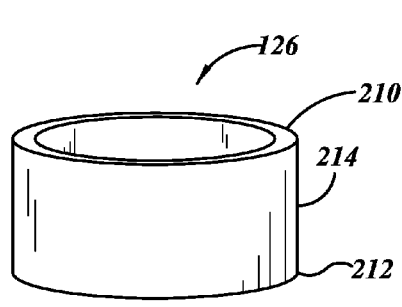
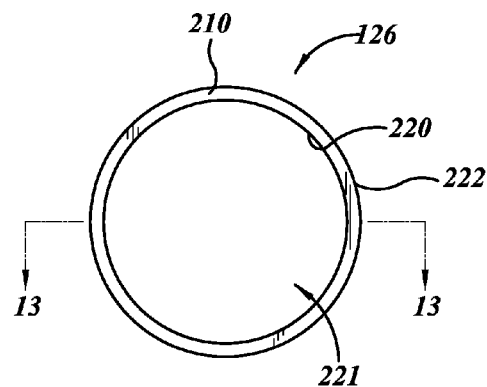
FIG. 10  FIG. 11
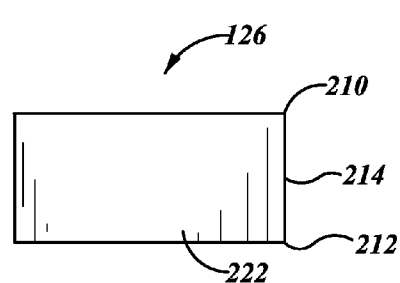
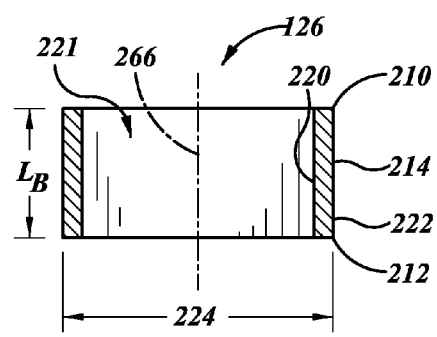
FIG. 12  FIG. 13

MODULAR NUT PLATES WITH CLOSED NUT ASSEMBLIES

CROSS REFERENCE TO RELATED APPLICATION

This application claims the benefit under 35 U.S.C. §119 (e) of U.S. Provisional Application No. 61/497,473, filed Jun. 15, 2011, where this provisional application is incorporated herein by reference in its entirety.

BACKGROUND

1. Technical Field

This disclosure generally relates to modular nut plate assemblies with closed nut assemblies and methods of using the same.

2. Description of the Related Art

Rivetless nut plates are often installed into structural workpieces in order to couple components to the workpieces. Conventional nut plates may include a bracket and a nut coupleable to the bracket. The nut can receive an externally threaded component (e.g., a bolt or a screw) after the bracket has been secured to the workpiece. When the installed nut plate supports an attached component, a flat face of the bracket can bear against the workpiece to help distribute loads to the workpiece, thereby preventing excessive stresses in the workpiece.

One type of conventional bracket has an expandable one-piece sleeve that a user can insert into an opening of the workpiece. The sleeve is then displaced radially against a tubular surface of the workpiece that defines the workpiece opening. Unfortunately, the one-piece sleeve has a fixed longitudinal length rendering the bracket unsuitable for installation in workpiece openings having longitudinal lengths that are significantly different from the length of the sleeve. A large variety of brackets having sleeves of different dimensions must therefore be kept in stock to install nut plates in different sized openings.

BRIEF SUMMARY OF THE DISCLOSURE

At least some embodiments disclosed herein include an assembly installed in a hole of a workpiece. The assembly comprises a cage assembly and a sealed nut assembly. The cage assembly includes an expandable portion dimensioned to fit in the hole and to form an interference fit with the workpiece. The sealed nut assembly includes a cap retainer, a dome cap, and a nut element. In certain embodiments, the sealed nut assembly is in the form of a dome nut assembly. The cap retainer is coupled to the cage assembly and includes a retainer body and a retainer sealing member. The retainer sealing member is compressed between the cap and the cage assembly. The dome cap has a closed end, a cap base, and a sealing member. The cap base is positioned within the cap retainer such that the cap sealing member sealingly engages a portion of the cap retainer surrounding the dome cap. The nut element has a first end, a second end, and a nut body. The nut body defines a passage for receiving a fastener extending through the expandable portion of the cage assembly and the second end of the nut element.

The sealed dome nut assembly can have a plastic-to-metal interface between the cap retainer and dome cap that can reduce corrosion, wear, arcing (e.g., due to lightening strikes), and the like. The cage assembly can also provide a plastic-to-metal interface with the cap retainer. In certain embodiments, the dome cap includes a plastic main body made by an injection molding process. The retainer body can comprise mostly metal by weight and can be deformed against the dome cap to securely hold the dome cap within the cap retainer.

In some embodiments, an assembly installable in the hole of a workpiece includes a cage assembly configured to be installed in the hole of the work piece and a sealed dome nut assembly configured to be installed in a cage assembly. The sealed dome nut assembly includes a dome cap, a retainer, and a nut element. The dome cap includes a plastic main body having a closed end, a cap base, and a cap sidewall between the closed end and the cap base. The cap retainer includes a retainer base, an open end, and a retainer sidewall between the retainer base and the open end. The retainer base is configured to be received and held by the cage assembly. The retainer sidewall is dimensioned to surround and sealingly engage the cap base such that the cap wall extends out of the open end of the cap retainer. In certain embodiments, a fluid tight seal is formed between the cap base and retainer sidewall. The nut element can be positioned to receive a component that has been moved through the receiving opening of the cage assembly when the sealed dome nut assembly is coupled to the cage assembly.

In some embodiments, a method of installing a sealed nut plate assembly in a workpiece comprises positioning a nut element in a passage of a cap retainer. A base of a dome cap is moved into the passage of the cap retainer such that the dome cap and the plastic cap retainer cooperate to retain the nut element. An open end of the cap retainer has been deformed to couple to the dome cap and the cap retainer together so as to form a sealed dome nut assembly. The cage assembly is positioned in the opening of the workpiece. The sealed nut assembly can be coupled (e.g., snap fit) to the cage assembly.

Some embodiments disclosed herein include a rivetless nut plate assembly for connecting two or more components. The installed nut plate assembly resists a wide range of static loads, dynamic loads, and combinations thereof. The nut plate assembly includes a retainer assembly with a tubular section, which includes an expandable member and an outer tubular body that surrounds the expandable member. The expandable member and outer tubular body cooperate to achieve a desired fit with the components. In certain embodiments, the tubular section is closed-ended. In other embodiments, the tubular section has an open end.

In some embodiments, the nut plate assembly includes an expandable member and a nut retainer. The expandable member and a tubular body of the nut retainer cooperate to fixedly couple the nut retainer to the components. The nut retainer retains a threaded nut for receiving an externally threaded portion of another component. Loads can be applied to the nut retainer via the nut while the nut retainer minimizes, limits, or substantially eliminates unwanted damage to the components. In some embodiments, the expandable member extends through the tubular body and is used to radially-expand the tubular body to provide a desired grip length.

The tubular body of the nut retainer and the expandable member can be radially expanded together. For example, the expandable member in the form of a bushing can be radially expanded by a mandrel so as to radially expand the tubular body and the workpiece. The radially-expanded expandable member, in some embodiments, achieves high levels of expansion of the tubular body, which in turn causes sufficient expansion of the workpiece to improve fatigue performance of the workpiece.

An assembly installable in a hole in a workpiece, in some embodiments, includes a cage configured and dimensioned to receive and retain nuts having different configurations (e.g., different shapes, different sizes, etc.) one at a time. In certain embodiments, the cage includes a first flexible retention element and a second flexible retention element. The first and second flexible retention elements are spaced apart to receive a nut therebetween. An abutment portion is configured to lay against the workpiece and defines a throughhole. A retainer includes a mounting plate receivable by the cage. An expandable member is connected to the mounting plate. The expandable member is configured to pass through the throughhole to move the mounting plate into the cage and to position the expandable member in the hole of the workpiece. The expandable member is expanded to form an interference fit with the workpiece while the abutment portion is between the mounting plate and the workpiece.

The cage may be a non-metallic cage. The cage may be made mostly of plastic by weight. The cage, in some embodiments, is a unitary molded non-metallic part. In other embodiments, the cage is a stamped metal part. The first flexible retention element, the second flexible retention element, and the abutment portion are connected together such that the first and second flexible retention elements deflect away from one another to receive the nut while the expandable member is axially and rotationally fixed to the workpiece. The abutment portion is geometrically congruent to a face of the mounting plate of the retainer, and the abutment portion may contact the workpiece when the expandable member extends through the throughhole and extends through the hole of the workpiece. The retainer may be configured to nest between the first flexible retention element and the second flexible retention element when a nut is held by the cage. The expandable member may have a first end coupled to the mounting plate, a second end opposing the first end, and a passageway extending between the first and second ends. The passageway is enlarged proximate to the second end.

A cage may be summarized as including a non-metallic nut retaining section and a non-metallic abutment portion connected to the nut retaining section. The abutment portion includes a throughhole. A retainer includes a mounting section and a tubular section. The tubular section extends away from the mounting section. The mounting section holds the cage against a workpiece when the mounting section is received by the cage and the tubular section extends away from the cage and through both the throughhole of the abutment portion and an opening in the workpiece. The cage may be made, in whole or in part, of a polyamide-imide material. The cage, in some embodiments, may include a first material with an ultimate strength less than about 20 percent of an ultimate strength of a material of the tubular member.

An installation includes a workpiece and a retainer assembly. The workpiece comprises a first side, a second side, and an opening extending between the first and second sides. The retainer assembly includes a cage that has a first flexible retention element, a second flexible retention element, and an abutment portion. The first flexible retention element includes a first opening. The second flexible retention element includes a second opening. The first flexible retention element and the second flexible retention element are spaced apart to receive a nut. The abutment portion is between the first and second flexible retention elements and includes a throughhole. A retainer includes a mounting plate and a bushing. The mounting plate is received by the cage. The bushing is connected to the mounting plate and extends through the opening of the workpiece. The bushing has been expanded to couple the mounting plate to the workpiece.

The cage and the retainer may be made of different materials. The cage, in some embodiments, may be made of a material with an ultimate strength that is substantially less than an ultimate strength of material of the retainer. The retainer may comprise a material with an ultimate strength that is greater than both an ultimate strength of material of the cage and an ultimate strength of material of the workpiece.

The bushing may extend along an entire longitudinal length of the opening in the workpiece. The portion of the bushing that forms an interference fit with the workpiece may have an axial length of at least about 1 mm, 1.5 mm, 2 mm, or 2.5 mm. Other axial lengths are also possible, if needed or desired.

A method of installing a first nut plate assembly and a second nut plate assembly in a workpiece may be summarized as including expanding a first tubular body of the first nut plate assembly in a first hole of the workpiece to fix the first tubular body to the workpiece. The first nut plate assembly includes a first cage. A first nut is inserted into the first cage by moving flexible retention elements of the first cage away from one another. A second tubular body of the second nut plate assembly is expanded in a second hole of the workpiece to fix the second tubular body to the workpiece. The second nut plate assembly includes a second cage that is geometrically congruent to the first cage. A second nut is inserted into the second cage by moving flexible retention elements of the second cage away from one another. The second nut can be geometrically different from the first nut.

A method of installation may be summarized as including positioning a first nut plate assembly in a first opening of a workpiece. The first nut plate assembly includes a first nut and a first cage. The first nut is inserted into a first receiving space between a first pair of outwardly extending retention elements of the first cage to snap fit the first nut to the first cage. A second nut plate assembly is positioned in a second opening of the workpiece. The second nut plate includes a second nut and a second cage. The second cage has a second receiving space that is substantially identical to the first receiving space. The second nut is inserted into the second receiving space to snap fit the second nut to the second cage.

The first cage may be geometrically congruent to the second cage. For example, both the first cage and second cage may have approximately the same dimensions and shape. The first and second cages may include mostly a non-metallic material by weight. Inserting the second nut into the second receiving space may include spreading a pair of outwardly extending retention elements of the second cage away from each other a distance that is greater than a distance that a first pair of outwardly extending retention elements of the first cage are spread apart as the first nut is inserted into the first cage.

At least some embodiments of the modular nut plate assemblies have common parts to reduce part counts. The nut plate assemblies can be installed without problems often associated with selecting appropriate components to install with each nut plate. A single cage design may be used to install different types of nuts. Advantageously, the nuts can be replaced without removing the nut plate. The modular nut plate assemblies can be packaged in kits. The kits can include an array of different nuts that provide different amounts of clearance, floating, or the like. The kits can also include protective caps, sealing material, and other components for the final installation.

An assembly may be summarized as including a retainer made of metal, a cage made of plastic, and a nut made of metal. The nut can be passivated and one or more dry film lubricants can be on the nut. If a workpiece is made of non-metallic materials (for example, CFRP), the retainer can be made of stainless steel. In certain embodiments, the cage is made of a metallic material, such as stainless steel, for high temperature applications. Metallic cages have enhanced dimensional stability as compared to plastic cages, especially in high temperature applications. If the workpiece is made of aluminum, the retainer can also be made of aluminum or other compatible material.

A nut cage assembly may be summarized as including components that can be replaced with other components with substantially different designs without appreciably altering the amount of float. In certain embodiments, an installed nut is replaced with another nut with different dimensions or configurations without appreciably changing the amount of float and/or clearance.

A common cage design, in some embodiments, is suitable for accepting a wide variety of elements, such as sealed nuts, open nuts, or quick release elements without any appreciable minimum grip length adjustment. In certain embodiments, a first nut includes tapered elongated members that mechanically couple to a cage. The first nut is replaced with a second nut that has generally rectangular elongated members. The second nut cooperates with the cage to provide approximately the same amount of float as the first nut. In other embodiments, the second nut cooperates with the cage to provide a different amount of float than the first nut. A wide range of different types of nuts may be installed in the cage during the service life of the workpiece without uninstalling the cage.

An assembly for retaining a nut may be summarized as including a nut retainer and a bushing. The nut retainer includes a nut retaining section and an expandable tubular body connected to the nut retaining section. The nut retaining section includes an abutment portion configured to contact a workpiece when the expandable tubular body is positioned in an opening of the workpiece. The expandable tubular body includes a body inner surface that surrounds a tubular body passageway and that defines a tubular body inner perimeter. The bushing includes a bushing outer surface defining a first outer perimeter and a bushing inner surface at least partially surrounding a bushing passageway. The first outer perimeter of the bushing is substantially equal to or smaller than the body inner perimeter. The bushing passageway is adapted to receive a mandrel capable of radially expanding the bushing and the tubular body when the tubular body circumferentially surrounds the bushing so as to produce an interference fit between the tubular body and the workpiece and an interference fit between the bushing outer surface and the body inner surface.

An installation may be summarized as including a workpiece and a retainer. The workpiece includes a first side, a second side, and an opening extending between the first and second sides. The opening has a longitudinal length. The retainer assembly includes a tubular section that has been expanded to provide radial expansion along at least most of the longitudinal length of the workpiece opening. In some embodiments, at least 50% of the longitudinal length of the workpiece opening is expanded. In some embodiments, at least 75% of the longitudinal length of the workpiece opening is expanded to significantly increase fatigue performance of the workpiece. In some embodiments, at least 90% of the longitudinal length of the workpiece opening is expanded to significantly increase fatigue performance of material of the workpiece proximate to the first and second sides.

The retainer assembly, in some embodiments, includes a nut and a retainer including a nut retaining section and an expanded tubular body. The nut retaining section is adapted to receive and retain the nut and to physically contact the first side of the workpiece. The expanded tubular body extends through at least a portion of the opening and has a passageway. The retainer assembly further includes an expanded bushing that extends through the passageway of the tubular body and has a bushing passageway. The tubular section of the retainer assembly includes the tubular body of the retainer and the bushing.

A method of installation may be summarized as including positioning a tubular body of a nut retainer in an opening of a workpiece such that a nut retaining section of the retainer is on a first side of the workpiece and the tubular body extends away from the nut retaining section towards a second side of the workpiece opposing the first side. The nut retaining section is adapted to receive and hold a nut. A bushing is positioned in a passageway of the tubular body of the nut retainer. The bushing is expanded using a mandrel to cause radial expansion of both the tubular body and a surface of the workpiece that defines the opening.

A method of installation may be summarized as including positioning a nut retainer in an opening of the workpiece. A portion of the retainer is on one side of the workpiece and another portion of the retainer is on the other side of the workpiece and/or within the opening. At least a portion of the nut retainer can receive and hold a nut. A bushing is positioned in a passageway of the nut retainer. The bushing can be expanded using the mandrel so as to cause radial expansion of both the tubular body and a surface of the workpiece that defines the opening.

A kit may be summarized as including a nut plate assembly including a cage, a retainer, and a plurality of nuts that have substantially different configurations. Each of the nuts is coupleable to the nut plate. The retainer includes an expandable tubular section positionable in an opening of a workpiece. In certain embodiments, the kit includes a first nut with a pair of substantially rectangular elongated members configured to pass through a pair of openings in the cage. The kit also includes a second nut with a pair of substantially tapered elongated members configured to pass through the pair of openings in the cage. The components of the kit can be packaged together in sealed packaging.

The cage, in some embodiments, comprises mostly a metallic material. In certain embodiments, the cage comprises at least 85%, 90%, or 95% by weight of a metallic material such as aluminum, steel, titanium, or other suitable metal that can be formed via, for example, a machining process and/or molding process. Metal cages are especially well suited for high temperature applications to provide dimensional stability. In certain embodiments, the cage comprises at least 85%, 90%, or 95% by weight of a plastic. Such cages are well suited for installation in workpieces made of non-metal materials.

In some embodiments, the cage of the kit and a first one of the nuts provides a first amount of float for one of the nuts when the first one of the nuts is installed. The cage and a second one of the nuts provide a second amount of float of the second nut when the second nut is installed. The first amount of float is substantially equal to the second amount of float. In other embodiments, the first amount of float is different from the second amount of float. In certain embodiments, the first amount of float is about 0.03 inch and the second amount of float is about 0.06 inch. In other embodiments, one or both of the first and second amount of floats can be about 0.12 inch.

A cage of a nut plate assembly and a first nut cooperate to provide a first amount of bolt clearance when the first nut is installed in the cage. The cage and a second nut are configured to cooperate to provide a second amount of bolt clearance when the second nut is installed. The first amount of bolt clearance can be different from or substantially equal to the second amount of bolt clearance. In certain embodiments, a ratio of the first amount of bolt clearance to the second amount of bolt clearance is greater than or equal to about 1, 2, or 3. The nuts can include an open nut, a closed nut, or a quick release nut. The first and second nuts can be interchanged any number of times to provide different bolt clearances or float distances.

A method of installing a first nut plate assembly and a second nut plate assembly may be summarized as including coupling a first bolt to a first nut of the first nut plate assembly to provide a first bolt clearance. A second bolt is coupled to a second nut of the second nut plate assembly to provide a second bolt clearance. The second bolt clearance is different from or substantially equal to the first bolt clearance. In certain embodiments, a ratio of the first bolt clearance to the second bolt clearance is equal to or greater than about 1.5, 2, or 3. In certain embodiments, one or both of the first and second bolt clearances can be substantially equal to about 1 mm, 1.5 mm, 2 mm, 3 mm, or ranges encompassing such bolt clearances. The amount of nut float, bolt clearance, or the like can be selected based on the size of an opening of a workpiece, the dimensions of a bolt, or other dimensions of the installation.

An installation may be summarized as including a workpiece and a nut plate assembly. The workpiece has an opening. The nut plate assembly is installed in the opening. A nut of the nut plate assembly includes a non-metal cap having a closed end and an open end. A sealing assembly of the nut is positioned in the open end of the cap. A nut element is between the closed end of the cap and the sealing assembly. In certain embodiments, both the cap and a retainer assembly of the nut plate assembly comprise the same polymer material. The retainer assembly, in some embodiments, includes a cage. In other embodiments, the cap is a dome cap made of a non-metal and the retainer assembly is made of a different type of non-metal material.

The nut plate assembly, in some embodiments, includes a plastic retainer assembly that receives the nut. The retainer assembly and the nut can cooperate to provide a desired type of seal, such as a fluid tight seal.

A nut plate assembly may be summarized as including a retainer assembly and a nut that cooperate to seal an opening in a workpiece in which the nut plate assembly is installed. In some embodiments, the nut plate assembly can provide a fluid tight seal to prevent a pressurized a fluid (e.g., air, gas, etc.) from escaping past the nut plate assembly. A protective cap can form a seal with the workpiece.

The nut plate assembly, in some embodiments, can be in the form of a non-arcing nut plate assembly to inhibit, limit, or substantially prevent arcing even when relatively high electrical loads are applied, such as due to a lightning strike. Different components of the nut plate assembly can be made of electrically insulating materials that cooperate to inhibit or prevent arcing. In certain embodiments, most or substantially all of the external surfaces of the nut plate assembly are formed of non-metal materials. In certain embodiments, the nut includes a non-metal dome cap that surrounds internal components of the nut plate assembly. At least a portion of the retainer assembly can also be formed of a non-metal material. For example, a cage of the retainer assembly can be formed of a plastic material. The dome cap and the retainer assembly can cooperate to surround and encapsulate the internal components.

A nut plate assembly may be summarized as including a cap, a retainer assembly, or other components with dielectric properties that provide resistance to arcing, for example, when subjected to high electrical current loads. High electrical current loads can be associated with lightning strikes or electrical malfunctions. The nut plate assembly can reduce or eliminate damage associated with such high electrical current loads. In certain embodiments, the cap is made of a polymer, such as TORLON®. The problem of lightning strikes is particularly significant if the nut plate is installed near to or in a wall of a fuel tank because arcing, sparks, or burning material could cause an explosion. The nut plate assembly can thus be installed near to or in fuel tanks.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale.

FIG. 3 is an isometric view of a nut retainer of a nut plate assembly, according to one illustrated embodiment.

FIG. 4 is a side elevational view of the nut retainer of FIG. 3, according to one illustrated embodiment.

FIG. 5 is a top plan view of the nut retainer of FIG. 3, according to one illustrated embodiment.

FIG. 6 is a bottom view of the nut retainer of FIG. 3, according to one illustrated embodiment.

FIG. 7 is an isometric view of a nut of a nut plate assembly, according to one illustrated embodiment.

FIG. 8 is a side elevational view of the nut of FIG. 7, according to one illustrated embodiment.

FIG. 9 is a top plan view of the nut of FIG. 7, according to one illustrated embodiment.

FIG. 10 is a perspective view of an expandable member of a nut plate assembly, according to one illustrated embodiment.

FIG. 11 is a top plan view of the expandable member of FIG. 10.

FIG. 12 is a side elevational view of the expandable member of FIG. 10.

FIG. 13 is a cross-sectional view of the expandable member of FIG. 11 taken along a line 13-13.

DETAILED DESCRIPTION OF THE DISCLOSURE

In the following description, certain specific details are set forth in order to provide a thorough understanding of various embodiments of the invention. However, one skilled in the art will understand that the invention may be practiced without these details. The assemblies and processes disclosed herein can be used to couple together a desired number of components. The components can include, without limitation, workpieces, connectors, mounting components, and the like. The terms "proximal" and "distal" are used to describe the illustrated embodiments and are used consistently with the description of non-limiting exemplary applications. The terms proximal and distal are used in reference to the user's body when the user operates an installation system, unless the context clearly indicates otherwise.

Unless the context requires otherwise, throughout the specification and claims which follow, the word "comprise" and variations thereof, such as, "comprises" and "comprising" are to be construed in an open, inclusive sense, that is as "including, but not limited to."

As used in this specification and the claims, the singular forms "a," "an," and "the" include plural referents unless the content clearly dictates otherwise. Thus, for example, reference to a nut plate assembly that includes "a bushing" includes a nut plate assembly with a single bushing or a nut plate assembly with two or more bushings, or both. It should also be noted that the term "or" is generally employed in its sense including "and/or" unless the context clearly dictates otherwise.

Figure 1:
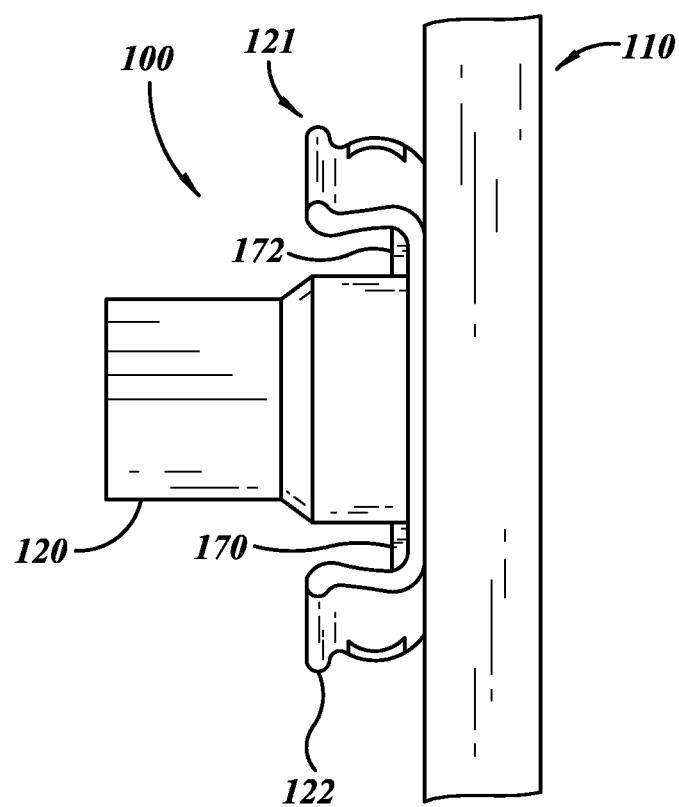
FIG. 1 is a side elevational view of a nut plate assembly installed in a workpiece, according to one illustrated embodiment.
Figure 2:
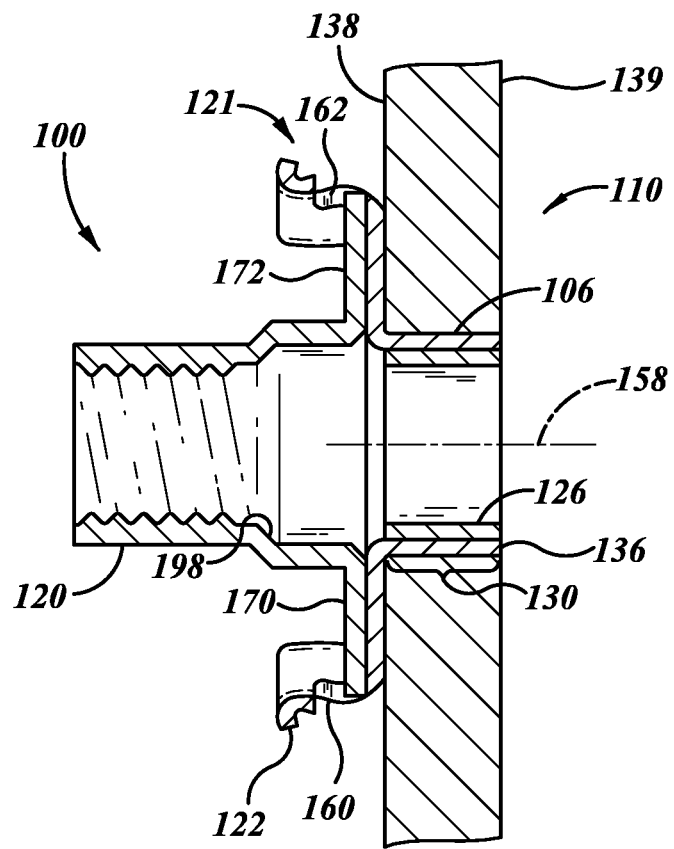
FIG. 2 is a cross-sectional view of the nut plate assembly and workpiece of FIG. 1.

FIGS. 1 and 2 show a rivetless nut plate assembly 100 installed within an opening 106 of a workpiece 110. The nut plate assembly 100 includes a nut 120 and a retainer assembly 121 fixedly coupled to the workpiece 110. The retainer assembly 121 includes a nut retainer 122 adapted to releasably hold the nut 120 and an expandable member 126, illustrated as a bushing.

The illustrated nut plate assembly 100 has a multi-piece tubular section 130 that includes the bushing 126 and a tubular body 136 of the nut retainer 122 circumferentially surrounding the bushing 126. The tubular section 130 has been expanded to fixedly couple the nut plate assembly 100 to the workpiece 110. A mounting component (e.g., a screw, bolt, threaded member, and the like) can be threadably coupled to the nut 120 such that the mounting component is coupled to the workpiece 100 by the nut plate assembly 100.

The nut plate assembly 100 can be installed in various types of workpieces. As used herein, the term "workpiece" is broadly construed to include, without limitation, a parent structure, such as a thin sheet of metal, a structural component, etc., having at least one opening suitable for receiving at least a portion of the nut plate assembly 100, and/or an assembly, such as an aircraft. The opening can be a through-hole or other type of hole. The illustrated opening 106 of FIG. 2 extends between a first side 138 and a second side 139 of the workpiece 110. In some embodiments, the workpiece 110 is a structural workpiece, such as a bulkhead, a fuselage, a tank (e.g., a fuel tank), an engine, or other component (e.g., structural component, pressurized component, or the like) of an aircraft. The workpiece 110 may or may not have backside access. If the workpiece 110 is a multi-component structure, the nut plate assembly 100 can hold the components of the structure together with a desired clamp-up force. Multi-component structures include, without limitation, a stack of plates, multi-layer laminates, and the like. The illustrated structural workpiece 110 of FIGS. 1 and 2 can comprise, without limitation, one or more metals (e.g., steel, aluminum, titanium, and the like), polymers, plastics, composites, or other materials suitable for engaging one or more of the components of the nut plate assembly 100.

FIGS. 3-6 show the nut retainer 122 that includes a nut retaining section 140 and the tubular body 136. The nut retaining section 140 has a generally U-shaped profile, as illustrated in FIG. 4, and includes an abutment portion 144 configured to contact the workpiece 110 when the tubular body 136 is within the workpiece opening 106, as illustrated in FIG. 2. The abutment portion 144 can be in the form of a plate that includes a first face 166 and a second face 168 opposing the first face 166. The illustrated first face 166 is generally planar to provide a relatively large surface area for physically contacting the workpiece 110. The first face 166 can lay generally flat along the workpiece 110.

The illustrated retaining section 140 includes a pair of flexible retention elements 150, 152 extending away from the abutment portion 144 and partially surrounding a longitudinal axis 158 of the tubular body 136. The retention elements 150, 152 include apertures 160, 162, respectively. The nut 120 can spread the retention elements 150, 152 outwardly, as indicated by the arrows 154, 156 of FIG. 4, such that elongated members 170, 172 of the nut 120 move into the apertures 160, 162, respectively. FIG. 2 shows the elongated members 170, 172 positioned within the apertures 160, 162, respectively.

Referring again to FIGS. 3-6, the tubular body 136 includes a tubular body passageway 180, an inner surface 182 surrounding the passageway 180, and an outer surface 184 opposing the inner surface 182. The inner surface 182 defines an inner perimeter 188, and the outer surface 184 defines an outer perimeter 190. The outer perimeter 190 can be sized to closely fit within the opening 106 of the workpiece 110 before the tubular body 136 is radially expanded. For example, a clearance fit with a minimal amount of clearance, a slight clearance fit, or the like can be formed by the outer surface 184 and the workpiece 110.

The tubular body 136 can have various cross-sectional profiles, including, without limitation, a circular profile, a polygonal profile, an elliptical profile, or the like. The tubular body 136 shown in FIG. 6 has an approximately circular profile that is substantially geometrically congruent to the profile of the opening 106.

Various types of manufacturing processes can be used to make the nut retainer 122. For example, stamping processes, machining processes, bending processes, molding processes, and the like can be employed. In some embodiments, a flat sheet of metal is cut (e.g., die cut) into a desired configuration. The cut piece of metal is then stamped to form the illustrated nut retaining section 140, illustrated as a cage. The nut retaining section 140 is then coupled to the tubular body 136. Molding processes include, without limitation, injection molding, compression molding, or the like. Injection molding can include, but is not limited to, metal injection molding, reaction injection molding, injection-compression molding, or other processes for shaping moldable materials. For example, the nut retaining section 140 can be a non-metallic part comprising one or more thermoplastics, thermosets, composites, or combinations thereof. A thermoset or thermosetting material is generally a plastic that becomes permanently hardened when set. In some embodiments, the nut plate assembly 100 is made, at least in part, of a polyamide-imide material. TORLON® is one type of polyamide-imide material that has suitable mechanical properties for a long service life, even if the TORLON® components experience significant loads. In some embodiments, the nut retaining section 140 is made, in whole or in part, of TORLON®, or other type of polyamide-imide.

The tubular body 136 can be made of a material, or combination of materials, that permits radial expansion. The tubular body 136 can experience plastic deformation to form a permanent interference fit with the workpiece 110 and elastic deformation to contract onto and form a permanent interference fit with the bushing 126. The expanded tubular body 136, in some embodiments, radially contracts (e.g., elastically contracts) onto the bushing 126. In some embodiments, the tubular body 136 experiences only permanent deformation. Such embodiments are well suited for the simultaneous expansion of the bushing 126 and the tubular body 136, as discussed in connection with FIGS. 14-18.

FIGS. 7-9 show the nut 120 having an inner perimeter 191 and an outer perimeter 193. In some embodiments, the inner perimeter 191 is at least partially threaded for threadably coupling to another component. In other embodiments, the inner perimeter 191 is configured to receive a non-threaded component. The nut 120 may include one or more fixation elements, such as fasteners, set screws, and the like, to fixedly retain another component. The nut 120 can also include an outer shoulder 199 that can engage a cap or the like. For example, the outer perimeter 193 can be sized such that a cap can be inserted over the nut 120. FIG. 2 shows an inner shoulder 198 of the nut 120 that can act as an axial restraint for the mandrel used to install the nut plate assembly 100.

In some embodiments, including the illustrated embodiment of FIGS. 7-9, the nut 120 has a base 200 that includes the elongated members 170, 172, illustrated as generally rectangular tabs. The shape, size, and number of the elongated members can be selected based on the desired interaction between the nut 120 and the nut retainer 122. When the nut 120 is coupled to the retainer 122, the base 200 can be held against the face 168 to reduce, limit, or substantially eliminate relative movement between the base 200 and the retainer 122.

The illustrated nut 120 can be snapped into the retainer 122 of FIGS. 1 and 2 before, after, or during the installation of the retainer 122. Additionally, the nut 120 can be removed from the retainer 122, if needed or desired. The retention elements 150, 152 can be deflected outwardly until the elongated members 170, 172 are released from the retention elements 150, 152. The nut 120 is then moved away from the retainer 122. Another nut, or other type of component, can then be installed in the retainer 122.

Other types of nuts can be utilized with the nut retainer 122. For example, one-piece or multi-piece nuts can be incorporated into the nut plate assembly 100. U.S. application Ser. No. 11/445,951, which is incorporated by reference herein in its entirety, discloses such nuts. In some embodiments, the nut 120 is in the form of a conventional nut. The nuts can also be closed-ended nuts. Closed-ended nuts can be multi-piece components, such as those discussed in connection with FIGS. 40-42. Nuts can have caps, nut elements, sealing elements, and the like.

Referring to FIGS. 10-13, the expandable member 126 is in the form of a bushing. As used herein, the term "expandable member" is a broad term and includes, but is not limited to, a bushing, a fastener, a structural expandable member (e.g., an expandable member that is incorporated into a structural workpiece), or other structures that are suitable for coupling to a workpiece. The bushing 126 can be expanded from a first configuration to a second configuration. In some embodiments, for example, the bushing 126 is radially expanded from an initial configuration to a second configuration in order to form an interference fit with a structural workpiece or a nut retainer, or both, as well as other components, if needed or desired. The term "expandable member" refers to a member both in a pre-expanded state and post-expanded state, unless the context clearly dictates otherwise. Various types of expansion processes can be employed to expand the expandable members. In a cold expansion process, for example, the expandable member is radially expanded without appreciably raising the temperature of the expandable member to produce residual stresses in the workpiece to enhance fatigue performance. The residual stresses are preferably compressive stresses that can minimize, limit, inhibit, or prevent crack initiation and/or crack propagation. As noted above, expandable members can be in the form of bushings. A bushing may be, without limitation, a sleeve (including a split sleeve), a tubular member (with or without flanges), and the like. The bushing may have various features, such as coatings, liners, seating features (e.g., flanges) and the like. As used herein, the term "expanding" and variations thereof (e.g., expandable, expanded, etc.) are broad terms and include, but are not limited to, spreading, swaging, drawing, radially expanding, displacing, deforming, or other ways of displacing at least a portion of a component.

The bushing 126 includes a first end 210, a second end 212 opposing the first end 210, and a body 214 that extends between the first and second ends 210, 212. The bushing 126 further includes an inner surface 220 defining a passageway 221 and an outer surface 222. The outer surface 222 includes an outer perimeter 224 that is sized to closely fit (e.g., to provide a clearance fit with a minimal amount of clearance, a slight clearance fit, or the like) within the tubular body 136 of the retainer 122. The bushing 126 can thus be easily inserted into the tubular body 136 and then expanded.

Figure 14:
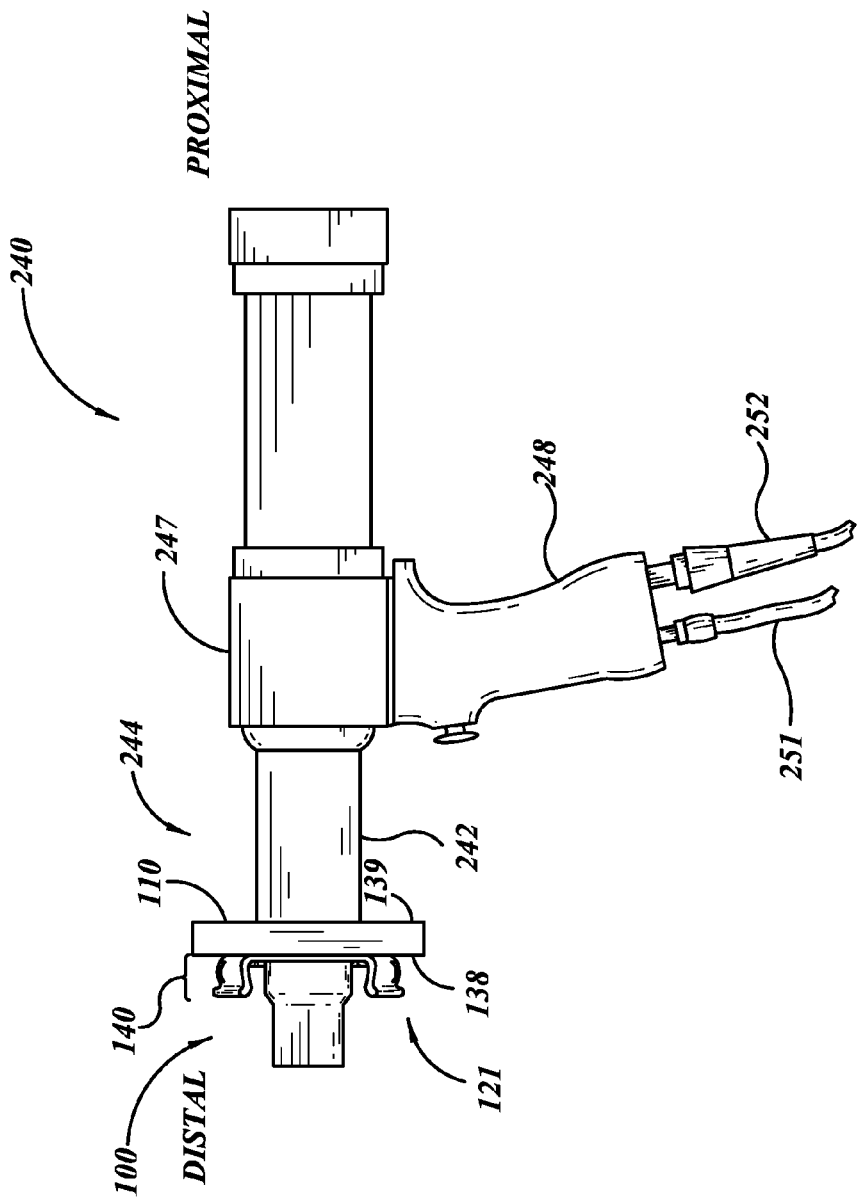
FIG. 14 is a side elevational view of an installation system having an installation tool and an assembled nut plate assembly ready for installation, according to one illustrated embodiment.
Figure 15:
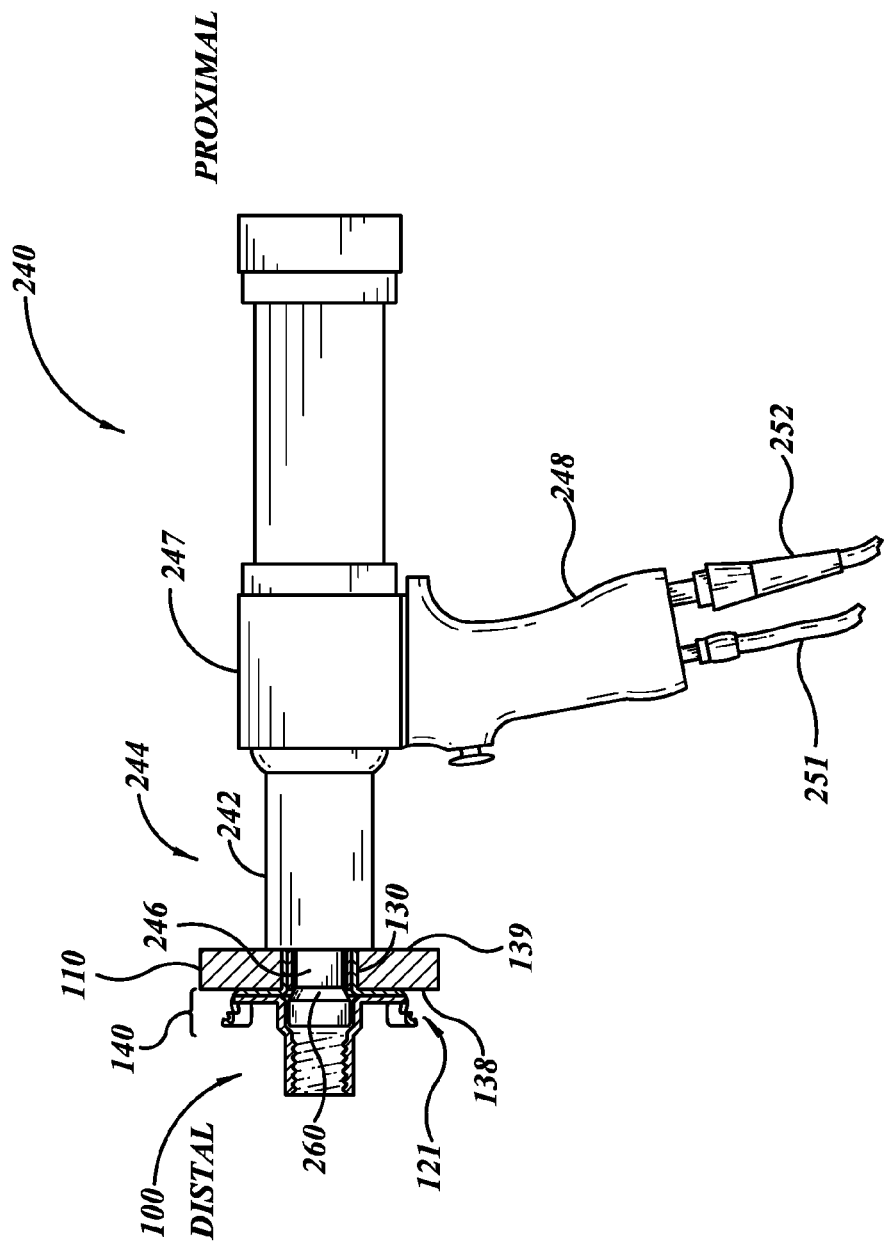
FIG. 15 is a partial cross-sectional view of the installation system of FIG. 14, wherein the nut plate assembly is positioned on a mandrel.

FIGS. 14 and 15 show an installation system 240 used to install the nut plate assembly 100. To install the nut plate assembly 100, a nose cap 242 of an installation tool 244 is placed against the workpiece 110. An expansion mandrel 246 is pulled through the tubular section 130 to expand both the bushing 126 and the tubular body 136. The expansion mandrel 246 can be an elongated member having at least one tapered portion or expanded portion used to expand one or more components. Mandrels can have a one-piece or multi-piece construction.

The installation tool 244 includes a main body 247 that is coupled to a grip 248. The user can manually grasp the grip 248 to comfortably hold and accurately position the installation system 240. The illustrated grip 248 is a pistol grip; however, other types of grips can be utilized. The installation tool 244 can be driven electrically, hydraulically, or pneumatically. In some embodiments, the main body 247 houses a mechanical drive system that drives the expansion mandrel 246, preferably along a predetermined path (e.g., a line of action) in a proximal direction, towards the installer, and/or distal direction, away from the installer. A pair of fluid lines 251, 252 provides pressurized fluid (e.g., pressurized gas, liquid, or combinations thereof) to a drive system that actuates the expansion mandrel 246. One of ordinary skill in the art can select the type of drive system used to achieve the desired motion of the mandrel 246.

FIGS. 14-18 illustrate one process for installation of the nut plate assembly 100. Generally, the tubular section 130 of the retainer assembly 121 can be inserted into the opening 106. The nut retaining section 140 is on the first side 138 of the workpiece 110 and the tubular section 130 extends away from the nut retaining section 140 towards the second side 139 of the workpiece 110. After positioning the retainer assembly 121, the mandrel 246 is moved through the tubular section 130 from the first side 138 to the second side 139 to expand the tubular section 130. Details of the installation process are discussed below.

Figure 16:
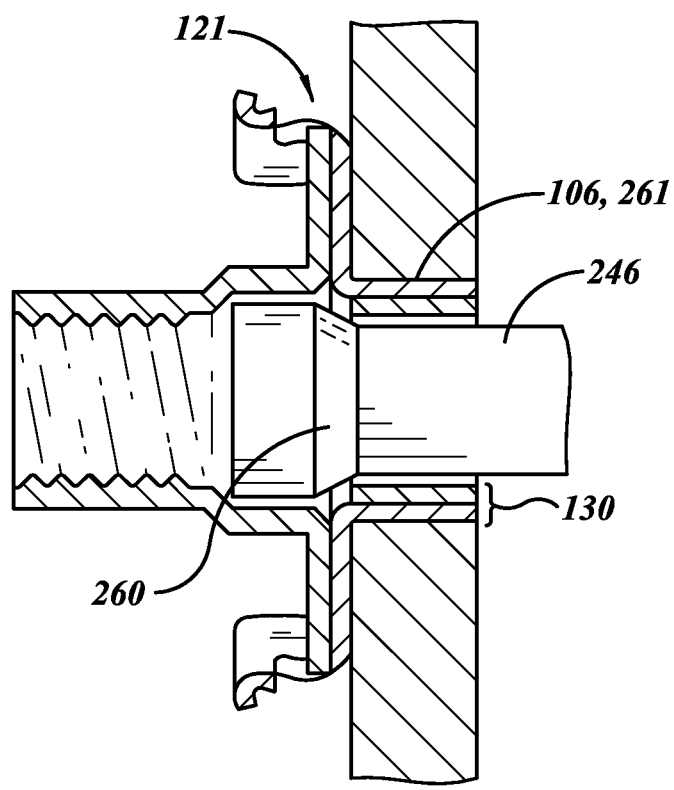
FIG. 16 is a partial cross-sectional view of a portion of an installation system, wherein a mandrel is ready to expand a nut plate assembly, according to one illustrated embodiment.

FIG. 16 shows the mandrel 246 ready to expand the assembled retainer assembly 121. The retainer assembly 121 can be assembled after or before the tubular body 136 is inserted into the workpiece 110. In some embodiments, the bushing 126 is positioned within the tubular body 136 after the body 136 is inserted into the opening 106. In other embodiments, the bushing 126 is inserted into the tubular body 136 and then the assembled bushing 126 and tubular body 136 are inserted together into the opening 106.

Figure 17:
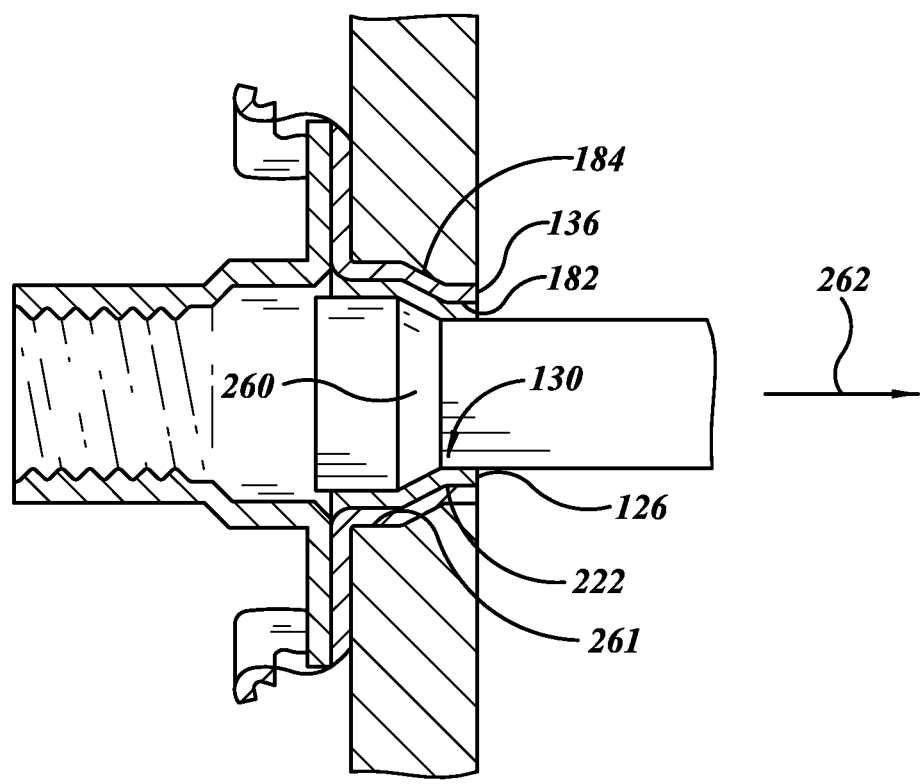
FIG. 17 is a partial cross-sectional view of the installation system of FIG. 16, wherein the mandrel is expanding a multi-piece tubular section of a retainer assembly, according to one illustrated embodiment.

FIG. 17 shows a mandrel tapered section 260 beginning to be pulled through the tubular section 130 in the direction indicated by an arrow 262. As the tapered section 260 progresses through the tubular section 130, the tapered section 260 plastically increases the respective dimensions (e.g., perimeters) of the expanded bushing 126 and tubular body 136. For illustration purposes, the radial expansion of the tubular section 130 is exaggerated. The material of the bushing 126 is radially displaced into the material of the tubular body 136 to form a desired fit between the outer surface 222 of the bushing 126 and the inner surface 182 of the tubular body 136. The material of the tubular body 136 in turn radially displaces the inner surface 261 of the opening 206 to form a desired fit between the outer surface 184 of the tubular body 136 and the inner surface 261. The tapered section 260 cold works the workpiece material surrounding the retainer section 130 to provide a fatigue benefit by creating compressive, residual stresses.

Figure 18:
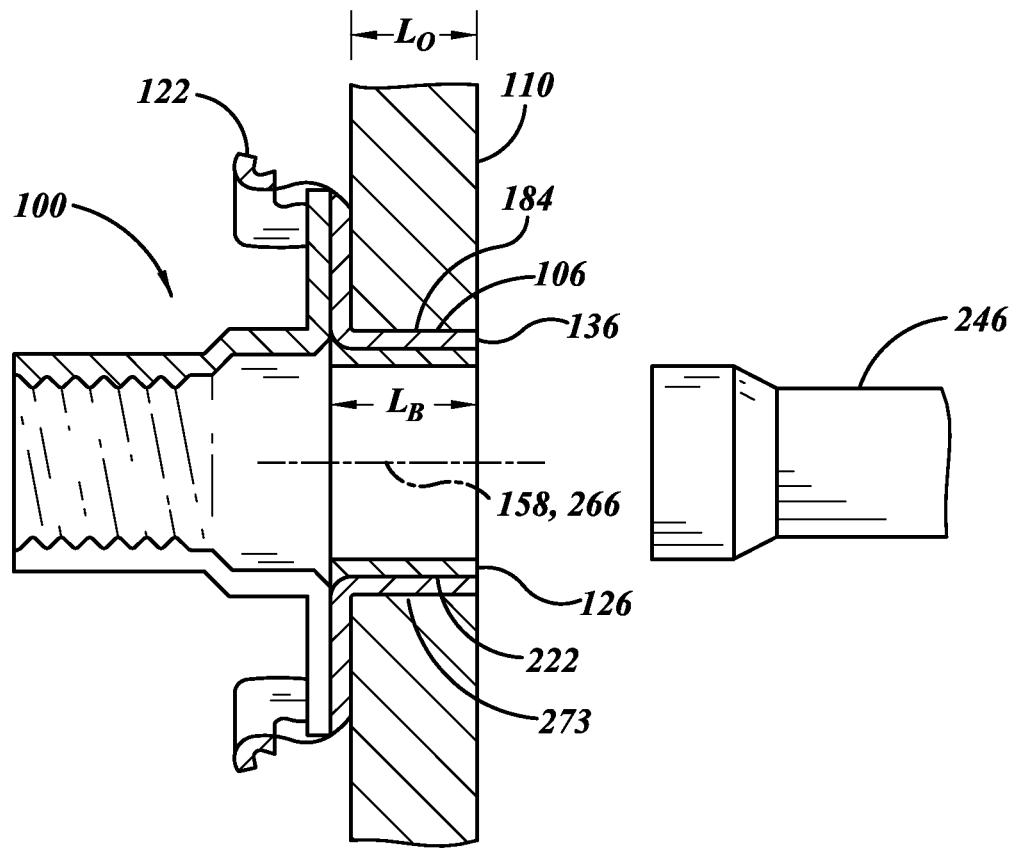
FIG. 18 is a cross-sectional view of the post-expanded multi-piece tubular section of FIG. 17 spaced apart from the mandrel, according to one illustrated embodiment.

Referring to FIG. 18, the mandrel 246 has cleared the nut plate assembly 100. The radially-expanded bushing 126 has a longitudinal length $L_B$ that is substantially equal to, less than, or greater than a longitudinal length $L_T$ (see FIG. 4) of the tubular body passageway 180. The longitudinal length $L_B$ can be substantially equal to or greater than the longitudinal length $L_T$ to provide an interference fit throughout at least a substantial portion of a longitudinal length $L_O$ of the opening 106. The longitudinal length $L_B$ can be measured along a longitudinal axis 266 of the bushing 126. The longitudinal length $L_T$ can be measured along a longitudinal axis 158 of the tubular body 136.

The illustrated outer surface 184 of the tubular body 136 and the outer surface 222 of the bushing 126 have been radially expanded to provide substantially equal radial expansion throughout at least most of the opening longitudinal length $L_O$. In some embodiments, the entire length $L_O$ of the opening 106 is expanded. Induced compressive stresses in the workpiece material 273 surrounding or adjacent to the opening 106 may improve fatigue performance of the installation. Additionally, the radially-expanded nut retainer 122 of FIG. 18 can be translationally and/or rotationally fixed with respect to the workpiece 110 due to the compressive stresses developed during the expansion process. The bushing 126 can be translationally and/or rotationally fixed with respect to the nut retainer 122. Thus, each component of the nut plate assembly 100 can be fixedly coupled directly or indirectly to the workpiece 110.

The installed bushing 126 can help inhibit, limit, or substantially eliminate relative movement between the workpiece 110 and the retainer assembly 121, even if another component coupled to the retainer assembly 121 via the nut 120 is subjected to various loading conditions, such as axial loads or torsional loads, including static loading and cyclic loading. The bushing 126 can prop the tubular body 136 against the workpiece 110.

The mandrel 246 can be reused or discarded. If reused, the mandrel 246 can be returned to a manufacturer to be reassembled into another nut plate assembly 100. The manufacturer of the nut plate assembly may or may not provide a refund or other incentive to encourage the return of mandrels. In some embodiments, the mandrel 246 is disposable.

In some embodiments, the mandrel 246 is a split mandrel, solid mandrel, mandrel assembly (e.g., a mandrel assembly with movable components), or the like. A wide range of different types of installation systems can be used to install components of nut retainer assemblies. U.S. Pat. No. 7,509,829, which is incorporated by reference herein in its entirety, discloses mandrel assemblies, methods, and components that are especially well suited for one-sided installation. The mandrel assemblies disclosed in U.S. Pat. No. 7,509,829 can radially expand a retainer without passing the entire mandrel through the retainer. Mandrel assemblies can be modified based on, for example, the desired amount of radial expansion, installation times, configuration of the retainer, desired induced stresses in the workpiece, or the like. Sleeves (e.g., split sleeves), lubricants, and the like can be used with mandrels to achieve the desired installation. For example, split sleeves and one-piece mandrels can be used to install a retainer having an integral bushing.

Figure 19:
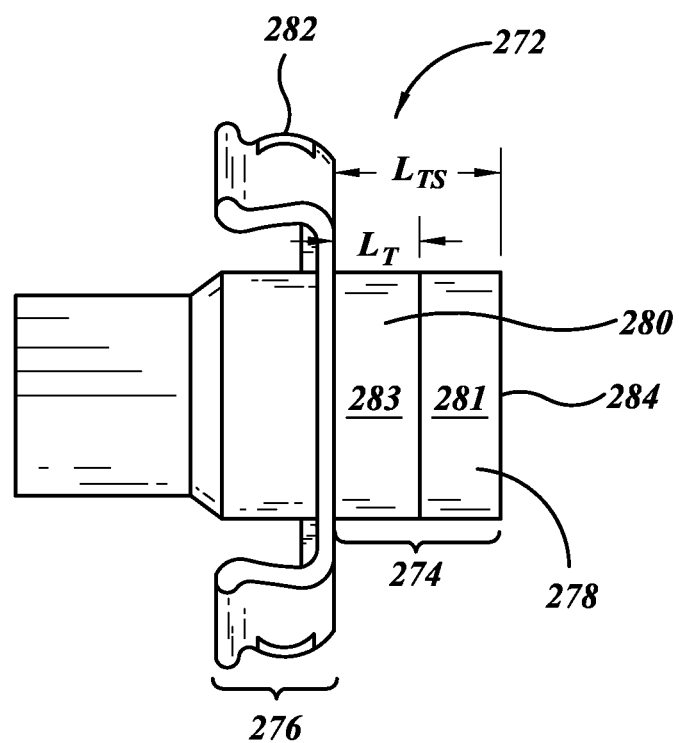
FIG. 19 is a side elevational view of a nut plate assembly that has a multi-piece tubular section for expanding an opening of a workpiece, according to one illustrated embodiment.

FIG. 19 shows a nut plate assembly 272 that includes a tubular section 274 and a nut retaining section 276. Components of the nut plate assembly 272 can be selected to provide different grip lengths. Accordingly, the nut plate assembly 272 can be installed into a wide range of workpieces, including thin sheets, thick plates, and the like, and can be generally similar to the nut plate assembly 100 discussed in connection with FIGS. 1-18, except as further detailed below.

A longitudinal length $L_{TS}$ of the tubular section 274 can be adjusted based on the thickness of a workpiece. Expandable members of different lengths can be used to increase or decrease the longitudinal length $L_{TS}$ of the tubular section 274. The tubular section 274 of FIGS. 19 and 20 has an outer surface 278, which is defined by a tubular body 280 of a nut retainer 282 and an expandable member 284 in the form of a bushing. The length of the exposed portion of the bushing 284 can be selected based on the length $L_O$ of the opening 287 of the workpiece 289. Thus, the illustrated nut retainer 282 can be installed into a wide range of workpieces having different thicknesses.

Figure 20:
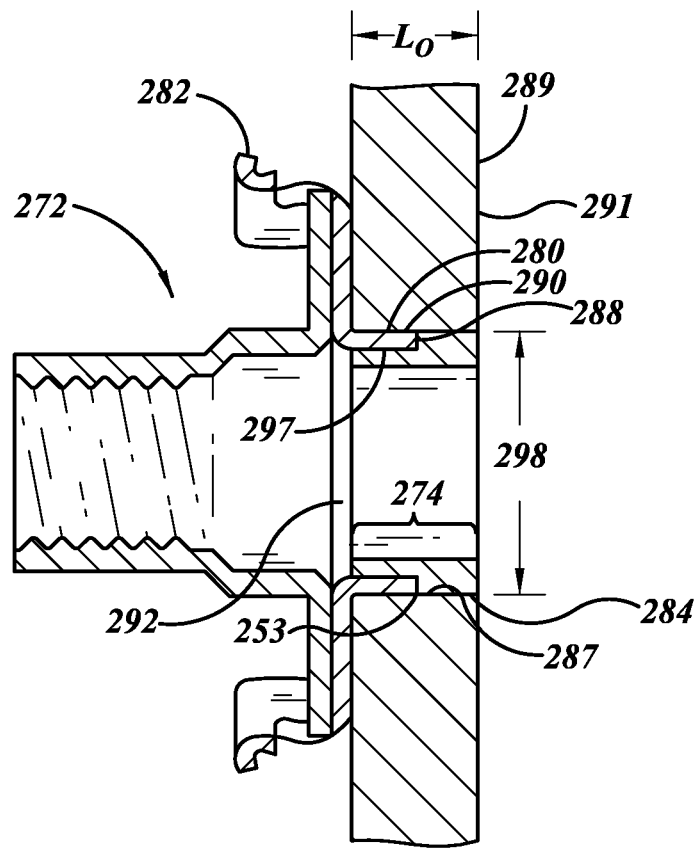
FIG. 20 is a cross-sectional view of the nut plate assembly of FIG. 19 in a workpiece, according to one illustrated embodiment.
Figure 21:
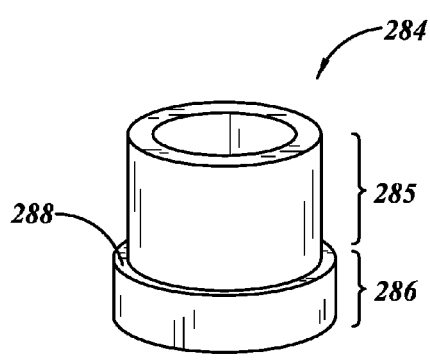
FIG. 21 is an isometric view of an expandable member, according to one illustrated embodiment.
Figure 22:
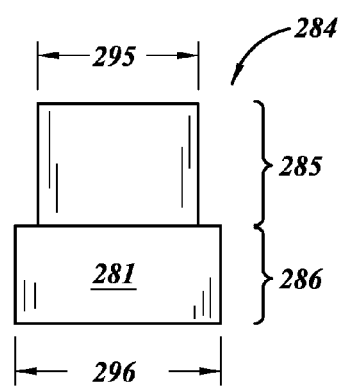
FIG. 22 is a side elevational view of the expandable member of FIG. 21.
Figure 23:
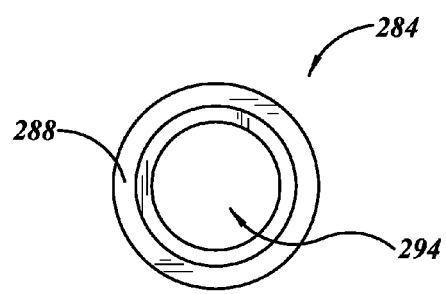
FIG. 23 is a top plan view of the expandable member of FIG. 21.

Referring to FIGS. 21-23, the bushing 284 includes a first section 285 for placement in the tubular body 280 of the retainer 282 and a second section 286 for physically contacting and expanding the workpiece 289. The first and second sections 285, 286 cooperate to define a bushing passageway 294. A shoulder 288, illustrated as a stepped diameter, between the first and second sections 285, 286. As shown in FIG. 20, the shoulder 288 contacts an end 290 of the tubular body 280 when the first section 285 is positioned along a body passageway 292 of the tubular body 280.

The first section 285 has a longitudinal length that is substantially equal to a length of the nut retainer tubular body 280. The second section 286 has a longitudinal length that is substantially equal to a length of a section of the workpiece opening 287 extending between the end 290 of the tubular body 280 and an outer face 291 of the workpiece 289. The illustrated second section 286 of FIG. 20 protrudes from the end 290 and through the opening 287 to the face 291.

Referring to FIG. 22, the first section 285 includes a first outer perimeter 295, and the second section 286 includes a second outer perimeter 296 that is greater than the first outer perimeter 295. In some embodiments, the first outer perimeter 295 is generally equal to or slightly less than an inner perimeter of the tubular body 280. At least a portion of the first section 285 can also have a transverse profile that is substantially geometrically congruent to a transverse profile of at least a portion of the tubular body 280 before and/or after the installation process. In some embodiments, the first section 285 has a transverse profile that is slightly smaller than the transverse profile of the tubular body 280 such that a slight interference fit is formed between the first section 285 and the tubular body 280 before expansion. The first section 285 and tubular body 280 can then be simultaneously expanded.

At least a portion of the second section 286 can have a transverse profile that is substantially geometrically congruent to a transverse profile of at least a portion of the opening 287 before and/or after the installation process. In some embodiments, the second section 286 has a transverse profile that is slightly smaller than the transverse profile of the opening 287 such that a slight interference fit is formed between the second section 286 and the opening 287 before expansion. The second section 286 can then be expanded to cause corresponding expansion of the opening 287.

To install the nut plate assembly 272 of FIG. 20, the tubular section 274 is expanded to form a first interference fit between the first section 285 of the bushing 284 and the tubular body 280 and a second interference fit between the second section 286 of the bushing 284 and the workpiece 289. The tubular body 280 is expanded a sufficient amount to form an interference fit with the workpiece 289. Thus, the tubular body 280 and the bushing 284 are fixed to the workpiece 289 via interference fits.

In some embodiments, both the outer surface 283 of the tubular body 280 of FIG. 19 and the outer surface 281 of the second section 286 can be radially expanded to provide substantially equal radial expansion throughout at least most of the longitudinal length of the opening 287. In some embodiments, the entire longitudinal length of the opening 287 is radially expanded to induce compressive stresses in the material of the workpiece 289 physically contacting the tubular section 274.

Figure 24:
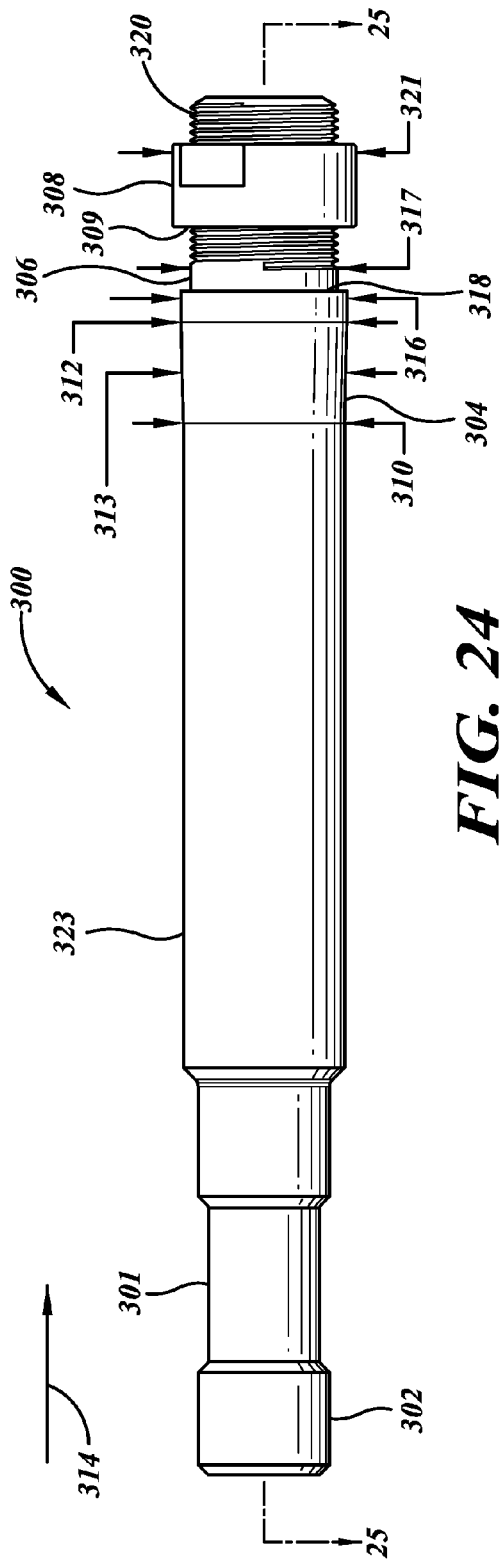
FIG. 24 is a side elevational view of a mandrel assembly for installing a nut plate assembly, according to one illustrated embodiment.

FIG. 24 shows a mandrel assembly 300 for expanding the nut plate assemblies disclosed herein. The mandrel assembly 300 includes a mandrel 301 having an engagement portion 302, a tapered region 304, a receiving surface 306, and a collar 308. The engagement portion 302 permits the mandrel 301 to be connected to an installation tool. The tapered region 304 includes a minimum perimeter portion 310, a maximum perimeter portion 312, and a transition perimeter portion 313 extending therebetween. The tapered region 304 is positioned downstream, as indicated by the arrow 314, from the engagement portion 302 and operates to radially expand components. The illustrated maximum perimeter portion 312 of the mandrel 301 is larger than the inner perimeter 188 of the retainer 122.

A uniform perimeter region 316 may be positioned adjacent to the maximum perimeter portion 312 of the tapered region 304. The uniform perimeter region 316 can be useful during the manufacturing of the mandrel assembly 301. In some embodiments, the mandrel 301 may not have a uniform perimeter region in order to reduce the axial length of the mandrel 301. The maximum perimeter portion 312, for example, can extend from the receiving surface 306.

Figure 26:
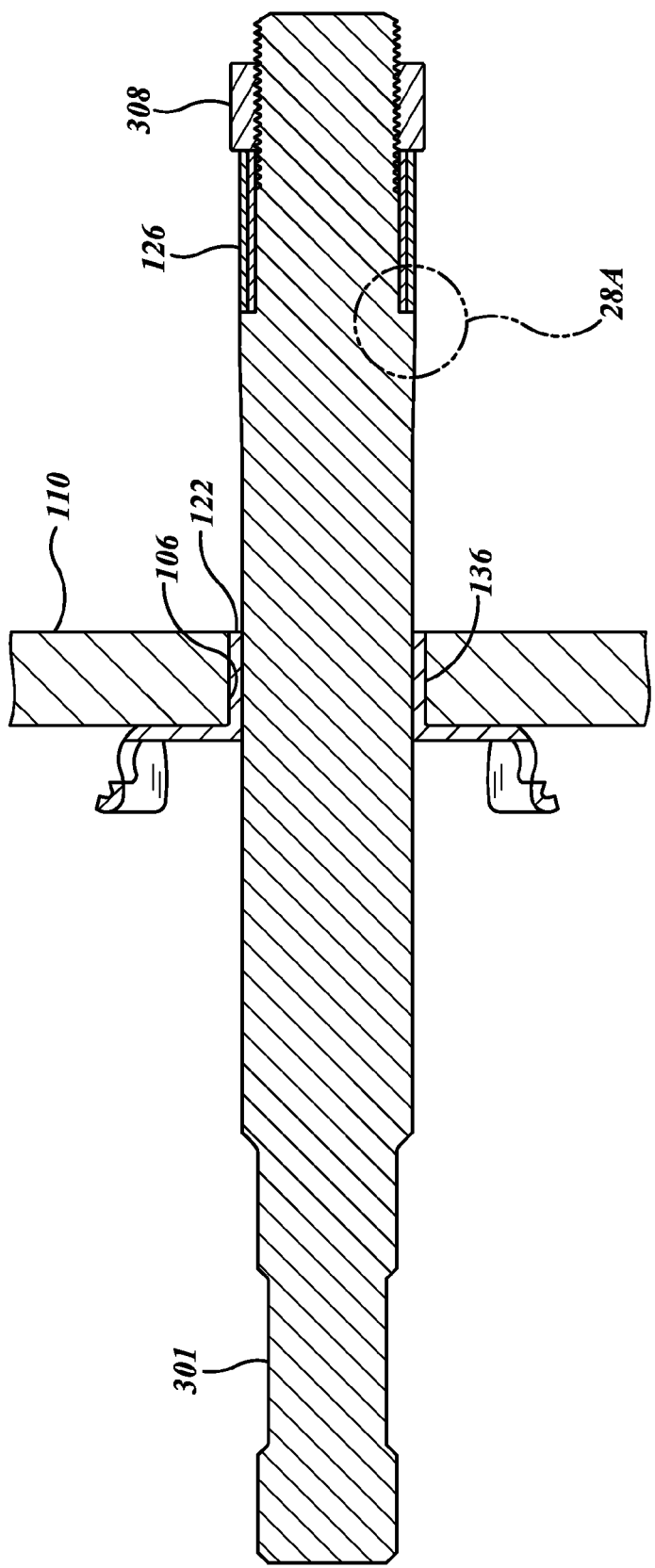
FIG. 26 is a cross-sectional view of the mandrel assembly of FIG. 24 operating to install a nut plate assembly in an opening of a structural workpiece.
Figure 27:
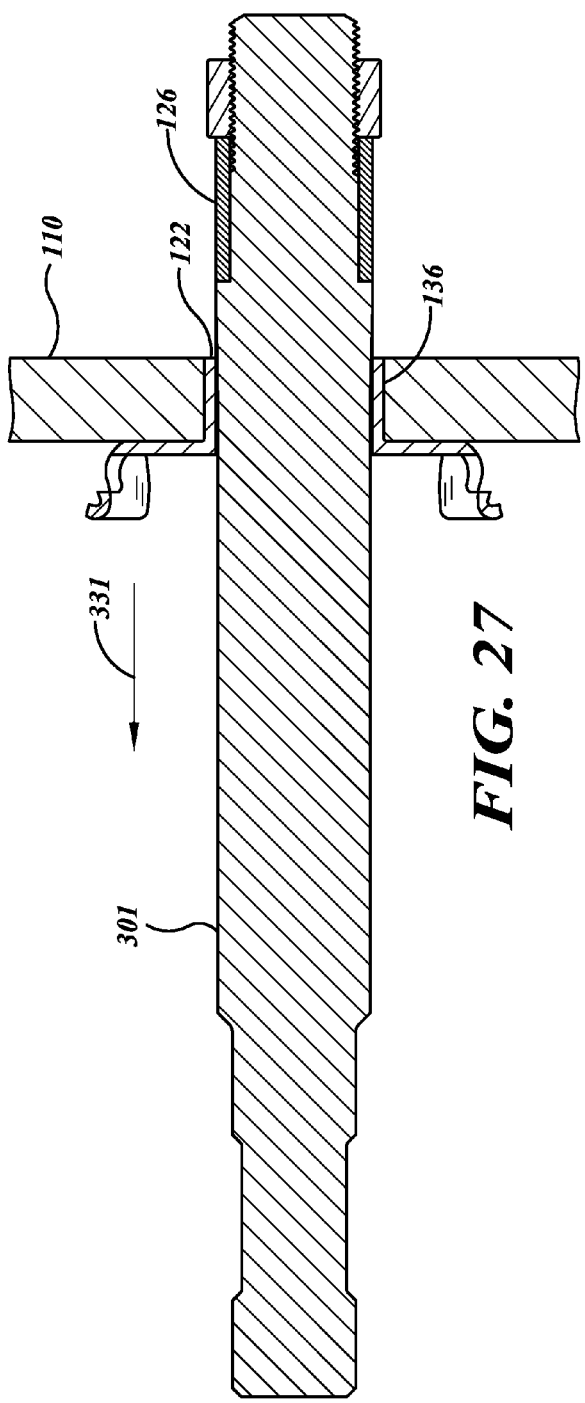
FIG. 27 is a cross-sectional view of the mandrel assembly of FIG. 26 showing an expandable member about to be moved into the radially expanded tubular body of a nut retainer.

The receiving surface 306 is positioned near the tapered region 304 and includes an outer perimeter 317 sized to receive an expandable member, such as the bushing 126 or bushing 284 described above. The outer perimeter 317 can be sized to receive (e.g., loosely receive with a clearance fit) an expandable member so as to minimize, limit, or substantially prevent damage to the inner surface of the expandable member. For example, when the bushing 126 of FIG. 26 is positioned along the receiving surface 306, the bushing 126 is axially fixed with respect to the mandrel 301. The bushing 126 can be pulled towards the retainer 122 as shown in FIG. 27.

The outer perimeter of the bushing 126 is sized to be equal to (e.g., maximum tolerance conditions) or at least slightly smaller than the inner perimeter 188 of the radially-expanded retainer 122. This relative sizing allows the bushing 126 to be passed (e.g., pulled, pushed, or both) into the retainer 122 such that the bushing 126 props open the tubular body 136. In some embodiments, the bushing 126 can be inserted into the tubular body 136 without damaging the bushing 126. The relative size of the radially expanded tubular body 136 can also permit the bushing 126 to be passed into the radially expanded tubular body 136 so that the tubular body 136 can contract (e.g., collapse, constrict, and the like) about the bushing 126. For example, the tubular body 136 can elastically contract to produce an interference fit with the bushing 126, which both supports and limits the radial contraction of the tubular body 136.

Figure 28A:
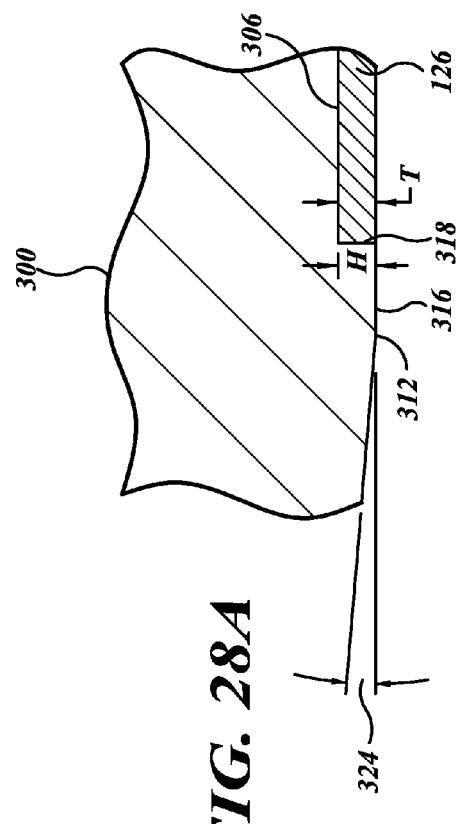
FIGS. 28A-28E are detailed views of regions of various mandrels carrying expandable members.
Figure 28B:
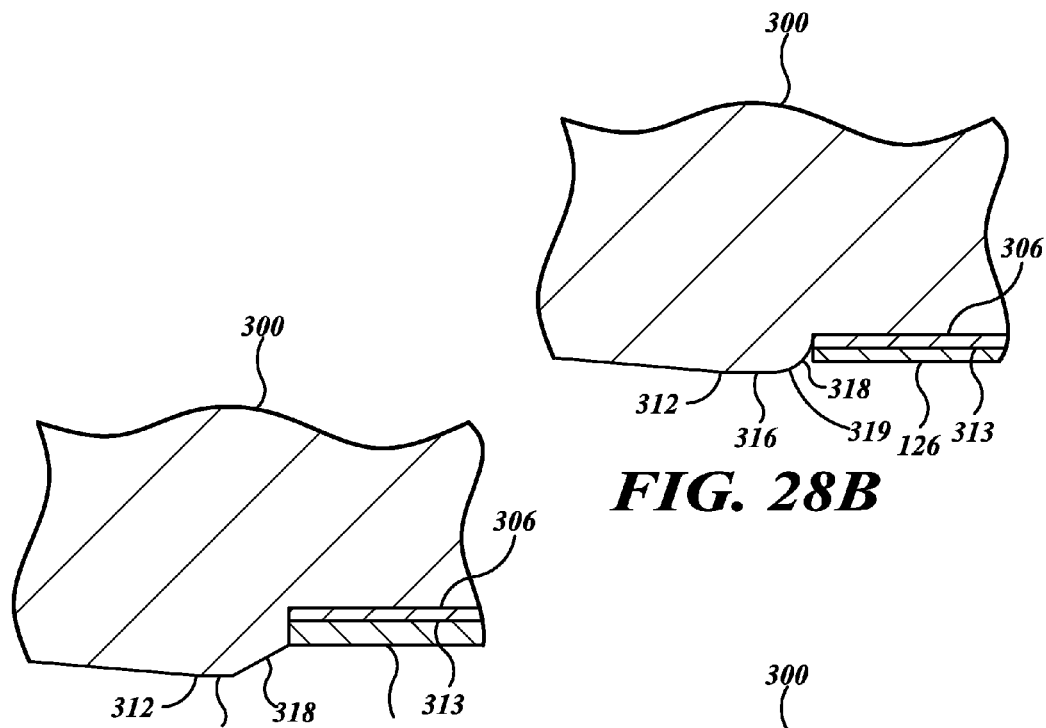

Referring to FIG. 28A, a shoulder 318 can transition between the maximum perimeter portion 312 or the uniform perimeter region 316 and the receiving surface 306. The illustrated shoulder 318 is in the form of an annular step. Other shoulder configurations are also possible.

Figure 28C:
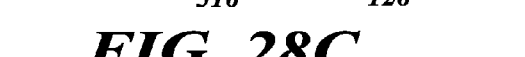
Figure 28D:
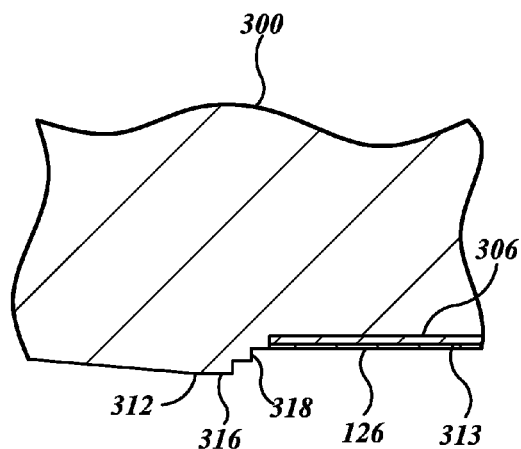
Figure 28E:
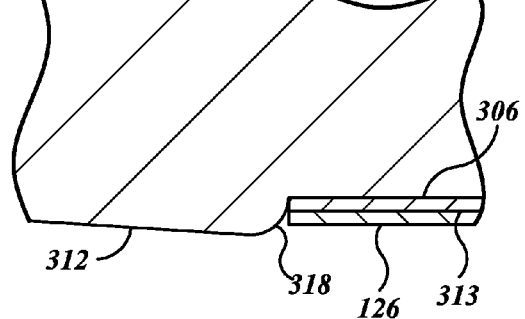

FIGS. 28B-28E show shoulders used to generate somewhat uniform distributions of residual stresses in the tubular body 136 of the retainer 122. The shoulder 318 of FIG. 28B defines an arcuate outer surface 319 extending from the uniform perimeter region 316 to the receiving surface 306. The tubular body 136 of the retainer 122 can cam easily over the shoulder 318 and onto the bushing 126. FIG. 28C shows a down-tapered shoulder 318. The rate of taper of the shoulder 318 can be increased or decreased to decrease or increase the distance between the bushing 126 and the uniform perimeter region 316. The shape, size, and position of the shoulder 318 can be selected based on the desired interaction between the mandrel 301 and the retainer 122. FIG. 28D shows the shoulder 318 comprising a plurality of steps from the uniform perimeter region 316 to the receiving surface 306. FIG. 28E shows the shoulder 318 connecting the maximum perimeter portion 312 to the receiving surface 306.

The height of the shoulder 318 can be selected based on the configuration of the bushing 126 and the installation process. FIG. 28A shows the shoulder 318 with a height H that is generally equal to the wall thickness T of the bushing 126. In some embodiments, the wall thickness T of the bushing 126 is less than the height H of the shoulder 318 of the mandrel 301. In some embodiments, at least a portion of the wall thickness T is greater than or equal to the height H. These relative sizes permit sliding of the bushing 126 into the radially-expanded tubular body 136 during installation without appreciably damaging these components.

Referring to FIGS. 28B-28E, the bushing 126 can include an engagement portion 313. The engagement portion 313 can be a layer (e.g., a coating or plating) of a wear resistant material, lubricant (e.g., an anti-fretting lubricant), or anti-fretting material that is applied to the bushing 126. The engagement portion 313 can reduce friction, for example friction between the bushing 126 and another component (not shown) that may move relative to the bushing 126.

One type of engagement portion 313 may be a silver coating applied for wear purposes. The coating may include an amount of silver iodide to enhance lubricity of the silver coating. Alternatively or additionally, the portion 313 can be made, in whole or in part, of a polymer, such as synthetic resin lubricants like polytetrafluoroethylene (PTFE), TEFLON®, nylon, NEDOX® CR+, blends, mixtures, and combinations thereof. These materials can be generally referred to as "soft" because they are generally softer than the main bushing material (e.g., bushing material comprising steel). Thus, these relatively soft engagement portions are generally more prone to being damaged during the installation process.

Figure 25:
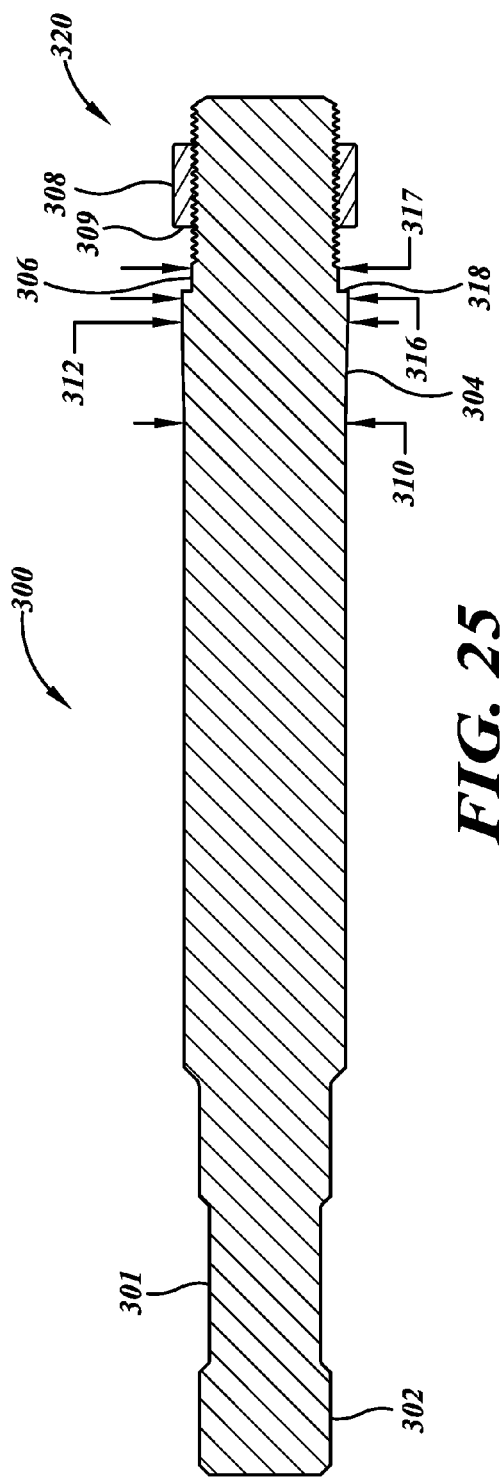
FIG. 25 is a cross-sectional view of the mandrel assembly of FIG. 24 taken along a line 25-25.

Referring again to FIGS. 24 and 25, the collar 308 is positioned downstream from the receiving surface 306 and engages the mandrel 301 to position the bushing 126 during the installation process. The receiving surface 306 is interposed between the shoulder 318 and the collar 308. As shown in the embodiment of FIG. 25, the collar 308 can serve as a stop to position the bushing 126 at least proximate to the shoulder 318 of the mandrel 301.

The illustrated collar 308 includes internal threads that engage a threaded region 320 of the mandrel 301. The collar 308 can be rotated about the threaded region 320 to adjust the distance between the shoulder 318 and the face 309 of the collar 308 for contacting the bushing 126. The collar 308, once placed on the mandrel 301, may be torqued down to provide at least a slight compression force on the bushing 126 depending on the compressive strength capacity of the bushing 126. In this manner, the collar 308 and shoulder 318 cooperate to limit or substantially prevent axial movement of the bushing 126 along the mandrel 301.

Figure 29:
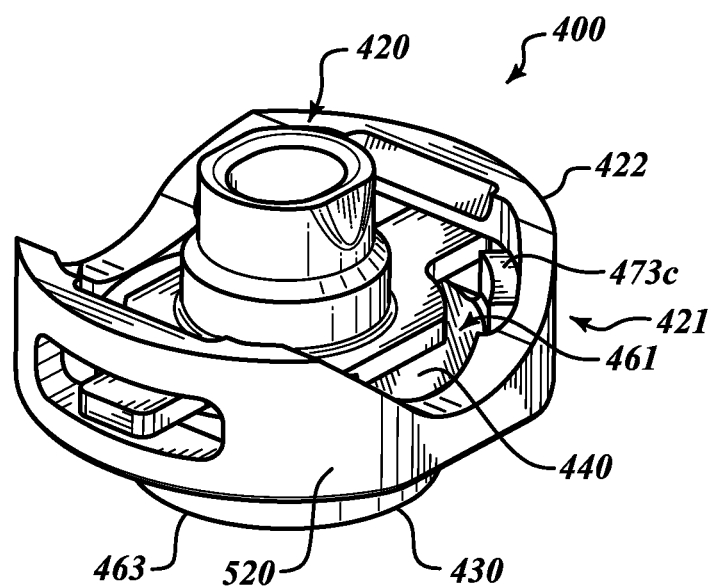
FIG. 29 is an isometric view of a nut plate assembly, according to one embodiment.
Figure 30:
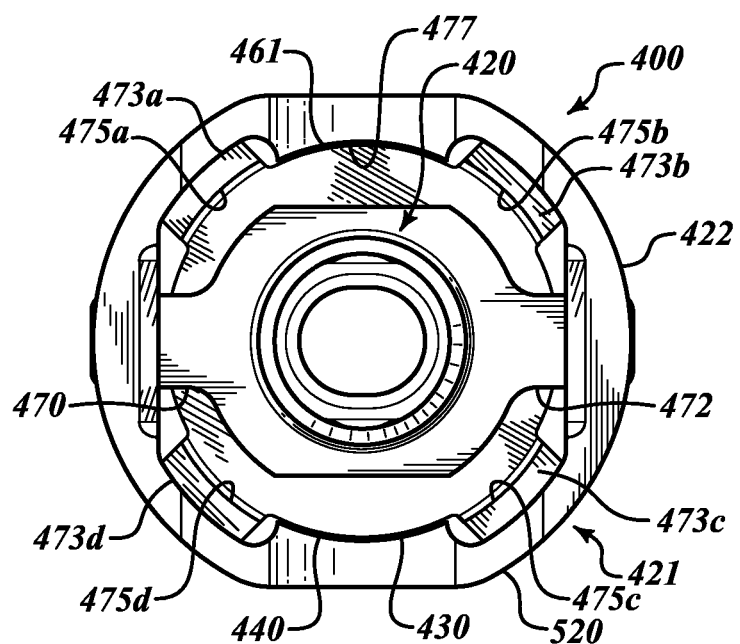
FIG. 30 is a top plan view of the nut plate assembly of FIG. 29.

FIGS. 29 and 30 show a rivetless modular nut plate assembly 400 that includes a nut 420 and a retainer assembly 421. The retainer assembly 421 includes a nut retainer 422, illustrated as a cage, and a retainer 430. When installed, the retainer 430 holds the cage 422 against the workpiece. The cage 422 can release the nut 420 without damaging any component of the nut plate assembly 400. Another nut can then be installed in the empty cage 422. The nut plate assembly 400 can be dissembled to inspect the installation, perform maintenance, combinations thereof, or the like.

Figure 31:
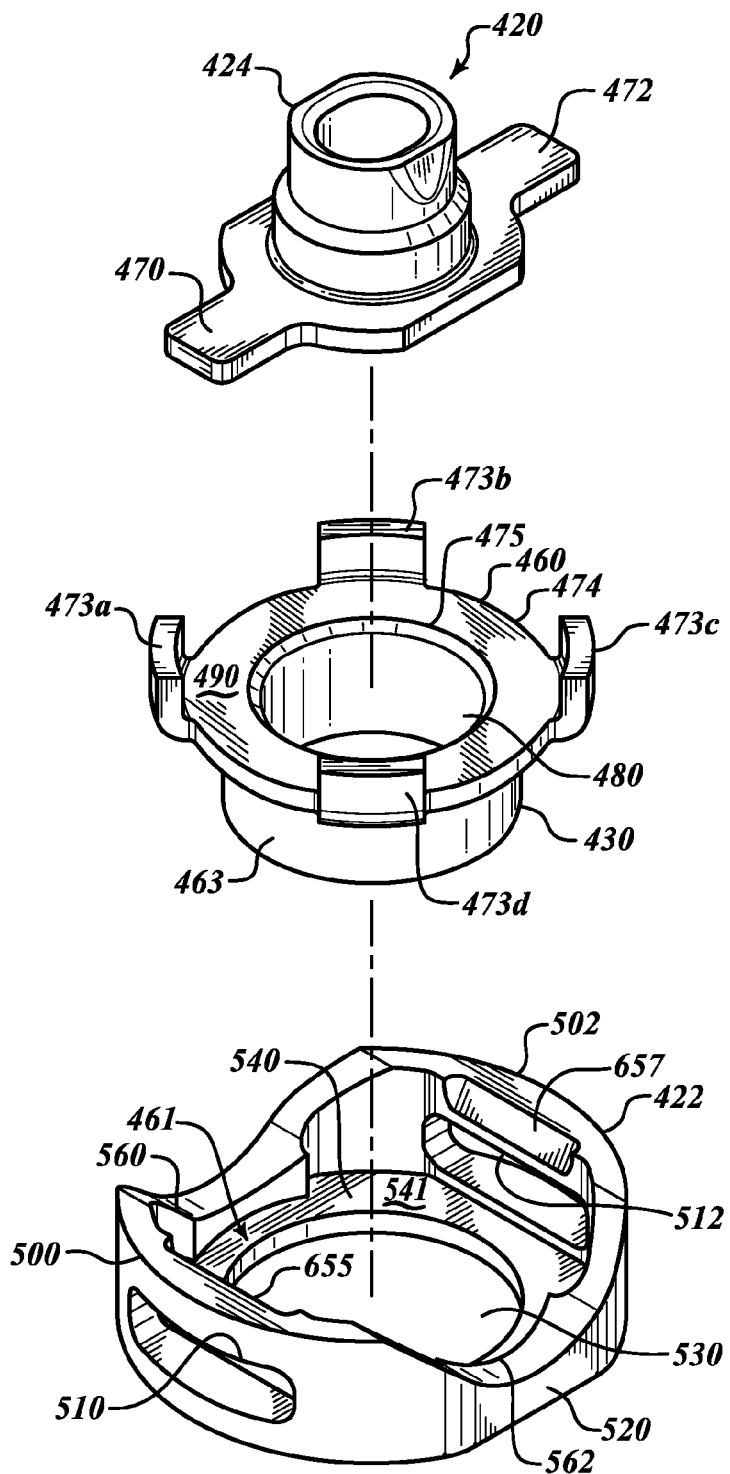
FIG. 31 is an exploded isometric view of the nut plate assembly of FIG. 29, according to one embodiment.
Figure 32:
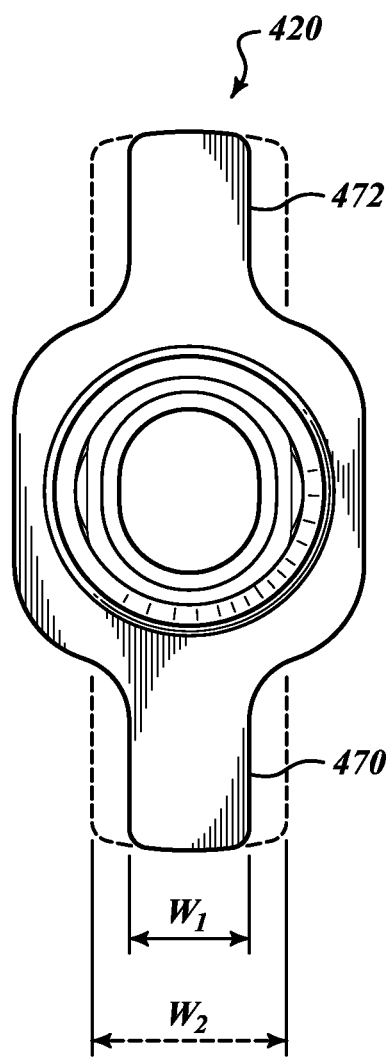
FIG. 32 is a top plan view of a nut, according to one embodiment.

Referring to FIGS. 31 and 32, the nut 420 has elongated members 470, 472 capable of mechanically coupling to the cage 422. To decrease or increase the distance that the nut 420 is allowed to float, the widths of the elongated members 470, 472 can be increased or decreased, respectively. For example, each of the elongated members 470, 472 can have a width $W_1$ that is increased to $W_2$ (shown in dashed line in FIG. 32) to reduce the distance the nut 420 is allowed to float. As viewed from above, the elongated members 470, 472 can have substantially rectangular shapes (illustrated in FIGS. 31 and 32), substantially trapezoidal shapes, tapered shapes, or the like.

The retainer 430 of FIG. 31 includes a mounting plate 460 receivable in a receiving space 461 of the cage 422 and an expandable member 463 (illustrated as a tubular member) extending away from the mounting plate 460. The mounting plate 460 includes four tabs 473a-d (collectively 473) connected to an outer periphery 474 of the mounting plate 460. The four tabs 473 are generally equally spaced about a central throughhole 480. Any number of tabs 473 with different spacing can be used to provide the desired relative movement, if any, between the retainer 430 and the cage 422. In other embodiments, the retainer 430 includes a mounting plate without any tabs. The cage 422 may include one or more protrusions, tabs, tangs, barbs, stops, combinations thereof, or other features used to physically contact and retain the retainer 430.

The mounting plate 460 of FIG. 31 is a generally flat disc with a substantially flat face 490. An inner periphery 475 of the mounting plate 460 defines one end of the throughhole 480. The nut 420 can lay flat along the surface 490 to align a nut 424 with the throughhole 480. In some embodiments, the mounting plate 460 is in the form of a rigid flange extending radially outward from the retainer 430.

The retainer 430 can have a one-piece construction or a multi-piece construction. In one-piece embodiments, a single piece of material is monolithically formed into a desired configuration via a machining process, a molding process, combinations thereof, or the like. For example, the mounting plate 460 can be integrally formed with the expandable member 463. In multi-piece embodiments, the mounting plate 460 can be a stamped plate that is coupled (e.g., welded) to an extruded or machined expandable member 463.

With continued reference to FIG. 31, the cage 422 includes retention elements 500, 502 with diametrically opposed openings 510, 512, respectively. The retention elements 500, 502 can be spaced apart so as to allow the retainer 430 to nest therebetween. Each opening 510, 512 is illustrated as an elongated slot.

The cage 422 further includes an abutment portion 540 and stops 560, 562. The stops 560, 562 can physically contact the tabs 473 to minimize, limit, or substantially prevent rotational movement of the retainer 430 with respect to the cage 422. The illustrated stops 560, 562 are thickened sections of a sidewall 520.

The abutment portion 540 is a generally planar member that extends inwardly from the sidewall 520 and defines a throughhole 530. The retention elements 500, 502 and the abutment portion 540 can be connected together such that the retention elements 500, 502 can be deflected away from one another in order to receive the nut 420. In some embodiments, the abutment portion 540 has a face 541 that is substantially geometrically congruent to a face 544 (see FIG. 33) of the mounting plate 460. Because most of the surface area of the face 541 contacts the mounting plate 460, contact stresses can be kept at or below an acceptable level. The footprint of the retainer assembly 421 can be significantly smaller than conventional nut plates and provide high clamp up forces.

Referring again to FIGS. 29 and 30, the components of the nut plate assembly 400 can be made of a wide range of different materials. The cage 422 can comprise a material that is different from the material of the retainer 430. For example, the cage 422 can be made of a non-metallic material, and the retainer 430 can be made of a metallic material. Non-metallic materials include, but are not limited to, polymers, plastics, composites, ceramics, or combinations thereof. Plastics include, without limitation, polyimides, polyamide, polyamide-imide (PAI) materials, nylon, polyurethane, polyester, polyvinyl-chloride (PVC), blends, combinations thereof, or other types of engineering plastics.

The nut 420 can be made, in whole or in part, of a material (for example, metal) that is substantially more rigid than the material of the non-metallic cage 422. Such embodiments are well suited for manual installation.

In some embodiments, the cage 422 and the retainer 430 are made of the same material. Such embodiments are well suited for reducing corrosion between components of the nut plate assembly 400. In high temperature applications, both the cage 422 and the retainer 430 can be made of metal, such as stainless steel, aluminum, titanium, or any other suitable metal that maintains its dimensional stability even at high temperatures (e.g., at temperatures above 400° C.). In some embodiments, for example, both the cage 422 and the retainer 430 are made of a metallic material to inhibit, reduce, or eliminate corrosion at the contact interfaces.

The composition of the components of the nut plate assembly 400 can be selected based on known design criteria, including desired overall weight, strength to weight ratios, impact resistance, heat resistance, chemical resistance, corrosive properties, electrical properties, fatigue resistance properties, dimensional stability, combinations thereof, or the like. The composition of the components can also be selected based on the properties of the workpiece. If the nut plate assembly 400 is to be installed in a composite workpiece, the cage 422 can be made of a material that is softer than the composite material to minimize, limit, or substantially prevent damage (including wear, corrosion, cracking, or the like) to the workpiece. Even though the cage 422 is made of a relatively soft material (e.g., TORLON®), the nut 420 can be repeatedly removed from the cage 422 without irreversibly damaging the cage 422. Relatively high clamp up forces may thus be achieved without damaging the workpiece. If the nut plate assembly 400 is to be installed in a metal workpiece, the cage 422 can be made of metal.

The cage 422 can comprise a material with an ultimate strength or yield strength that is less than about half of an ultimate strength or yield strength, respectively, of a material of the retainer 430. In some embodiments, for example, the cage 422 comprises a polyamide-imide material with a yield strength in a range of about 100 MPa to about 110 MPa, and the retainer 430 can comprise a material with a yield strength greater than about 200 MPa. Such retainer 430 can be made of aluminum, steel, titanium, combinations thereof, or the like. In some embodiments, the retainer 430 comprises a material with a yield strength greater than both a yield strength of the cage 422 and a yield strength of the workpiece. For example, the retainer 430 can be made of metal, the cage 422 can be made of plastic, and the workpiece can be made of a composite material, such as CFRP.

Coatings (e.g., metallic coatings or non-metallic coatings, or both) can be formed onto the nut cage assembly 400. In some embodiments, the cage 422 is a non-metallic part that is partially coated with metal. The metal coating can provide an aesthetically appealing appearance. In some embodiments, the coated cage 422 comprises at least 75%, 85%, 90%, or 95% by weight of a non-metallic material. Additionally or alternatively, the expandable member 463 can be coated with one or more lubricants to facilitate installation. In certain embodiments, a dry film lubricant facilitates sliding of a mandrel assembly along the expandable member 463.

Figure 33:
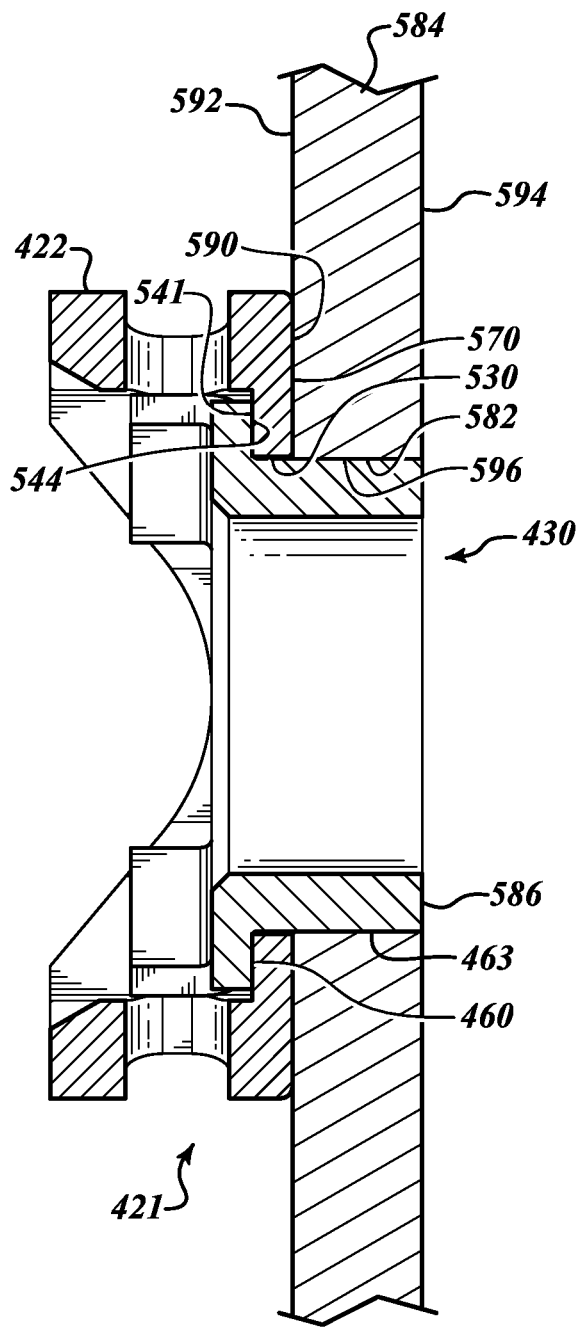
FIG. 33 is a cross-sectional view of a workpiece and a retainer assembly in the workpiece.
Figure 34:
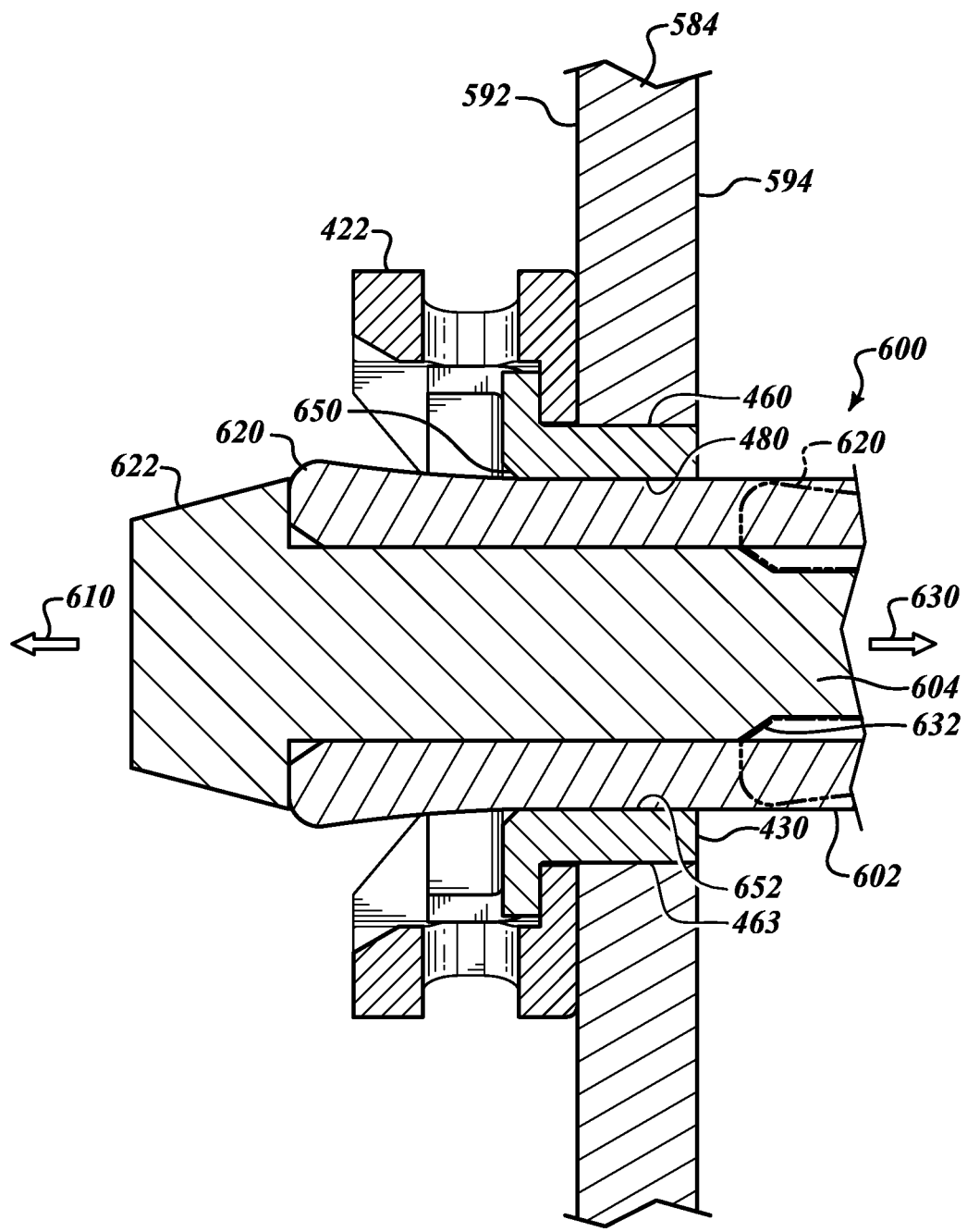
FIG. 34 is a cross-sectional view of a mandrel assembly and a retainer assembly. The mandrel assembly is ready to expand a retainer of the retainer assembly.
Figure 35:
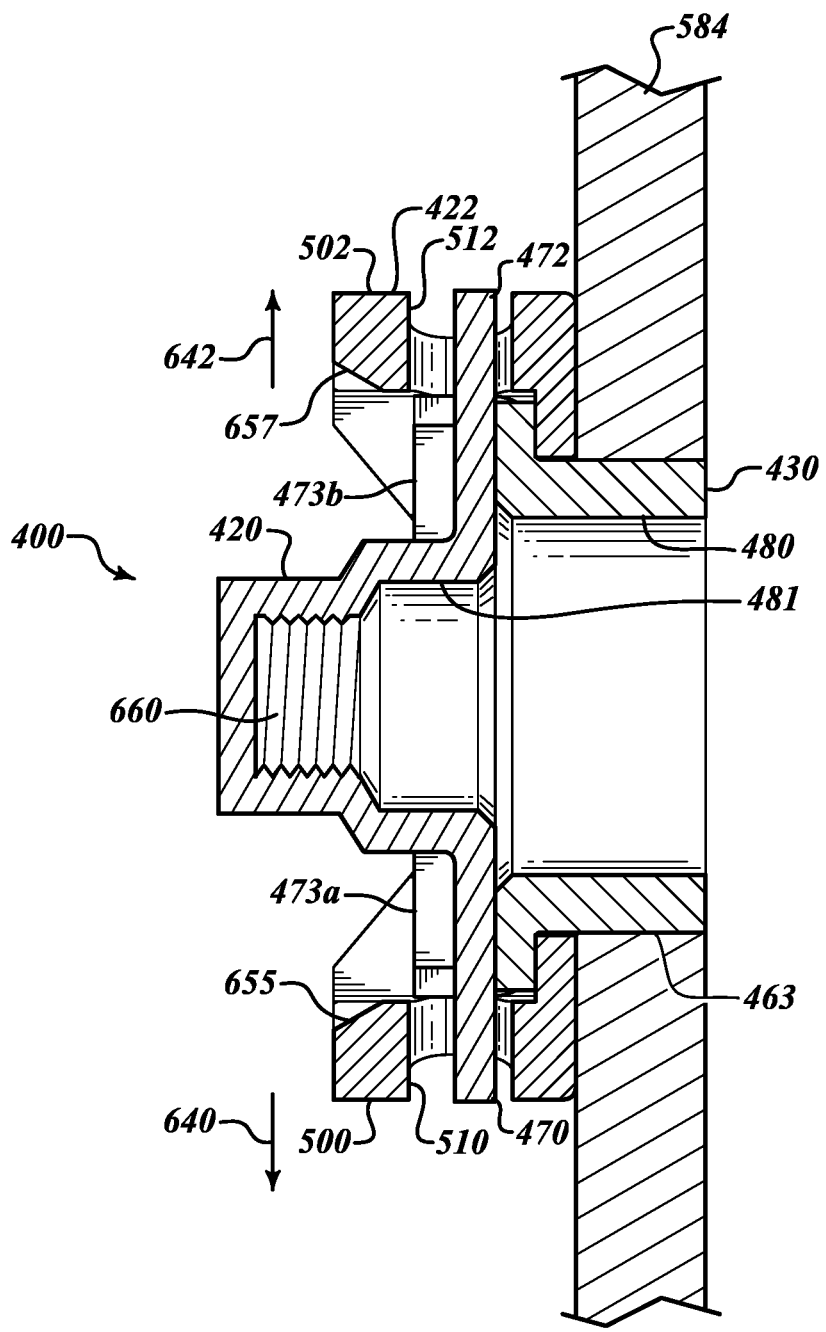
FIG. 35 is a cross-sectional view of a nut plate assembly after a retainer has been expanded.

FIGS. 33-35 show one process for installing the nut plate assembly 400. Generally, the expandable member 463 is inserted through the throughhole 530 of the cage 422. The expandable member 463 is then inserted through an opening 582 of a workpiece 584. An engagement face 590 of the cage 422 is seated against a first surface 592 of the workpiece 584. An installation tool expands the expandable member 463 to couple the retainer 430 to the workpiece 584. The nut 420 can then be fitted into the installed cage 422. Details of the installation process are discussed below.

FIG. 33 shows the retainer assembly 421 ready to be fixedly coupled to the workpiece 584. To assemble the retainer assembly 421, the expandable member 463 is inserted through the throughhole 530 of the cage 422. The mounting plate 460 is moved into contact with the abutment portion 570. An end 586 of the expandable member 463 can be passed through the opening 582 to bring the abutment portion 570 into contact with the first surface 592. As shown in FIG. 33, the abutment portion 570 can be sandwiched between the mounting plate 460 and the workpiece 584. The end 586 can be generally flush with or proximate to a second surface 594 of the workpiece 584. If the workpiece 584 is a thin sheet (e.g., a section of sheet metal), the end 586 can protrude from the second surface 594. If the workpiece 584 has a relatively large thickness, the end 586 may be positioned at some point along a longitudinally-extending passageway 596 of the opening 582.

The expandable member 463 can extend along an entire longitudinal length of the opening 582. In some embodiments, a length of the section of the expandable member 463 that forms an interference fit with the workpiece 584 has a length of at least about 1 mm, 1.5 mm, 2 mm, or 3 mm. The length can be selected based on the desired grip length. The expandable member 463, in some embodiments, can be sufficiently long to provide a grip length of at least about 1.5 mm for many types of aerospace applications.

FIG. 34 shows a mandrel assembly 600 ready to install the retainer 430. Generally, the mandrel assembly 600 can be inserted through the retainer 430. The mandrel assembly 600 can then assume an expanded configuration such that, when the mandrel assembly 600 is moved back through the retainer 430, the expandable member 463 is expanded.

The mandrel assembly 600 includes an inner member 604 and a slotted outer member 602 that slides along the inner member 604. As disclosed in U.S. Pat. No. 7,509,829, which is incorporated by reference herein in its entirety, the slotted outer member 602 can slide in a direction indicated by an arrow 630 past a transition section 632 (e.g., a stepped or tapered section). As the outer member 602 slides along the transition section 632, the outer member 602 moves to a collapsed configuration (illustrated in dashed line in FIG. 34). The mandrel assembly 600 is inserted through the retainer assembly 421 in a direction indicated by an arrow 610.

As the outer member 602 moves along the tapered section 632, the outer member 602 expands such that the maximum circumference of a tapered section 620 is larger than an inner diameter of the throughhole 480 of the retainer 430. The mandrel assembly 600 can be moved in a direction indicated by the arrow 630 to bring the tapered section 620 into physical contact with the expandable member 463 to begin the expansion process.

To facilitate the expansion process, the retainer 430 includes a chamfer 650 extending about the throughhole 480. The tapered section 620 can slide along the chamfer 650 to align the mandrel assembly 600 with the throughhole 480. The retainer 430 can have other types of features to reduce installation time, improve installation consistency, or the like.

FIG. 35 shows the retainer 430 in an expanded state. The nut 420 can be snap-fit into the cage 422 by inserting the elongated members 470, 472 into corresponding openings 510, 512. Angled surfaces 655, 657 (e.g., chamfers) of the retention elements 500, 502, respectively, can facilitate the assembly process. The angled surfaces 655, 657 help guide relatively large nuts into the cage 422. In some embodiments, an installer can manually snap-fit the nut 420 into the cage 422. As the nut 420 is pressed into the cage 422, the retainer 430 remains securely coupled to the workpiece 584. Of course, as shown in FIG. 35, there is some amount of play because the elongated arms 470, 472 are smaller than the openings 510, 512.

Because nuts may have different shapes and dimensions, the retention elements 500, 502 can be spread apart (indicated by arrows 640, 642) a wide range of distances. To receive relatively large nuts without experiencing significant damage, the cage 422 can be made of a resilient material capable of experiencing significant elastic deformation. The cage 422 can be provided with different types of features to achieve different types of snap-fits.

The cage 422 of FIG. 35 can securely hold the nut 420 even if significant loads (including static loads, cyclic loads, or both) are applied. To remove the nut 420, the retention elements 500, 502 can be manually moved apart manually or by using removal equipment. Advantageously, the cage 422 can be repeatedly deformed without appreciable plastic deformation.

A component can be threadably coupled to an internal threaded portion 660 of FIG. 35 of the nut 420. The retainer 430, cage 422, and nut 420 can remain locked together as the threaded component is installed. The dimensions of the throughhole 480 of the retainer 430 and an unthreaded portion 481 of the nut 420 can be selected to provide the desired amount of clearance. For example, if a bolt is installed into the nut plate 400, the diameter of the throughhole 480 and the unthreaded portion 481 can be selected to achieve the desired amount of bolt clearance to facilitate rapid installation.

Figure 36:
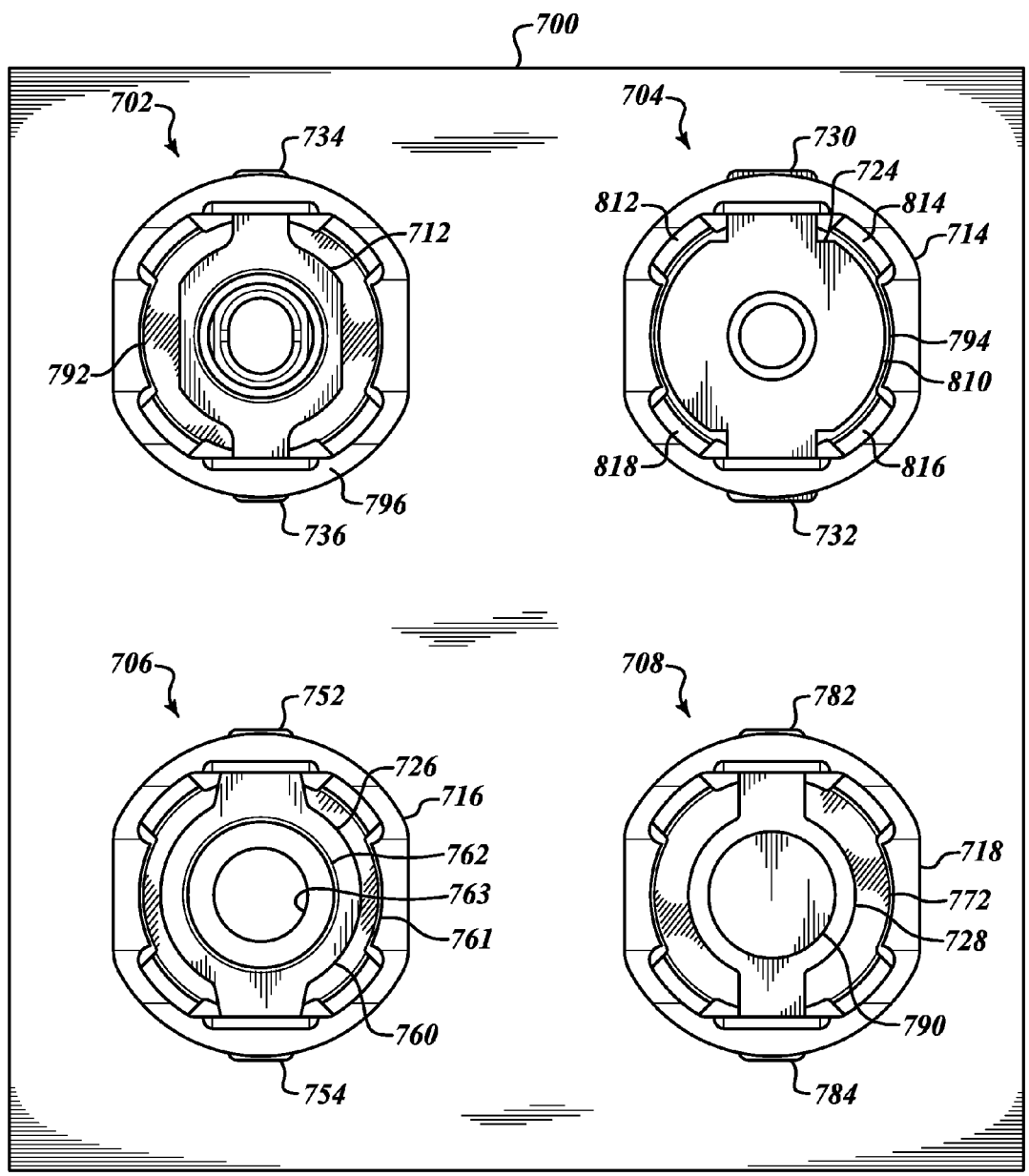
FIG. 36 is a top plan view of nut plate assemblies installed in a workpiece.

FIG. 36 shows nut plate assemblies 702, 704, 706, 708 installed in a workpiece 700. The nut plate assemblies 702, 704, 706, 708 have a common cage design (for example, substantially geometrically congruent cages 712, 714, 716, 718). Nuts 722, 724, 726, 728 with different configurations are installed in the cages 712, 714, 716, 718 and can be switched or replaced. A wide range of different types of conventional nuts (e.g., closed-ended nuts, open-ended nuts, threaded nuts, collapsible nuts, quick-release elements, or the like) can be installed in the cages 712, 714, 716, 718. The components of the nut plate assemblies 702, 704, 706, 708 can be selected to achieve a desired amount of floating (e.g., nut float, bolt float or clearance, etc.) or bolt clearances. The nut plate assemblies 702, 704, 706, 708 can be generally similar to one another and, accordingly, the description of one applies equally to the others, unless indicated otherwise. Details of the nut plate assemblies 702, 704, 706, 708 are discussed below.

The nut 722 can be generally similar or identical to the nut 420 discussed in connection with FIGS. 29-35. The nut 724 has elongated members 730, 732 that are wider than elongated members 734, 736 of the nut 722. The elongated members 730, 732 allow less floating (e.g., rotational movement, translation, etc.) of the nut 724 as compared to the nut 722.

The nut 726 has tapered elongated members 752, 754 connected to an annular mounting plate 760. A hollow nut 762 is connected to the annular mounting plate 760 resting against an abutment portion 761 of the cage 716. The hollow nut 762 is an open-ended tubular member with internal threads 763.

The angles of taper, the widths, and thicknesses of the elongated members 752, 754 can be selected to achieve the desired interaction with the cage 716.

The nut 728 includes a circular mounting plate 772, generally rectangular elongated members 782, 784, and a closed-ended nut 790. The nut 728 is well suited for installation in wet settings.

The highly flexible cages 712, 714, 716, 718 can receive and hold a wide range of different types of components. U.S. Pat. Nos. 5,468,104; 6,077,010; 6,183,180; and U.S. application Ser. Nos. 10/928,641; 11/445,951, which are all incorporated by reference in their entireties, disclose nuts, (including closed-ended nuts, open-ended nuts, multi-piece nuts, etc.), housings, caps, nut/cap assemblies, fasteners, and other components that can be incorporated into the nut plate assemblies discloses herein. The cages provide dimensional stability, even after a long service life, so that different devices can be coupled to the workpiece using the nut plate assemblies.

The nut plate assemblies 702, 704, 706, 708 can be installed sequentially or concurrently. A single mandrel assembly can be used to install the nut plate assemblies 702, 704, 706, 708 sequentially. Alternatively, multiple installers can concurrently install the nut plate assemblies 702, 704, 706, 708 to reduce overall installation time.

The installation techniques and equipment for installing the nut plate assemblies 702, 704, 706, 708 can be selected based on the design of the components of the assemblies. The nut plate assemblies 702, 704, 706, 708 can be contained in prepackaged kits that contain an array of nuts so that the user can select an appropriate nut for an application. A retainer 792 of the nut plate assembly 702 can be installed in a first hole of the workpiece 700 using a multi-piece mandrel. A retainer 794 of the nut plate assembly 704 can be installed in a hole of the workpiece 700 using a split sleeve and a one-piece mandrel.

The illustrated nut 724 has a plate 810 that is closely received by tabs 812, 814, 816, 818 of the retainer 794. The shape of the plate 810 and the tabs 812, 814, 816, 818 cooperate to allow the nut 724 to float with a desired amount of movement.

Figure 37:
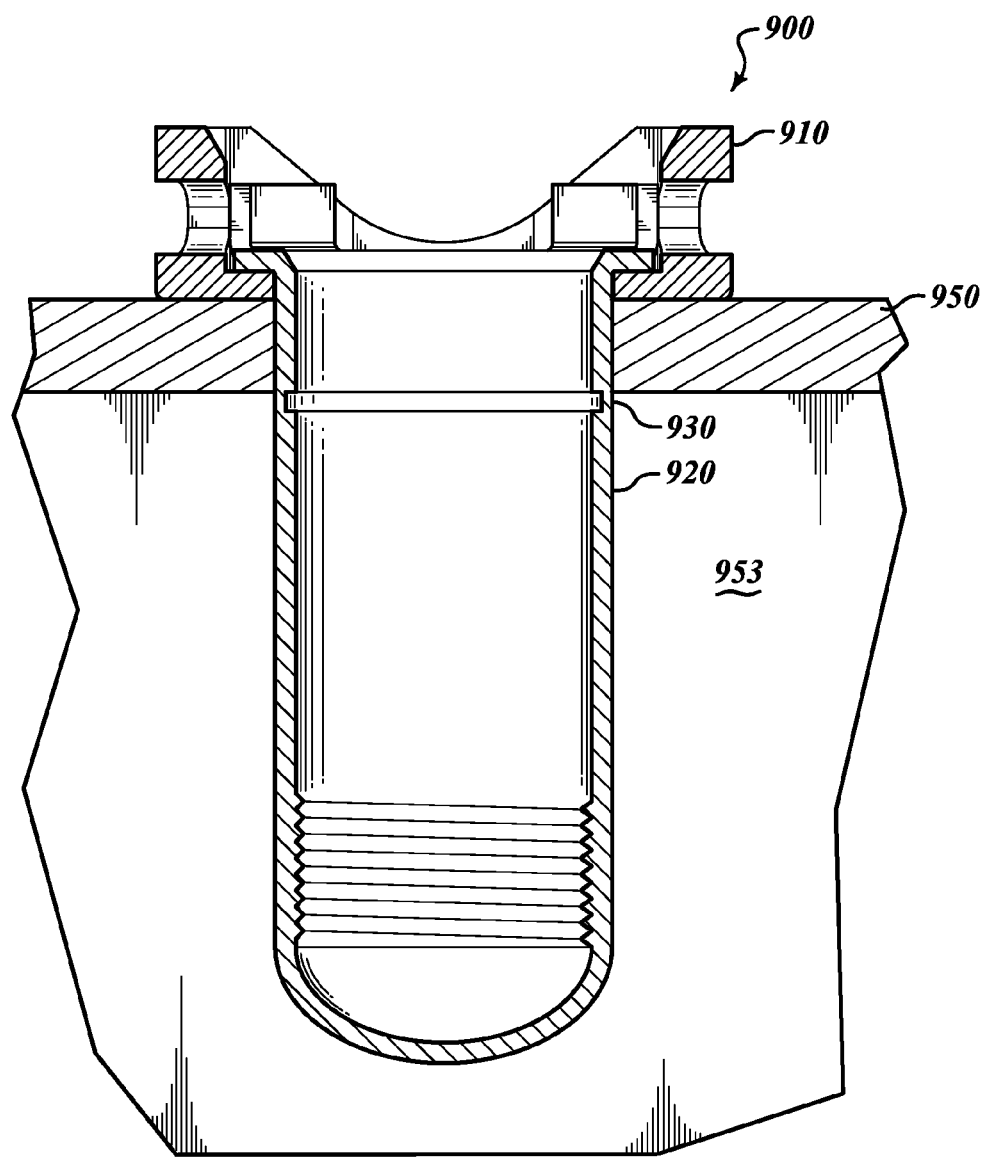
FIG. 37 is a cross-sectional view of a retainer assembly with a closed-ended retainer ready to be installed in a workpiece, according to one embodiment.
Figure 38:
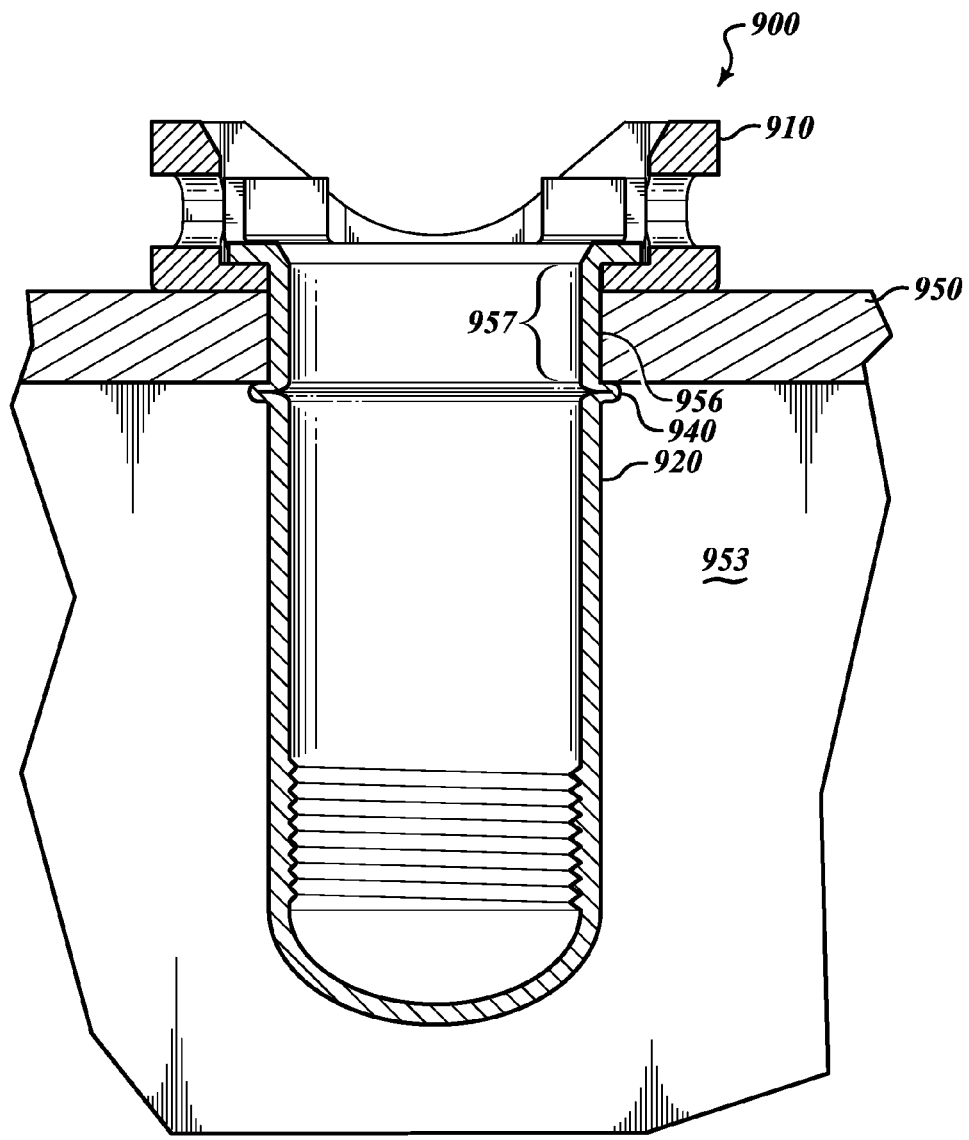
FIG. 38 is a cross-sectional view of the retainer assembly of FIG. 37 after the retainer has been fixedly coupled to the workpiece.

FIGS. 37 and 38 show a nut plate assembly 900 well suited for blind installations. The nut plate assembly 900 includes a cage 910 and a retainer 920. The retainer 920 includes a deformable region 930 (FIG. 37) that can form a flange 940 (FIG. 38) on a backside 953 of a workpiece 950.

If the workpiece 950 is a wall of a tank or other pressurized structure, a fluid tight seal (e.g., a liquid tight seal, a gas tight seal, or both) can be formed between the workpiece 950 and the retainer 920. If the workpiece 950 is a fuel tank of an aircraft, the backside 953 (i.e., the inside chamber of the fuel tank) can be highly pressurized. A fluid tight seal 956 (see FIG. 38) can keep the pressurized fuel in the fuel tank. To form the seal 956, an integral expandable portion 957 can be expanded into the workpiece 950. Such a seal can be formed even if the workpiece 950 is made of a composite material. Of course, the expandable portion 957 can include one or more bushings that may be used to prop open the expanded portion 957 of the retainer 920. The amount of expansion of the expandable portion 957 can be selected based on the properties of the workpiece 950.

U.S. Pat. Nos. 6,487,767 and 6,990,722; and application Ser. No. 10/928,641 (corresponding to U.S. Publication No. US2006/0045649) disclose different types of fasteners, deformable regions/features, installation apparatuses, expandable portions, and installation techniques that can be used in combination with or incorporated into the nut plate assembly 900, as well as with other embodiments and features disclosed herein. U.S. Pat. Nos. 6,487,767 and 6,990,722; and application Ser. No. 10/928,641 are hereby incorporated by reference in their entireties. By way of example, the retainer 920 can be installed using the techniques disclosed in the incorporated patents and/or application.

Features can be incorporated into the nut plate assemblies disclosed herein to facilitate installation, enhance performance, improve aesthetics, reduce installation times, or the like. For example, retainers can include one or more wave relieving geometric features (e.g., wave relieving geometric features disclosed in U.S. application Ser. No. 11/796,545, filed Apr. 27, 2007, corresponding to U.S. Publication No. US2007/0289351), wave inhibitors (e.g., wave inhibitors disclosed in U.S. application Ser. No. 12/399,817), or the like. An expandable portion or member of a retainer can include a wave inhibitor in the form of a tapered section adapted to radially expand the workpiece. The tapered section can accommodate displaced material (e.g., material of the expandable member and/or workpiece) so as to substantially prevent stress concentrations associated with the displaced material in the region of the workpiece radially adjacent to the wave inhibitor. Such wave inhibitors are especially well suited for controlling or limiting compressive stresses in composite workpieces or other types of workpieces susceptible to damage due to significant stress gradients. Accordingly, substantially uniform stresses can be produced throughout the thickness of the workpiece.

Figure 39:
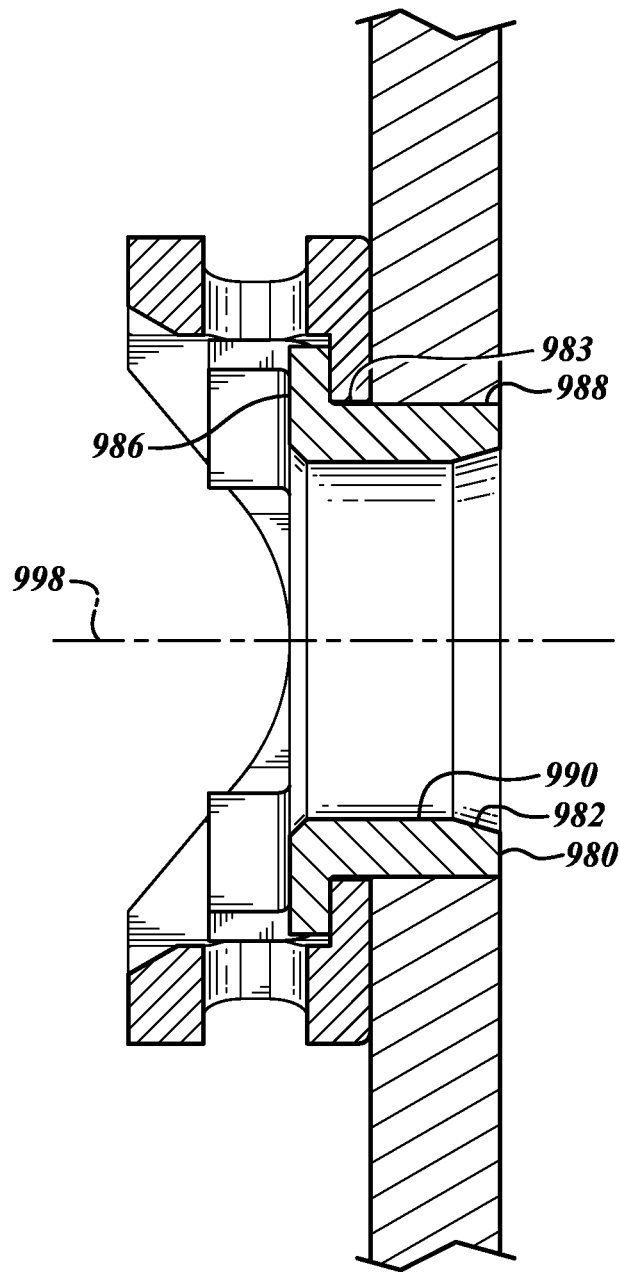
FIG. 39 is a cross-sectional view of a retainer assembly ready to be installed, according to one embodiment.

FIG. 39 shows an expandable member 980 that includes a wave inhibitor 982. A first end 983 of the expandable member 980 is coupled to a mounting plate 986. A second end 988 of the expandable member 980 opposes the first end 983. A passageway 990 extends between the first end 983 and the second end 988 and tapers outwardly proximate the second end 988 to define the wave inhibitor 982. The taper can be substantially uniform or may vary with respect to a longitudinal axis 998 of the expandable member 990.

Various types of manufacturing processes can be used to make the various embodiments described herein. Stamping processes, machining processes, bending processes, extrusion processes, molding processes, or the like can be used to produce the disclosed features and components disclosed herein. To form a metal nut retainer, a flat sheet of metal can be cut and formed into a desired configuration. To form a non-metallic nut retainer, an injection molding process can be used to mold a non-metallic material into a desired configuration. Different parts or features of the nut retainer assemblies can be made of different materials to enhance performance, increase strength to weight ratios, reduce overall weight, improve fatigue performance, reduce installation times, combinations thereof, or the like.

The nut plate assemblies disclosed herein can provide a high-level electrical conductivity, sealing (with or without added sealants), enhanced hole compression strength, enhanced fatigue performance, increased bearing strength for reduced fastener diameters, and reduce wear along workpiece holes. The nut plate assemblies can have reduced installation times as compared to conventional rivetless nut plates. Because common parts are used, there is a reduced part count and reduced difficulty in selecting appropriate components to install with each nut plate. If nut plate assemblies are installed in aerospace applications, nut plates with the same or similar cage designs can be installed to avoid or mitigate problems associated with installing multiple cage designs. The nut cage assemblies with plastic components have a relatively low weight and enhanced versatility with respect to corrosion. Plastic cages are especially well suited for use with metal, composite, and plastic workpieces.

Different clearances (e.g., fastener shank clearances, throughhole clearances, or the like) can be provided using a single modular nut plate assembly. Nuts with different configurations can be installed to provide different amounts of float for 5 mm bolt clearance, 3 mm bolt clearance, 1.5 mm bolt clearance, 1 mm bolt clearance, or the like. The distance of nut float can be about 0.03 inch (0.76 mm), 0.06 inch (1.52 mm), 0.12 inch (3.05 mm), or the like. An installer can select an appropriate nut for achieving the desired amount of float for a desired bolt clearance. For example, an installer can select a type of nut plate assembly based on installation conditions, such as whether the nut plate assembly will be subjected to high temperatures and/or low temperatures. Based on operating conditions and environment (e.g., a wet environment, such as a fuel tank), the nut (e.g., a quick release member, an open member, or a closed member, or the like) can be selected. The fastener size and amount of nut float, fastener clearance (e.g., bolt clearance), or the like can be selected. The installer can select an appropriate combination of components to provide the desired installation. Because the nut plate assemblies are modular, components can be easily mixed and matched to provide for different installations and different fits throughout the service of the workpiece.

Figure 40:
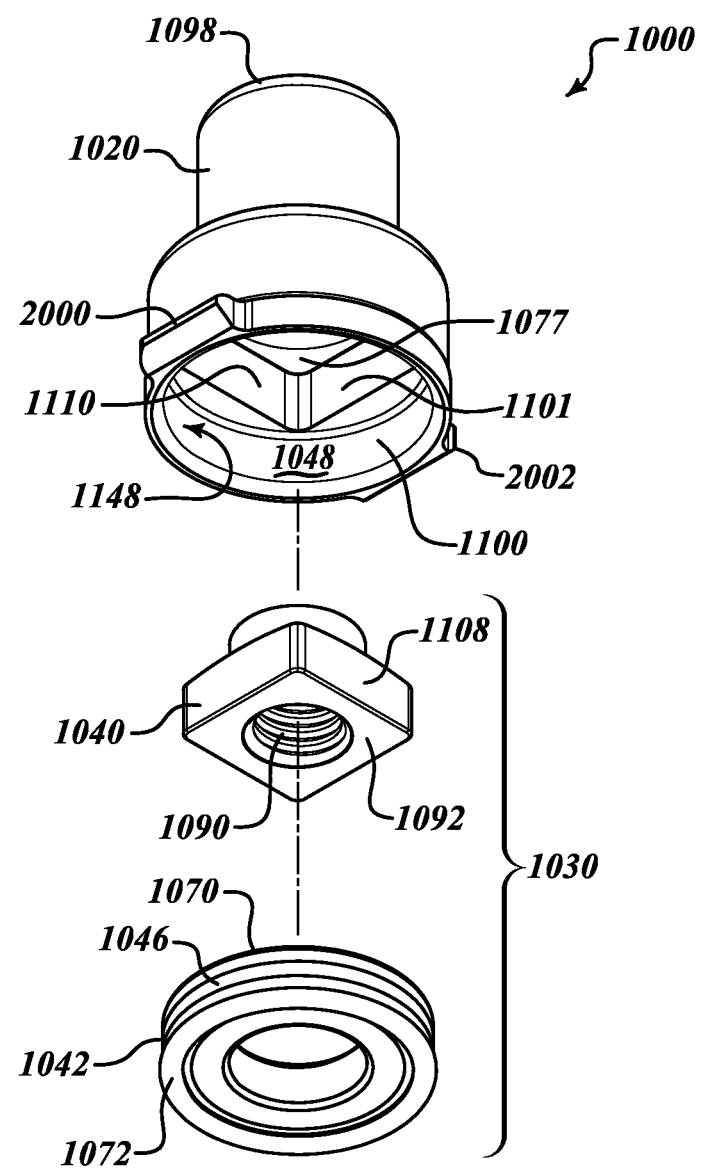
FIG. 40 is a bottom exploded isometric view of a nut, according to one embodiment.
Figure 41:
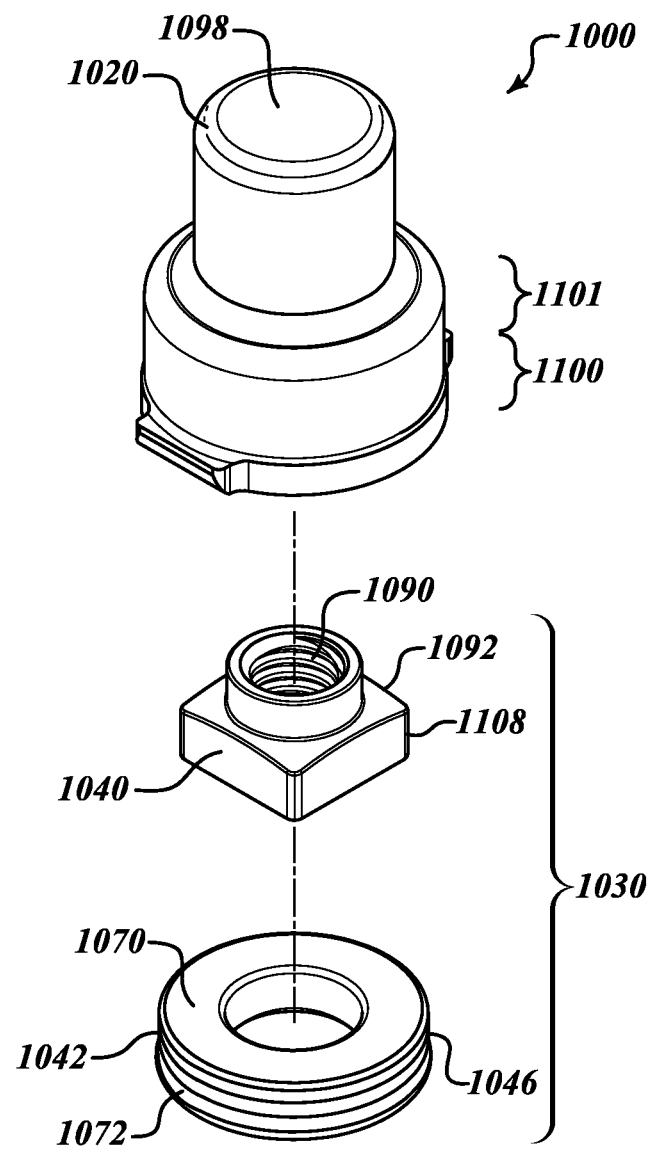
FIG. 41 is a top exploded isometric view of the nut of FIG. 40.
Figure 42:
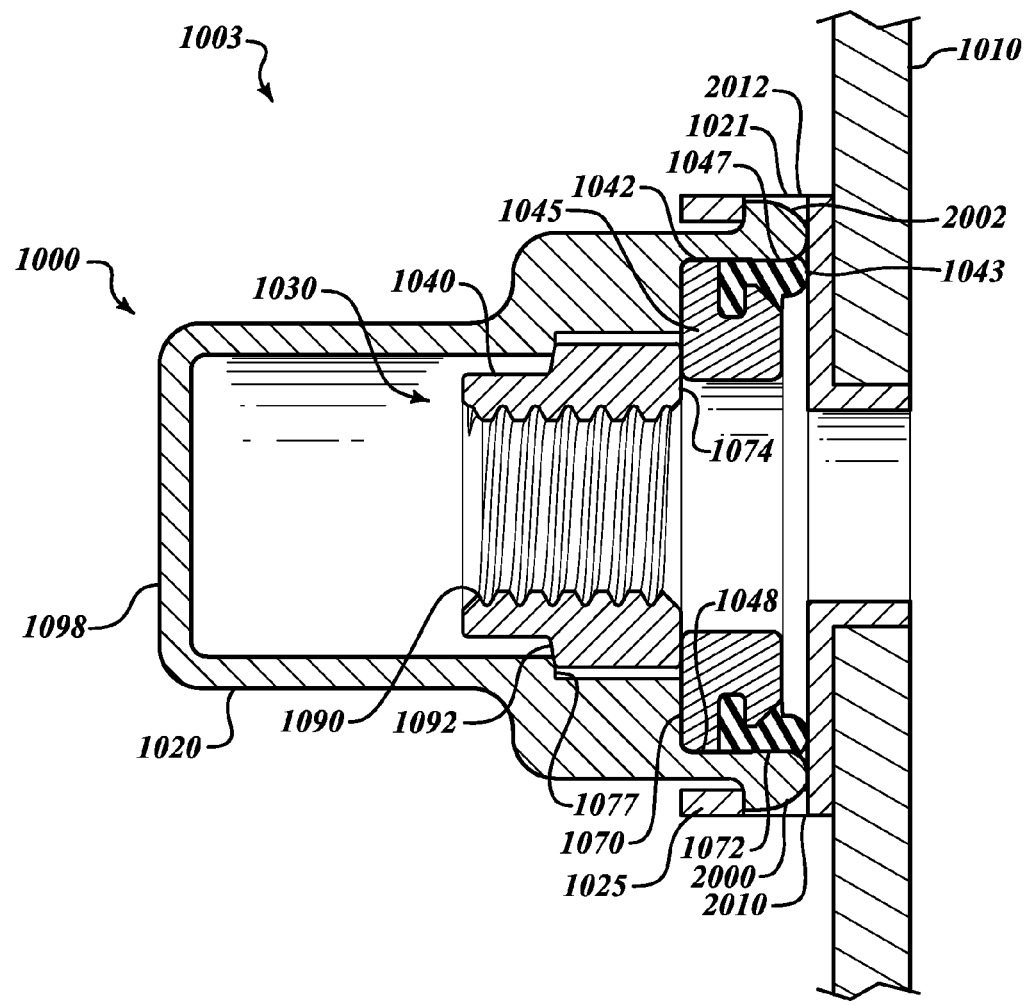
FIG. 42 is a cross-sectional view of a nut plate assembly, according to one embodiment.

FIGS. 40-42 show a closed-ended nut 1000 that includes a dome cap 1020 and an internal assembly 1030. The internal assembly 1030 includes a nut element 1040 and a sealing assembly 1042. The dome cap 1020 can receive and surround the sealing assembly 1042 to provide a seal with another component (illustrated as a retainer assembly 1021 in FIG. 42).

The installed nut element 1040 of FIG. 42 can receive a threaded component. The sealing assembly 1042 can be compressed between the retainer assembly 1021 and the nut element 1040 to form a seal 1043 with the retainer assembly 1021 and another seal 1045 with the nut element 1040. An outer surface of the sealing assembly 1042 can form a seal 1047 with an inner surface 1048 of the cap 1020. The seals 1043, 1045, 1047 can be fluid tight seals (e.g., air tight seals, liquid tight seals, etc.) or other type of desired seals.

Referring again to FIG. 40, the dome cap 1020 has a closed end 1098, a sealing assembly retention section 1100, and a nut element retention section 1101. The nut element 1040 can be inserted into the nut element retention section 1101. A polygonal base 1108 of the nut element 1040 can be received by the section 1101 to limit, prevent, or substantially eliminate rotational movement of the nut element 1040. The sealing assembly 1042 can be inserted into the section 1100.

One or more retention features can be molded or otherwise provided on the inner surface 1048 (FIG. 40) of the cap 1020. The retention features can be tabs, grooves, combinations thereof or the like that cooperate to retain the nut element 1040 and/or the sealing assembly 1042. In some embodiments, the retention features are in the form of inwardly extending tabs integrally formed with the wall of the dome cap 1020.

The illustrated sealing assembly 1042 has an annular shape and includes a washer 1070 and a sealing element 1072. In some embodiments, the washer 1070 and the sealing element 1072 are co-molded to minimize or eliminate separation. In other embodiments, the washer 1070 is bonded or otherwise coupled to the sealing element 1072. For example, a sealing material can be applied between the cap 1020 and the sealing assembly 1042.

The sealing assembly 1042 can be made, in whole or in part, of one or more metals, rubbers, polymer, elastomers, or other types of materials that can provide sealing capability. The washer 1070 can be made, in whole or in part, of metal to provide a metal-to-metal interface with the nut element 1040. The sealing element 1072 can be made of a non-metal material (e.g., rubber, polymers, plastics, elastomers, or combinations thereof), and can be in the form of an O-ring, gasket, compressible annular member, or other type of sealing component. Advantageously, the sealing element 1072 can provide electrical resistance to prevent or inhibit arcing between the washer 1070 and other metal components. A wide range of different types of electrically insulating materials (e.g., rubber, plastic, or the like) can be used to form the sealing element 1072. In some embodiments, the sealing element 1072 is made of silicon.

The nut element 1040 of FIGS. 40-42 includes internal threads 1090 and a main body 1092. The base 1108 can have a polygonal profile (illustrated as a generally square profile) receivable by the complementary shaped nut element retention section 1101, as noted above.

FIG. 42 shows a nut plate assembly 1003 ready to receive a threaded attachment. The nut element 1040 is sandwiched between an abutment 1077 (illustrated as a stepped region) of the cap 1020 and the sealing assembly 1042 to compress the sealing element 1072 so as to form the seals 1043, 1047. The washer 1070 can be pressed against a base surface 1074 of the nut element 1040 to form the seal 1045. Protrusions 2000, 2002 extend through first and second openings 2010, 2012, respectively, of a cage 1025 of the retainer assembly 1021. The cap 1020 can be removed to replace components (e.g., the sealing element 1072), to perform maintenance, and/or to perform inspections.

The nut plate assembly 1003 can be installed in a wide range of different types of workpieces, such as panels, bulkheads, structural aircraft components, or the like. The nut plate assembly 1003 is especially well suited for installation in workpieces that are sensitive to high loads due to its relatively light weight. Such workpiece 1010 may be made of a composite material. Components of the nut plate assembly 1003 can be made of relatively lightweight plastics or other lightweight materials.

The cap 1020 can comprise an electrically insulating material to prevent exposure of highly conductive surfaces (e.g., metal surfaces of the nut element 1040) to the surrounding environment. In some embodiments, the cap 1020 provides resistance to arcing (e.g., arcing due to lightning strikes). The insulating material can be plastics, polyimides, polyamide, polyamide-imide materials, nylon, polyurethane, polyester, polyvinyl-chloride, or combinations thereof. The cap 1020 and the sealing assembly 1042 can define a non-metal/non-metal interface, and the nut element 1040 and the sealing assembly 1042 can form a metal-to-metal interface that is spaced well-apart and electrically insulated from the retainer assembly 1021 and/or workpiece 1010. Such an arrangement can inhibit or prevent arcing, even if relatively high electrical loads are applied to the workpiece 1010. Accordingly, different portions or components of the nut plate assembly 1003 can be made of non-conducting materials to prevent electrical pathways.

The retainer assembly 1021 of FIG. 42 can be made of one or more polymers, plastics, metals, or combinations thereof. If the retainer assembly 1021 is made of metal, the cap 1020 can be made of plastic to limit, minimize, or substantially eliminate or limit electrical flow between the cap 1020 and the retainer assembly 1021. In some embodiments, nut plate assembly 1003 does not have any metal-to-metal interfaces that may be susceptible to arcing.

Components of the nut plate assembly 1003 can provide enhanced performance (e.g., chemical resistance, corrosion resistance, electrical resistance, or the like) for a long service life. If the nut plate assembly 1003 will be exposed to corrosive substances, the cap 1020 can be made of a corrosion resistant material (e.g., a chemically corrosion resistant material). Even after a relatively long service, the cap 1020 can be easily removed. Thus, the nut plate assembly 1003 can exhibit less significantly less corrosion than conventional nut plates with metal-to-metal interfaces.

With continued reference to FIG. 42, the nut 1000 can be interchanged with other nuts disclosed herein, such as the nut 120 discussed in connection with FIGS. 1, 2, and 7-9, and installed into other types of components, such as the cage 910 discussed in connection with FIGS. 37 and 38. The retainer assembly 1021 can be used to install sealing nuts, non-sealing nuts, or other types of nuts in a wide range of different types of workpieces, including workpieces that require fluid tight sealing capability, high clamp-up forces, corrosion resistance, or the like.

Figure 43:
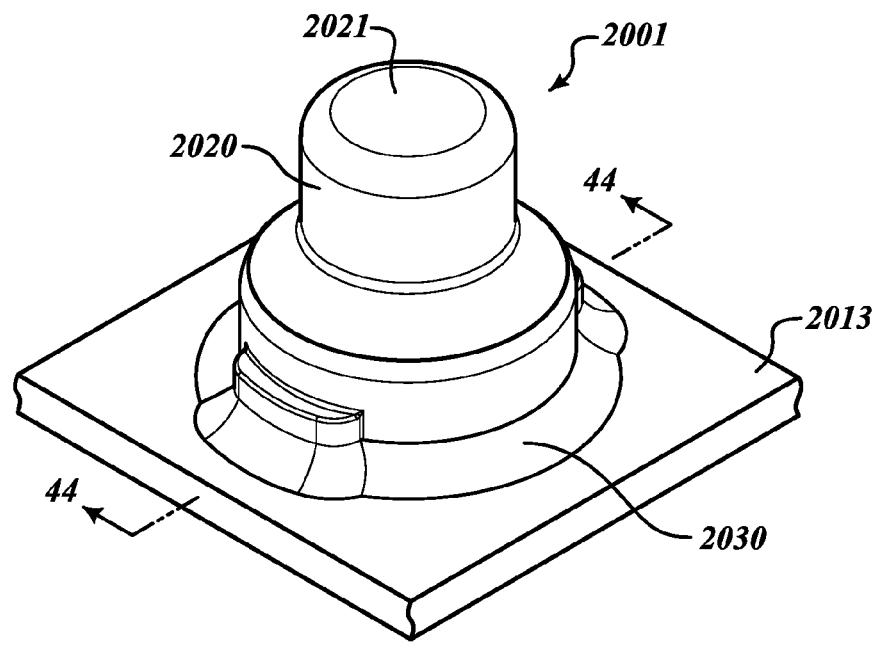
FIG. 43 is an isometric view of a nut plate assembly with a cap sealed to a workpiece, according to one embodiment.
Figure 44:
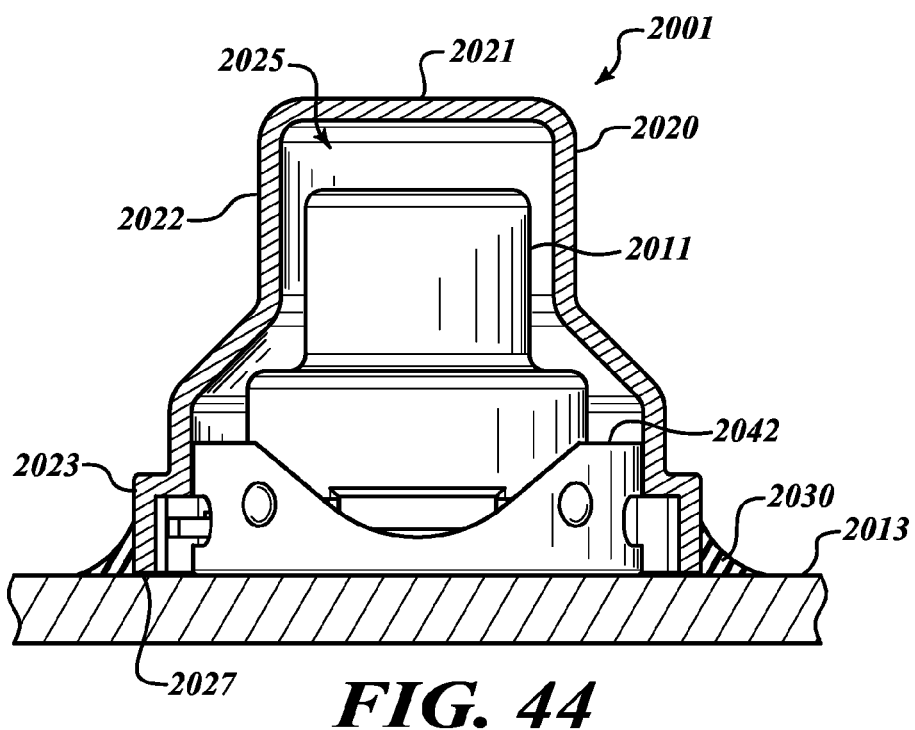
FIG. 44 is a partial cross-sectional view of a nut plate assembly taken along a line 44-44 of FIG. 43.

FIGS. 43 and 44 show a nut plate assembly 2001 that includes a protective cap 2020 sealed to a workpiece 2013. The nut plate assembly 2001 includes a closed-ended nut 2011 and an internal assembly that can be the same as the closed-ended nut 1040 and internal assembly 1030 of FIG. 42, except as detailed below.

The protective cap 2020 can be made of metal, plastic, or other suitable material and can inhibit, limit, or substantially prevent contaminants from reaching internal components of the nut plate assembly 2001. The protective cap 2020 includes a closed end 2021, a tubular body 2022, and a cage retention section 2023. The closed ended nut 2011 can be inserted into a cap chamber 2025 to bring an end 2027 of the cap 2020 against a workpiece 2013.

A sealing material 2030 surrounds the periphery of the cap 2020 and can comprise one or more polymers (e.g., polysulfide, silicon, or the like), rubber, or the like. The sealing material 2030 can be a bead of a polysulfide sealant that extends about the entire periphery of the cap 2020 to form a seal, such as an airtight seal or water tight seal. The composition of the material 2030 can be selected to withstand working pressures and/or to provide corrosion protection, electrical insulation, or desired mechanical properties (e.g., high strength properties) and the like. In other embodiments, sealing members (e.g., O-rings, gaskets, or the like) can form a seal between the protective cap and the workpiece. Sealant materials can be used to form seals between other components of nut plate assemblies disclosed herein. For example, a sealing material can seal the cap 1020 of FIG. 42 to the washer 1070 of FIG. 42.

To install the cap 2020, the cap 2020 can be placed over the closed ended nut 2011. The section 2023 can be moved over a cage 2042. The open end 2027 can be held against the workpiece 2010, while the sealing material is applied along the interface of the cap 2020 and workpiece 2010. In some embodiments, the material is applied manually. In other embodiments, tools are used to apply the sealing material 2030. If the sealing material 2030 is a thermoplastic, the material can be heated and applied. As the material cools, it can help limit movement of the cap 2020. The sealing member 2030 can thus both form a seal and mechanically couple the cap 2020 to the workpiece 2010.

Figure 45:
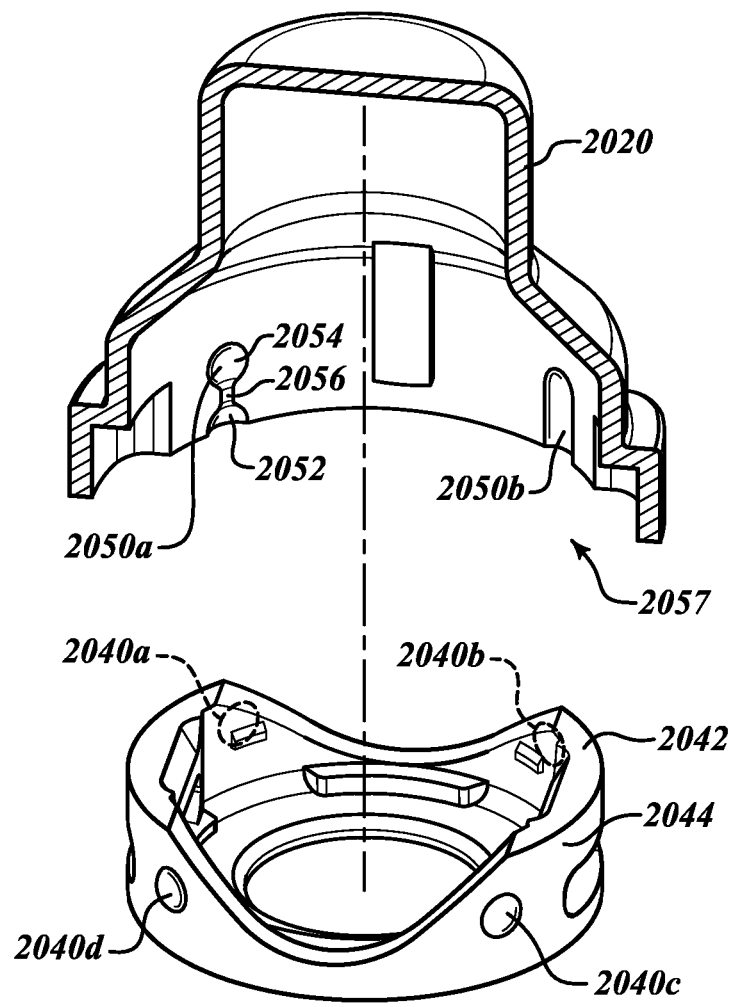
FIG. 45 is an expanded isometric view of a cage and a cap.
Figure 46:
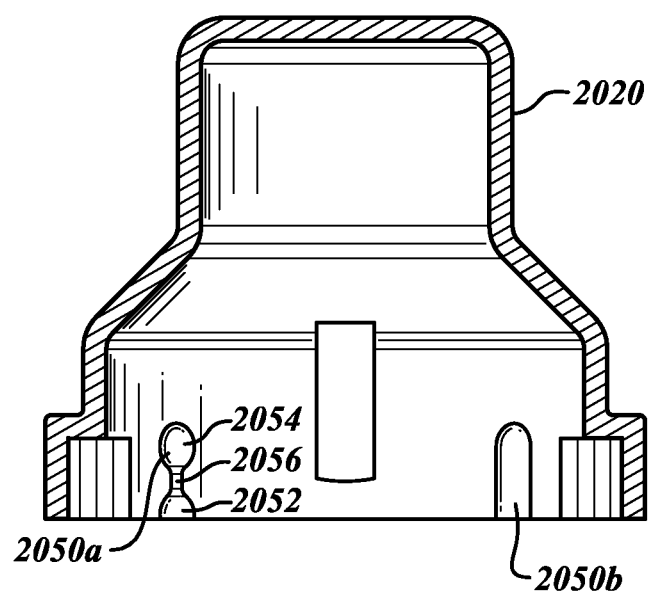
FIG. 46 is an elevational cross-sectional view of the cap of FIG. 45.

FIG. 45 shows coupling features 2040a, 2040b, 2040c, 2040d (collectively 2040) that minimize, limit, or substantially prevent relative movement between the cage 2042 and the cap 2020. The coupling features 2040 can be received by complementary shaped coupling features of the cap 2020. The coupling features 2040 are protrusions, illustrated as partially spherical protrusions, located along a cylindrical sidewall 2044. FIG. 45 shows the cage 2042 with four coupling features 2040. A higher or lower of coupling features can be utilized, if needed or desired. The position and spacing of the coupling features can be selected based on the number of coupling features of the cage.

The cap 2020 has coupling features that mate with the coupling features 2040 of the cage 2042. The illustrated portion of the cap 2020 in FIG. 45 has coupling features 2050a, 2050b (collectively 2050). The cap coupling feature 2050a is a variable depth recess that includes a first partially spherical recess 2052, a second partially spherical recess 2054, and a connecting recess 2056. The cap coupling feature 2050b is an elongate slot extending from a cap opening 2057. To snap fit the protective cap 2020 to the cage 2042, the coupling features 2050 can be aligned with the coupling features 2040. A user can manually rotate the cage 2020 until the coupling features are properly aligned. The cap 2020 can then be pushed toward the workpiece 2010 (see FIG. 44) to slide the cap 2020 over the cage 2042 while the coupling features 2040 slide along the coupling features 2050. The cap 2020 snap fits to the cage 2042 as the coupling feature 2040a is seated in the partially spherical recess 2054. The coupling features 2040b, 2050b cooperate to help prevent unwanted rotational movement of the cap 2020 with respect to the cage 2042.

To remove the cap 2020, the cap 2020 is moved away from the workpiece 2010. The coupling features 2040 can be slid out of the coupling features 2050 as the cap 2020 is pulled off the cage 2042. In this manner, the cap 2020 can be conveniently installed and removed as desired.

A wide range of different types of coupling features can be utilized. Such coupling features can include, without limitation, recesses, protrusions, slots, pins, or the like. In other embodiments, the inner surface of the cap 2020 can include protrusions, such as partially spherical protrusions. The coupling features of the cage 2040 can be recesses (e.g., recesses similar to the recesses 2050 of the cap 2020).

The dimensions and/or configurations of the assemblies disclosed herein can be selected based different design principles. The retainer and cage assemblies can provide one or more surfaces (e.g., a curved surface or a round surface) that are generally concentric to a throughhole for receiving a fastener (e.g., a threaded bolt). The surface (e.g., surfaces 475a-d and 477 of FIG. 30) can define a retainer bearing area. The retainer bearing area can be bounded, at least in part, by four up-turned tabs (see tabs 473a-d of FIG. 30). The size of the retainer bearing area can be selected based, at least in part, on the largest functional element. In many cases, the largest functional element is a nut, such as a sealed nut dome. Two opposing sets of up-turned tabs provides access to openings or windows in the cage. The contact between a floating nut and the up-turned tabs provides resistance to torque loads. Contact between the floating nut and the cage window provides resistance to pushout loads.

A base of the nut or the "nut footprint" can establish compatibility with the nut retainer and/or cage. For floating functional elements, the nut footprint can be defined by one or more protrusions. In some embodiments, the nut footprint is defined by a round flange that can define a nut bearing area. In other embodiments, the nut footprint is defined by a pair of opposing flats or a pair of nut feet or elongate members. The nut bearing area contributes to axial tensile performance and limits float while the nut feet couple with the nut retainer/cage to provide resistance to torque and pushout.

Float of the functional element can be selected such that the radial float (±) of the functional element is greater than about half of the maximum clearance between the fastener and the throughhole in the assembly. The float is established by the nut bearing area within the retainer bearing area. Because the retainer bearing area is constrained (e.g., constrained by the dimensions of the nut dome, for example, to accept the nut dome), the nut bearing area can be equal to the retainer bearing area minus the maximum fastener clearance minus applicable tolerances. The width of the nut feet can be evaluated to ensure that that contact with the cage window does not interfere with the desired float. A workable range and a dimension for the nut bearing area diameter and the nut foot width are listed in Table 1 below.

TABLE 1

Floating Functional Element Components

| Element Type | Radial (±) Float | Nut Bearing Area Diameter | Nut Foot Width | Distance Between the Windows | Distance Across Nut Feet |
|---|---|---|---|---|---|
| Open Style Elements | 0.02 | 0.485-0.505 (0.495) | 0.110-0.130 (0.120) | 0.525-0.535 (0.530) | 0.606-0.616 (0.611) |
| | 0.04 | 0.445-0.465 (0.455) | 0.110-0.130 (0.120) | 0.525-0.535 (0.530) | 0.653-0.663 (0.658) |
| | 0.028 | 0.469-.489 (.479) | 0.110-0.13 (0.12) | 0.525-0.535 (0.53) | 0.625-0.635 (.63) |
| | 0.06 | 0.501-0.521 (0.511) | 0.11-0.13 (0.12) | 0.62-0.63 (0.625) | 0.792-0.802 (0.797) |
| | 0.028 | 0.564-0.584 (0.574) | 0.110-0.130 (0.120) | 0.62-0.63 (0.625) | 0.718-0.728 (0.723) |
| | 0.06 | 0.611-0.631 (0.621) | 0.140-0.160 (0.150) | 0.73-0.74 (0.735) | 0.898-0.908 (0.903) |
| Quick Release Elements | 0.043 | 0.445-0.465 (0.455) | 0.110-0.130 (0.120) | 0.525-0.535 (0.530) | 0.658-0.668 (0.663) |
| | 0.032 | 0.556-0.576 (0.566) | 0.110-0.130 (0.120) | 0.62-0.63 (0.625) | 0.727-0.737 (0.732) |
| | 0.063 | 0.603-0.623 (0.613) | 0.140-0.160 (0.150) | 0.73-0.74 (0.735) | 0.907-0.917 (0.912) |

(All dimensions in inches - Exemplary dimensions in parentheses)

To assemble a nut into a retainer and a cage, a protruding foot (e.g., elongate member 472 of FIG. 31) of the nut is passed through one of the cage windows (e.g., window 512) as far as possible. The extent to which the nut can be fitted into the cage window may be limited by contact between the round nut bearing area and the up-turned tabs on the retainer. Once in this position, a load (e.g., an axial force, a rotational force, or both) can be applied to the nut in order to force the opposing nut foot down into the opposing cage window. The material of the cage that defines the window can flex to allow the nut foot to pass into the window and rebound so as to keep the nut in place. Without complicated tools or significant skill, the nut can be removed in a similar manner.

Non-floating embodiments can have functional elements with dimensions selected based on the size of other components. A nut retainer and cage each can provide surface(s) (e.g., an arcuate or round surface) that is generally concentric to a fastener throughhole. The surface(s) area can be referred to as the retainer bearing area. The retainer bearing area can be bounded by a plurality of tabs, such as four up-turned tabs. The size of the retainer bearing area can be dictated by the functional element with the largest dimensions, such as a sealed nut dome. Access to the windows is provided between two opposing sets of up-turned tabs in the cage. Contact between the sealed nut dome and the up-turned tabs provides resistance to torque loads. Contact between the sealed nut dome and the cage window provides resistance to pushout loads.

The portion of the non-floating functional element that establishes compatibility with the retainer/cage is the base of the non-floating functional element. If the non-floating functional element is a sealed nut dome, the nut footprint can establish compatibility with the retainer cage. For non-floating functional elements, the nut footprint is defined by the geometry that closely matches the retainer/cage geometries. Multiple contact points between the sealed nut dome and the retainer/cage to resist torque loads while two nut feet (e.g., elongate members) on opposing sides extend into the cage windows to resist pushout loads. The non-floating sealed nut dome may not experience significant float, if any, within the retainer/cage.

In order to install the sealed nut dome into the retainer/cage assembly, the sealed nut dome can be positioned such that one of the protruding nut feet is passed through one of the cage openings or windows as far as possible. The extent to which the nut can be fitted into the cage window is limited by contact between the nut footprint and the up-turned tabs on the retainer. Once in this position, a load is applied to the sealed nut dome (e.g., an axial load, rotational load, or both) in order to force the opposing sealed nut dome feet into the opposing cage windows. The material of the cage that defines the windows flexes to allow the sealed nut dome foot to pass into the respective windows and rebound in order to keep the sealed nut dome in place. The sealed nut dome can be removed in a similar manner. A workable range and an exemplary dimension for the distance across the nut feet for each size are presented in Table 2 below. (The distance between the windows is the same as presented in Table 1 for the floating nut.)

TABLE 2

Non-Floating Functional Element Components (Sealed Nut Dome)

| Element Type | Radial (±) Float | Distance Across the Nut Feet |
|---|---|---|
| Sealed Nut Dome | 0.020 | 0.565-0.575 (0.570) |
| | 0.028 | 0.565-0.575 (0.570) |
| | 0.028 | 0.660-0.670 (0.665) |

(All dimensions in inches - Exemplary dimensions in parentheses)

Figure 47:
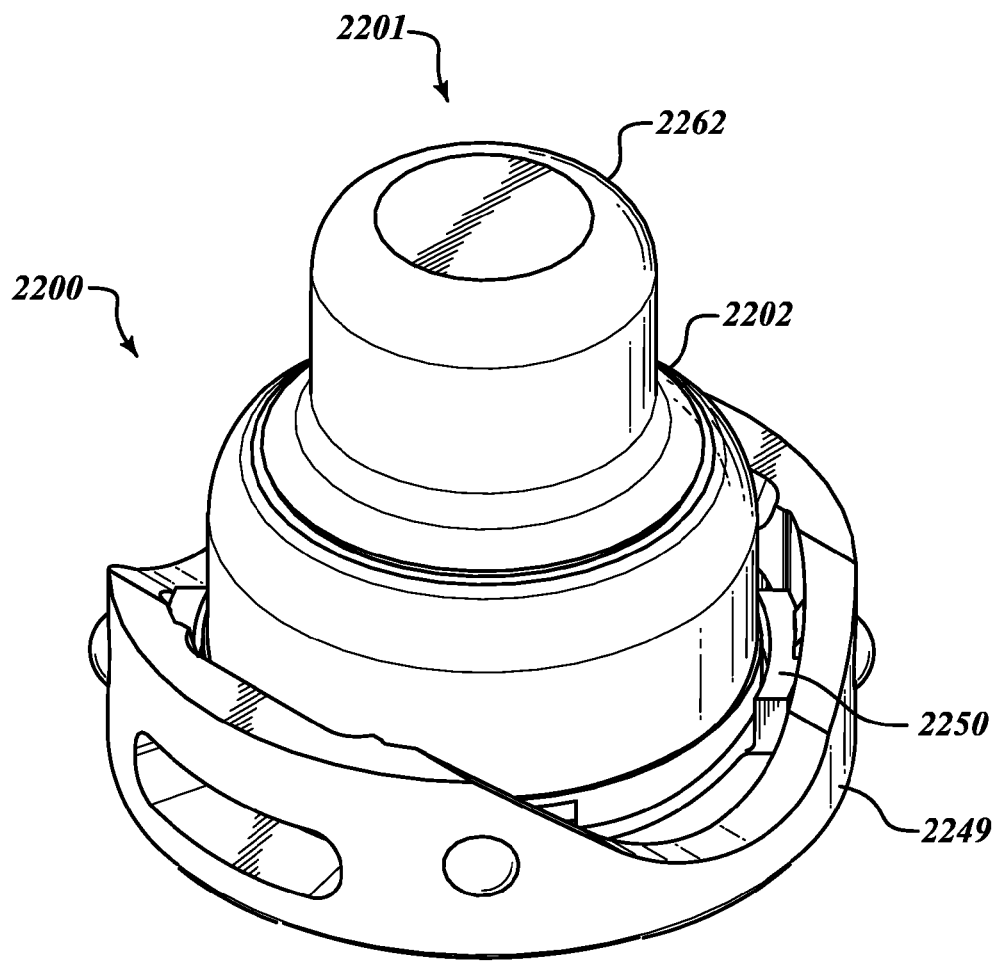
FIG. 47 is an isometric view of a nut plate assembly, according to one embodiment.
Figure 48:
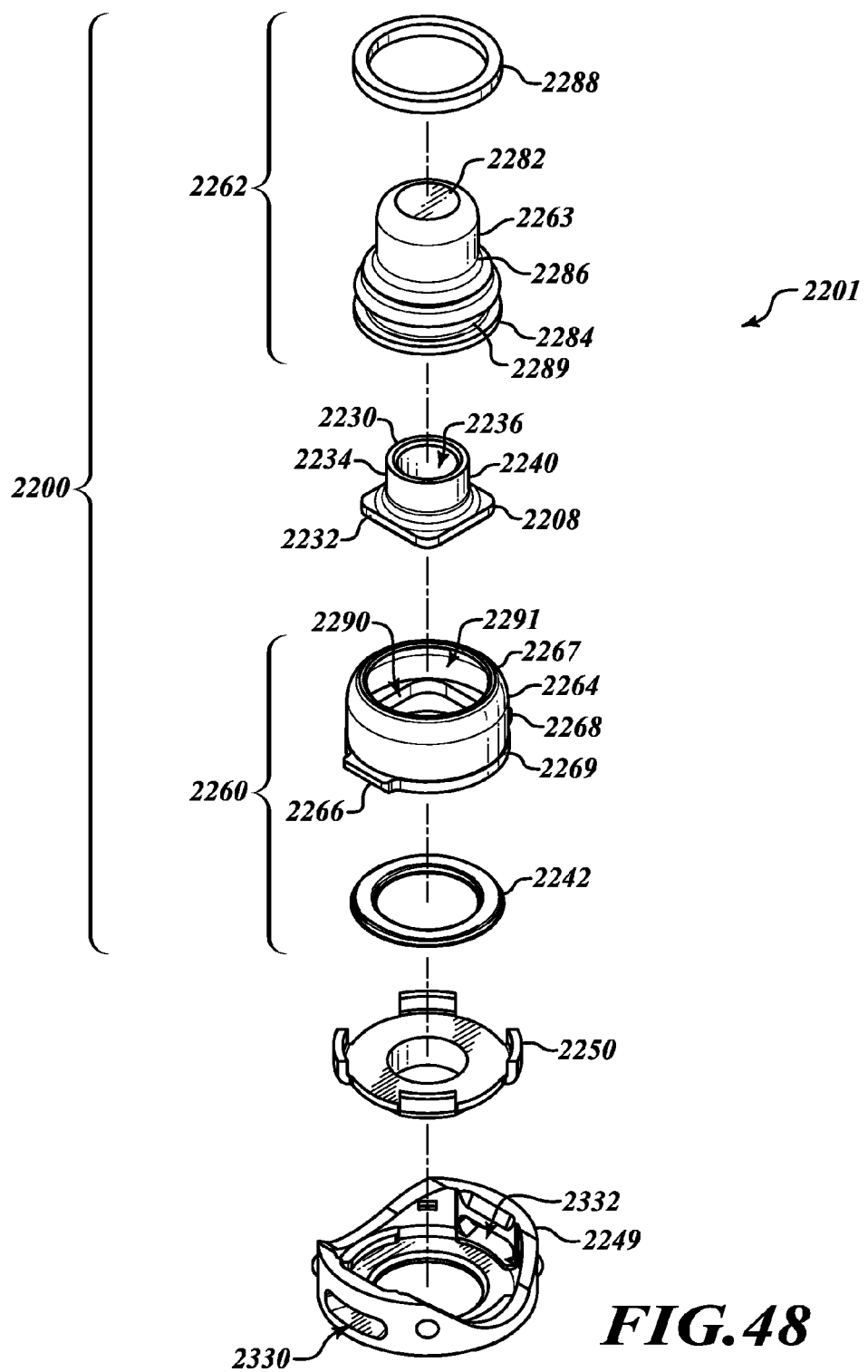
FIG. 48 is an exploded isometric view of the nut plate assembly of FIG. 47.

FIGS. 47 and 48 show a nut plate assembly 2201 that includes a sealed dome nut assembly 2200, a mounting plate 2250, and a cage 2249. The dome nut assembly 2200 can be snap fit into the cage 2249 for convenient installation and includes a multi-piece cap assembly 2202 (FIG. 47) and a nut element 2240. A mounting component (e.g., a screw, a bolt, a threaded member, and the like) can be held by the nut element 2240 such that an end of the mounting component is positioned within a dome cap 2262. Different types of dome caps can be installed in a cap retainer 2260 to accommodate a wide range of different types of mounting components.

Figure 49:
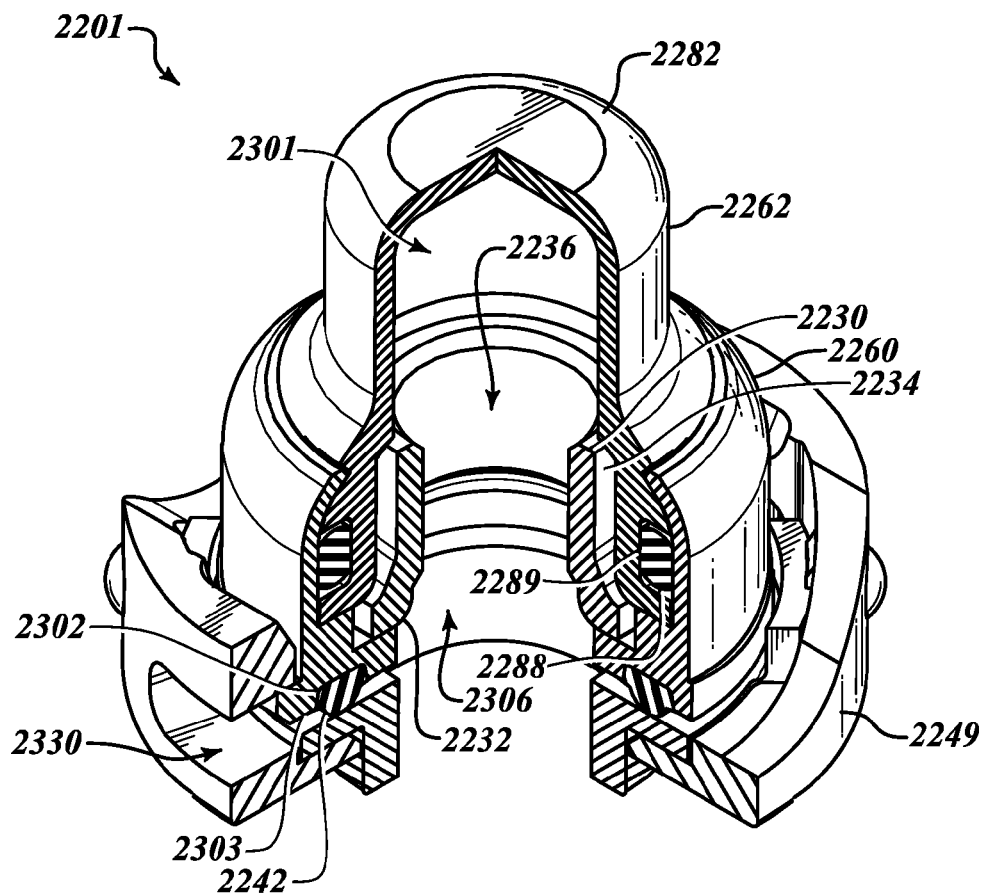
FIG. 49 is a cross-sectional isometric view of the nut plate assembly of FIG. 47.

Referring to FIG. 48, the dome cap 2262 has a main body 2263 and a sealing member 2288. The main body 2263 includes a closed end 2282, a cap base 2284, and a sidewall 2286. The sealing member 2288 is positioned in a groove 2289, as shown in FIG. 49. The groove 2289 can be a circumferentially extending annular groove that has a generally U-shape cross-sectional profile, V-shape cross-sectional profile, or other suitable cross-sectional profile.

The dome cap 2262 can be a non-metallic part comprising one or more thermoplastics, thermosets, composites, or combinations thereof. In some embodiments, main body 2263 comprises mostly plastic by weight. The plastic can be a polyamide-imide material. TORLON® is one type of polyamide-imide material that has suitable mechanical properties for a long service life, even if the TORLON® cap experiences significant loads. A plastic-to-metal interface between the dome cap 2262 and the cap retainer 2260 can reduce or eliminate corrosion.

The sealing element 2288 can be made of a non-metal material (e.g., rubber, polymers, plastics, elastomers, or combinations thereof) and can be in the form of an O-ring, a gasket, a compressible annular member, or other type of sealing component. If the dome cap 2262 and sealing element 2288 are both non-metallic parts made of electrically insulating materials, the installation can provide electrical resistance to prevent or inhibit arcing between components and can be exposed to combustible gases.

Referring to FIGS. 48 and 49, the cap retainer 2260 includes a retainer body 2264 for holding a base 2208 of the nut element 2240 and a sealing member 2242 positioned in a groove 2302 positioned along a bottom 2303 of the retainer body 2264. Protrusions 2266, 2268 extend through openings 2330, 2332, respectively, in the cage 2249 such that the sealing member 2242 is compressed against the mounting plate 2250. In some embodiments, including the illustrated embodiment of FIG. 49, a portion of the sealing member 2242 protrudes outwardly from the groove 2302 and has a curved profile (e.g., a partially circular profile or a partially elliptical profile). This provides for convenient sealing with the mounting plate 2250. The sealing member 2288 can be compressed between the dome cap 2262 and the cap retainer 2260 to form a seal (e.g., an airtight seal, a liquid tight seal, or other type of desired seal). An interior chamber 2301 of FIG. 49 can be fluid tight to inhibit or prevent fluids (e.g., liquids, gases, or liquid/gas mixtures) from passing through components of the nut plate assembly 2201.

The cap retainer 2260 can be a metallic part that comprises mostly metal by weight. Exemplary metals include aluminum, titanium, steel (e.g., stainless steel), or combinations thereof. Metal cap retainers can be permanently deformed to securely hold the dome cap 2262 and can also have dimensional stability, especially in high temperature applications. The cage 2249 can be a metallic part or non-metallic part depending on the application.

The nut element 2240 of FIG. 48 has a first end 2230, a second end 2232, and a nut body 2234 defining a passage 2236. The second end 2232 includes the base 2208, illustrated as a radially protruding planar portion. The passage 2236 of FIG. 49 is positioned to receive a component (e.g., a fastener such as a bolt) extending through the cage 2249.

FIGS. 50-54 show one method of installing a nut plate assembly. Generally, the sealed nut plate assembly 2201 can be installed by positioning the nut element 2240 in a passage 2291 (FIG. 48) of the cap retainer 2260. The cap base 2284 is moved into the passage 2291 such that the dome cap 2262 and the cap retainer 2260 cooperate to retain the nut element 2240. The sealed dome nut assembly 2201 can be coupled to the cage assembly 2249 before or after the cage assembly is installed in a workpiece. Details of methods of installation are detailed below.

Figure 50:
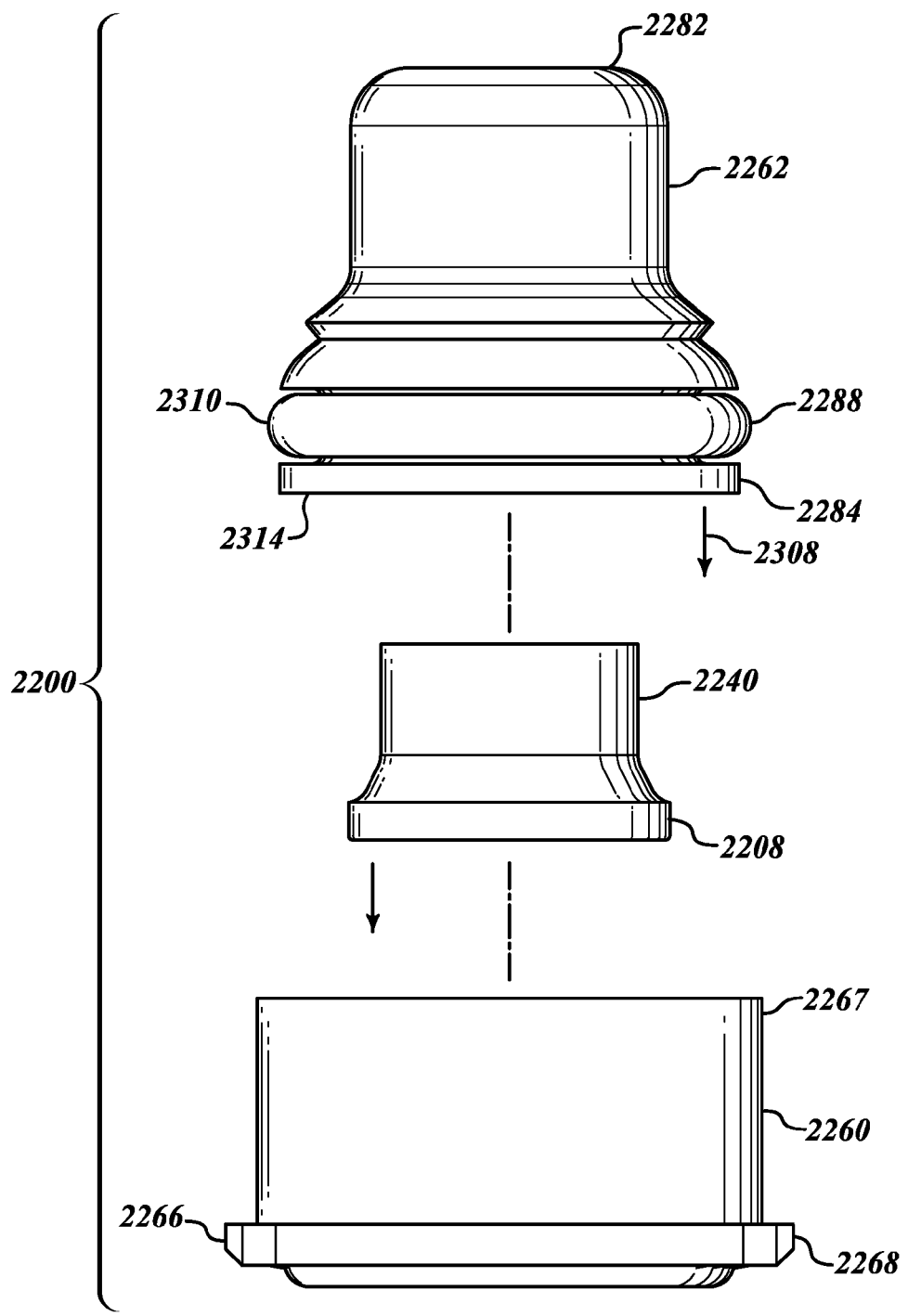
FIG. 50 is a side elevational view of a dome nut assembly ready for assembly.

FIG. 50 shows the dome nut assembly 2200 ready to be assembled. The cap base 2284 can be inserted into the cap retainer 2260, as indicated by an arrow 2308. The base 2208 of the nut element 2240 can be moved through the passage 2291 (FIGS. 51A and 51B) in the cap retainer 2260 and placed in a nut receiving section 2290 (see FIG. 48).

Figure 51A:
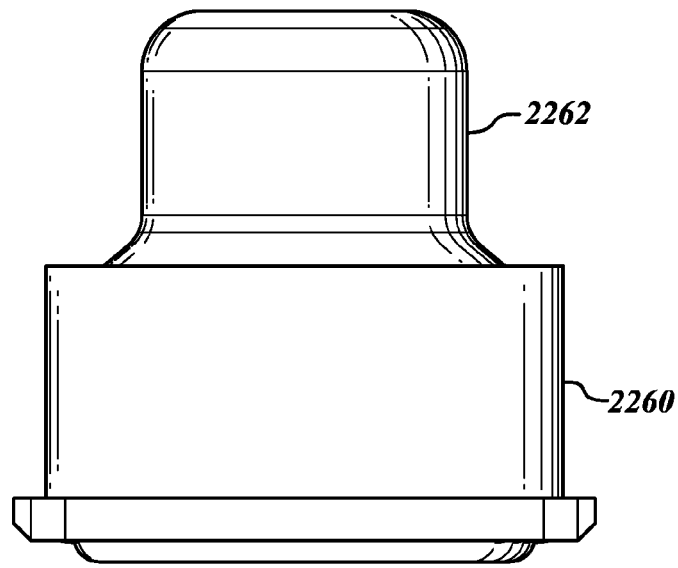
FIG. 51A is a side elevational view of an assembled dome nut assembly.
Figure 51B:
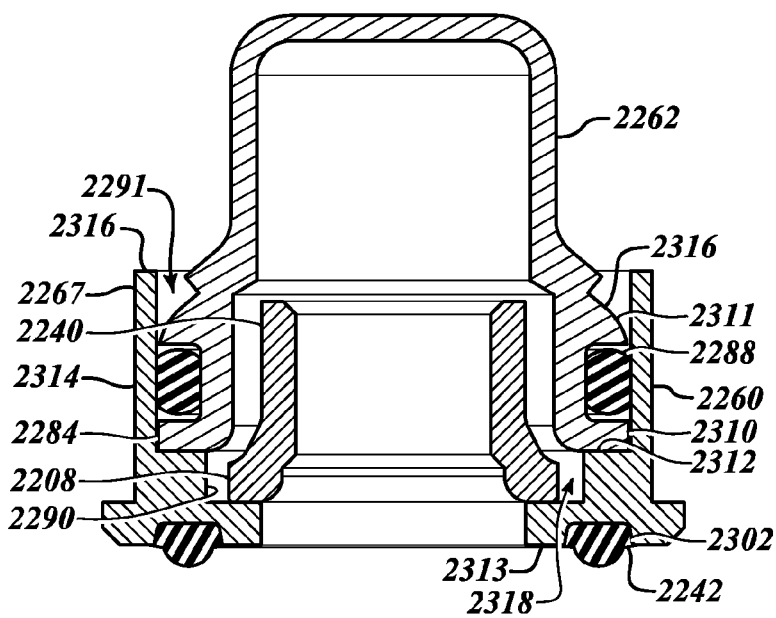
FIG. 51B is a cross-sectional view of the dome nut assembly of FIG. 51A.

The sealing member 2288 can slide along an inner surface of a cylindrical sidewall 2314 until a flange 2310 contacts a shoulder 2312, as shown in FIG. 51B. FIG. 51B shows the base 2208 of the nut element 2240 positioned in a gap 2318 between the flange 2310 and a ledge 2313 the cylindrical sidewall 2314 extending from the shoulder 2312 past the sealing member 2288 and a flange 2311. The open end 2267 is spaced well apart from a shoulder 2316.

Figure 52A:
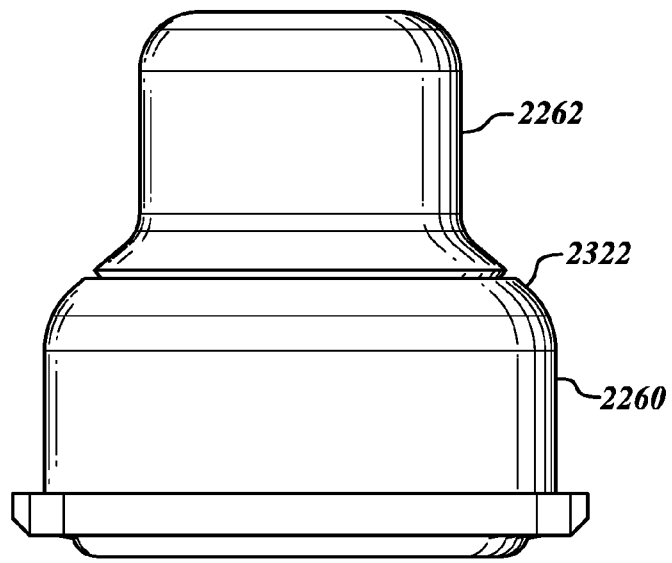
FIG. 52A is a side elevational view of the dome nut assembly after a cap retainer has been swaged.
Figure 52B:
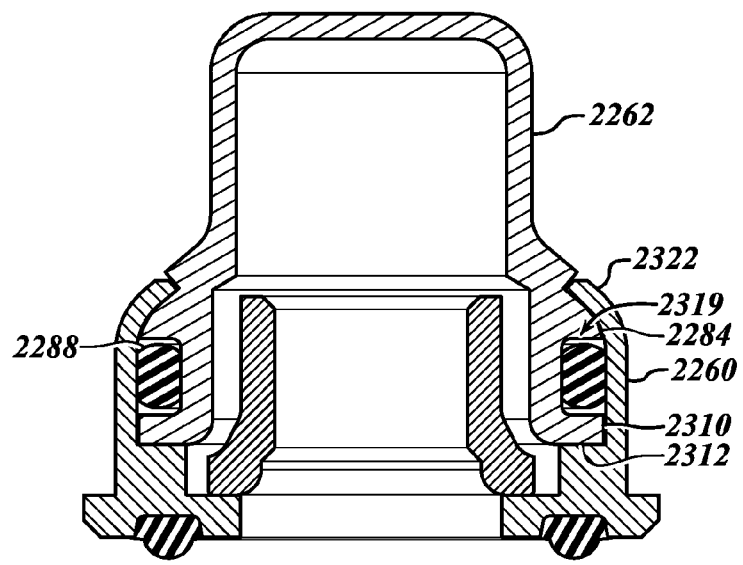
FIG. 52B is a cross-sectional view of the dome nut assembly of FIG. 52A.

FIGS. 52A and 52B show the open end 2267 after it has been deformed to closely surround the dome cap 2262. The illustrated open end 2267 curves inwardly and holds the flange 2310 proximate to the shoulder 2312. In some embodiments, the flange 2310 is held in physical contact with the shoulder 2312 to prevent translation of the dome cap 2262 relative to the cap retainer 2260. The cap base 2284 is positioned in a channel 2319 extending about the inner circumference of the cap retainer 2260. The sealing member 2288 sealingly engages a portion of the cap retainer 2260 surrounding the dome cap 2263. Other types of processes can be used to couple the cap retainer 2260 and dome cap 2262 together.

Advantageously, sealing can be independent of mechanical loading. The metal components of the installation can be load bearing components. The seal dome cap 2262 may not bear any significant mechanical loads and, thus, can be made of very lightweight materials (e.g., plastic) with a relatively low ultimate strength. Additionally, sealing between the dome cap 2262 and cap retainer 2260 can be maintained even if subjected to cyclic loading, thus enhancing vibration performance. Different sized mounting plates and nut elements can be used to mount different types of components without changing dimensions or configuration of other components. This provides installation flexibility.

Figure 53:
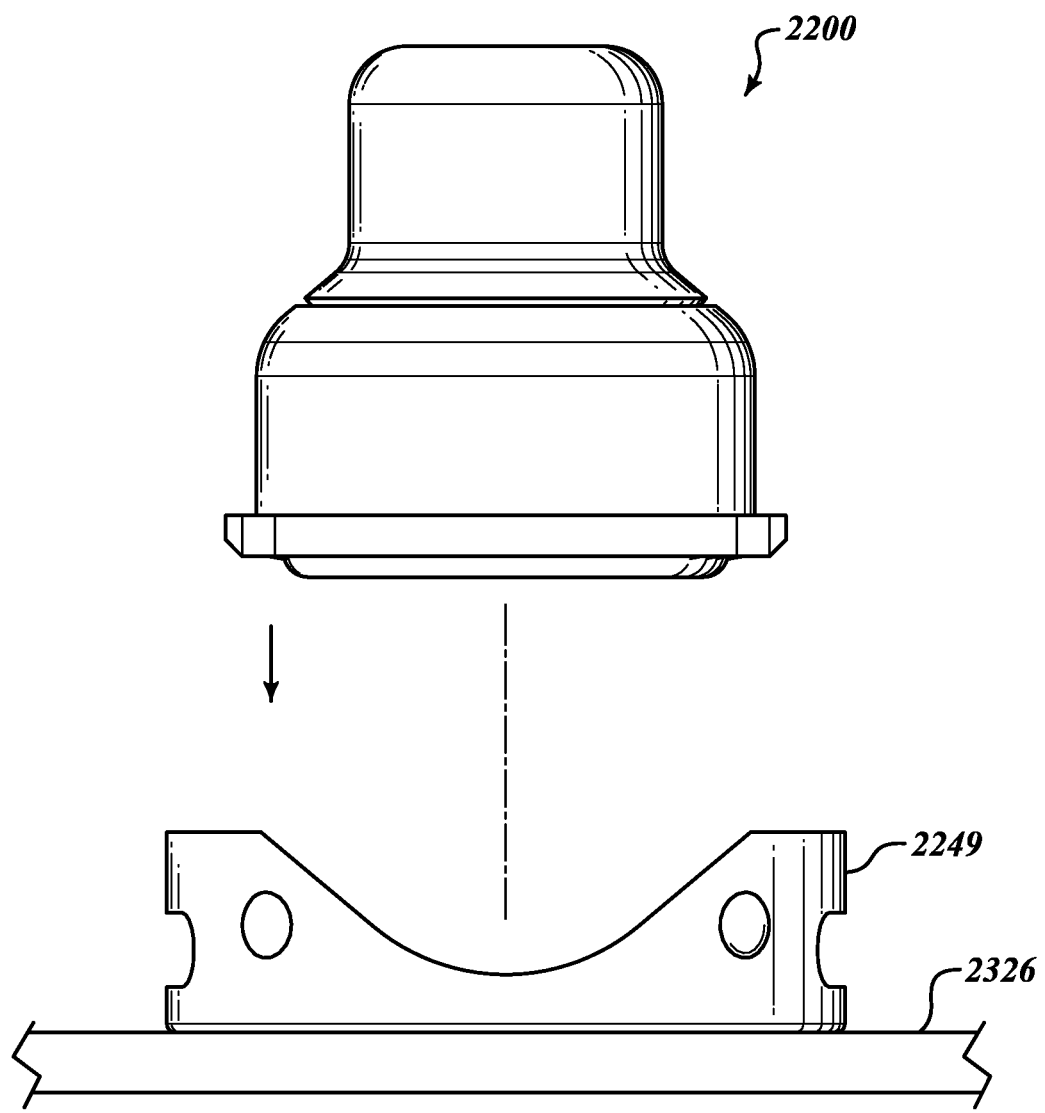
FIG. 53 is a side elevational view of a dome nut assembly ready to be installed in a cage assembly.

FIG. 53 shows the dome nut assembly 2200 ready to be installed in the cage 2249, which has been installed in a workpiece 2326. The dome nut assembly 2200 can be snap fit into the cage 2249. Such an installation method is discussed in connection with, for example, FIGS. 34 and 35. In alternative installation procedures, the cap retainer 2260 is installed in the cage 2249 prior to assembling the dome nut assembly 2200. For example, the cap retainer 2260 can be coupled to the cage 2249. The nut element 2240 is then inserted into the cap retainer 2260. The dome cap 2262 is inserted into the cap retainer 2260, and the open end 2267 is deformed to lock the dome cap 2262 and cap retainer 2260 together. Different types of swaging equipment can be used to deform the open end 2267.

Figure 54:
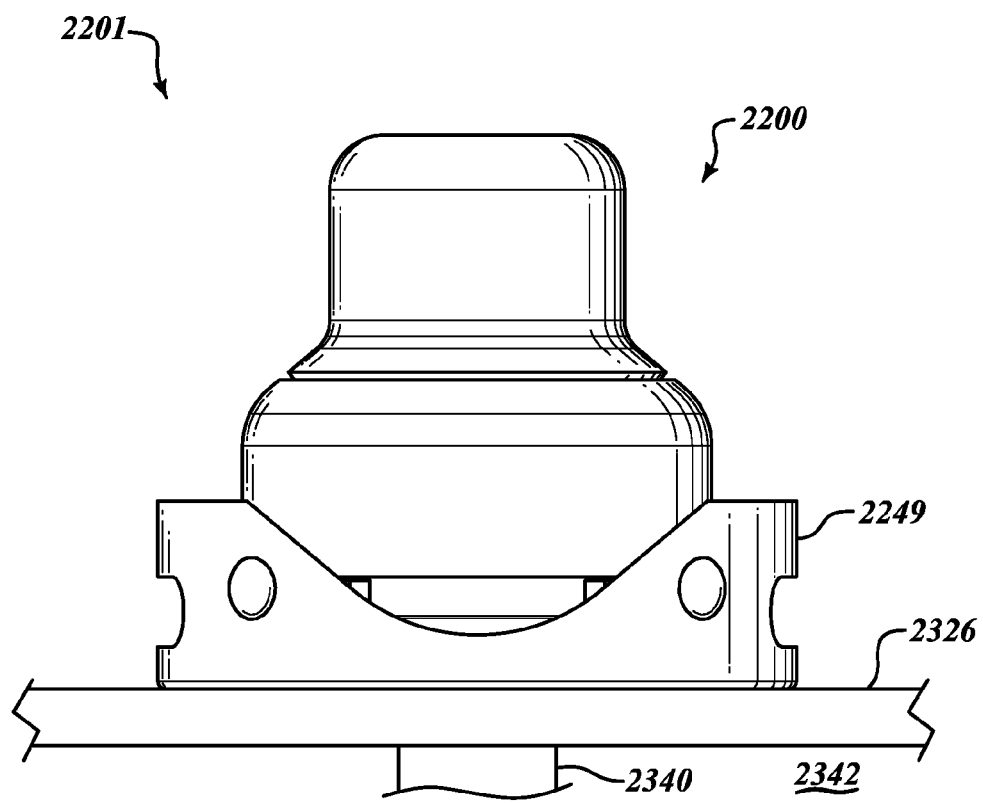
FIG. 54 is a side elevational view of a nut plate assembly holding a mounting component.

FIG. 54 shows a mounting component 2340 coupled to the nut plate assembly 2201. Advantageously, fluid on a front side 2342 of the workpiece 2326 does not pass through the dome nut assembly 2200. Accordingly, a pressure differential can be maintained across the workpiece 2326.

Figure 55:
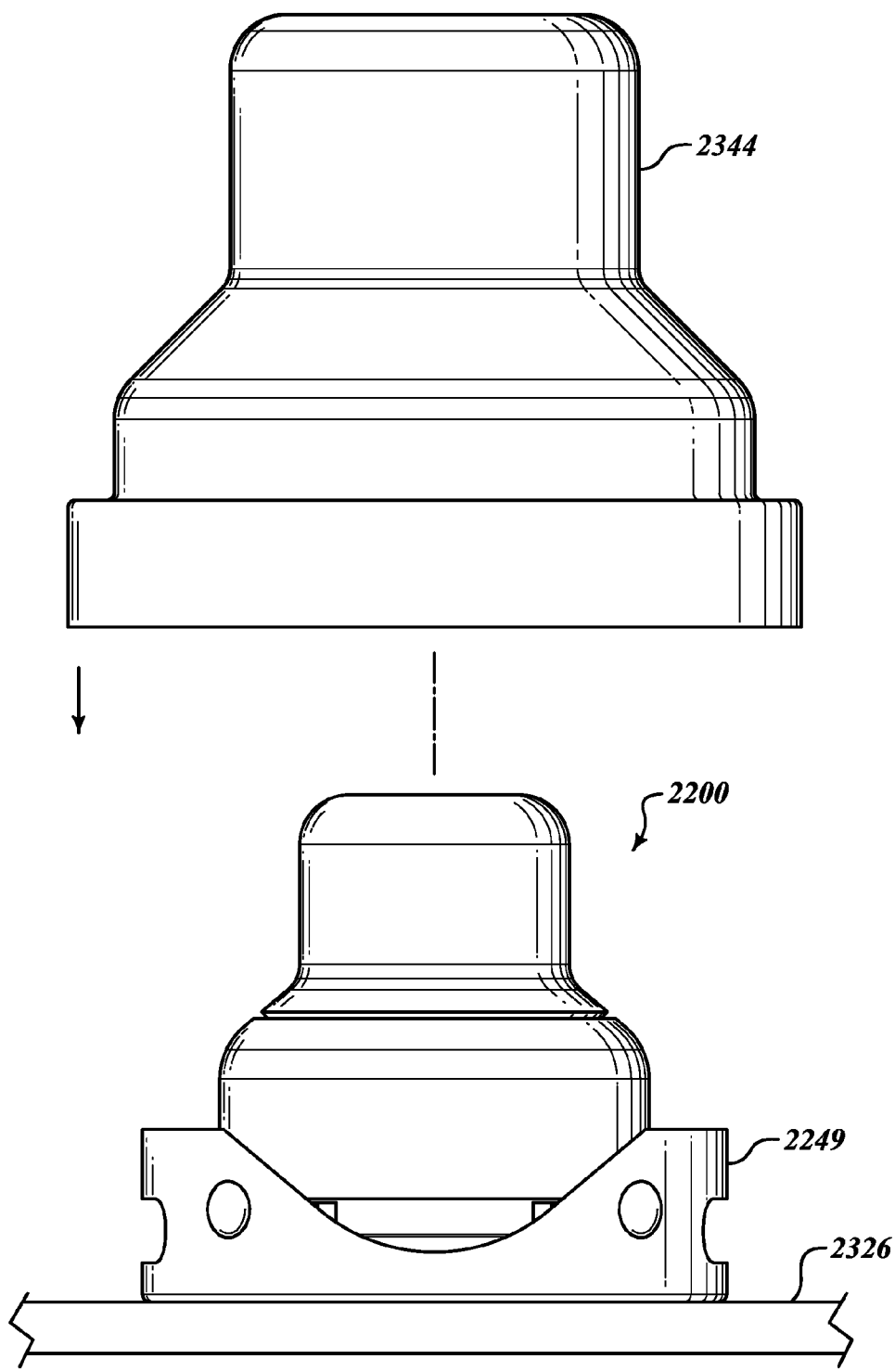
FIG. 55 is a side elevational view of a protective cap ready to be installed over the nut plate assembly.
Figure 56:
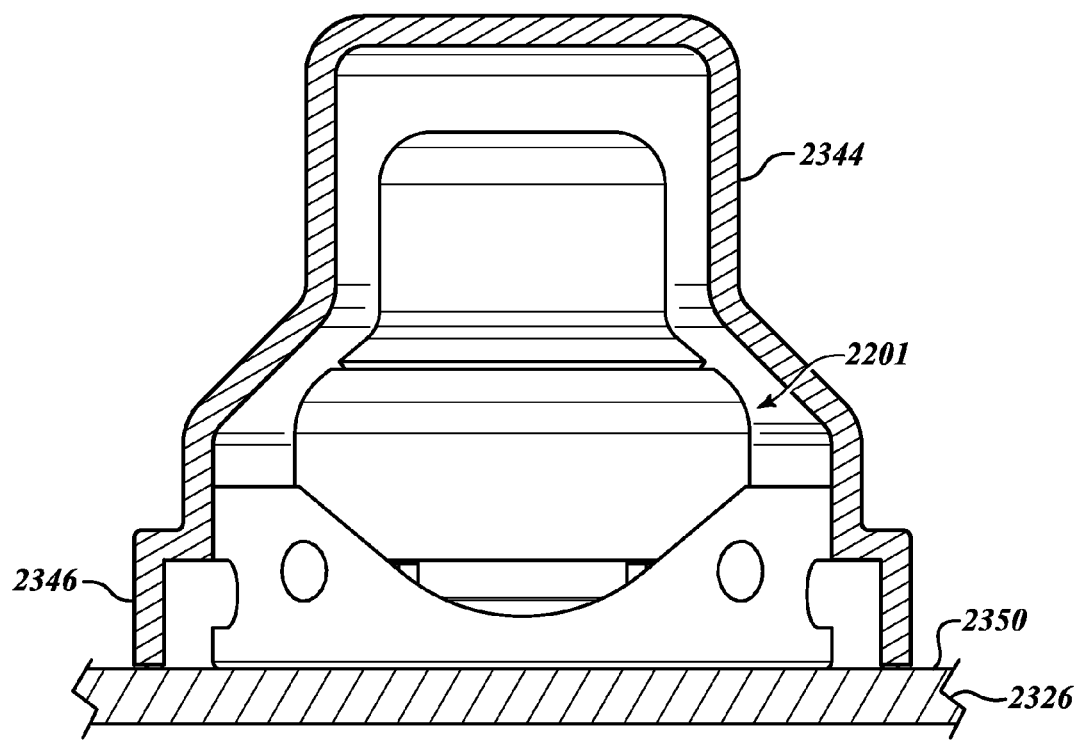
FIG. 56 is a partial cross-sectional view of an installation according to one embodiment.

A protective cap can be installed over the nut plate assembly 2201. FIG. 55 shows a protective cap 2344 ready to be placed over the installed nut plate assembly 2201. It is noted that the installation can have open nuts or other types of nuts rather than closed nuts. Details of protective caps and installation process are discussed in connection with FIGS. 40-46.

Figure 57:
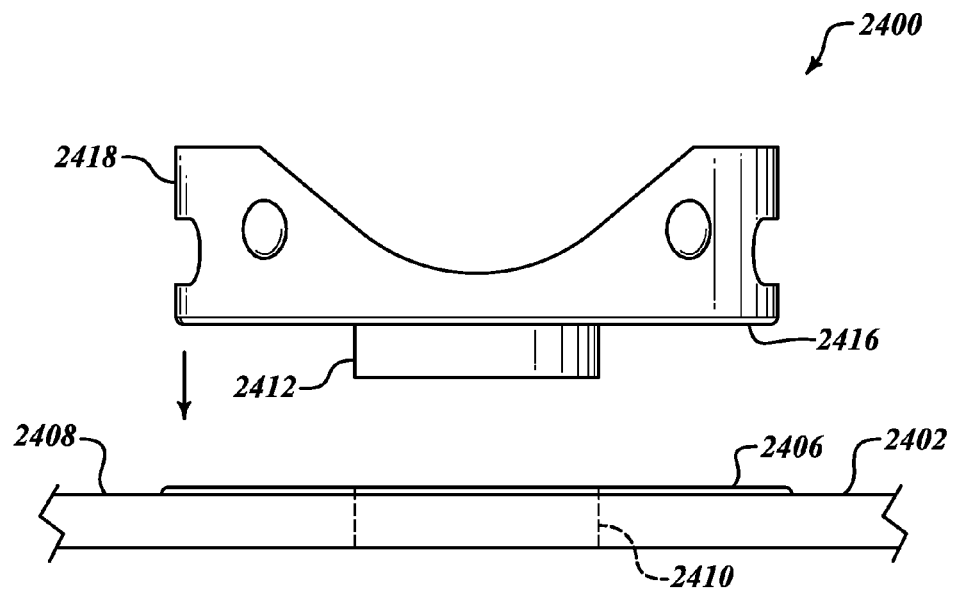
FIG. 57 is a side elevational view of a cage assembly ready to be installed in a workpiece on which a sealing material has been applied.
Figure 58:
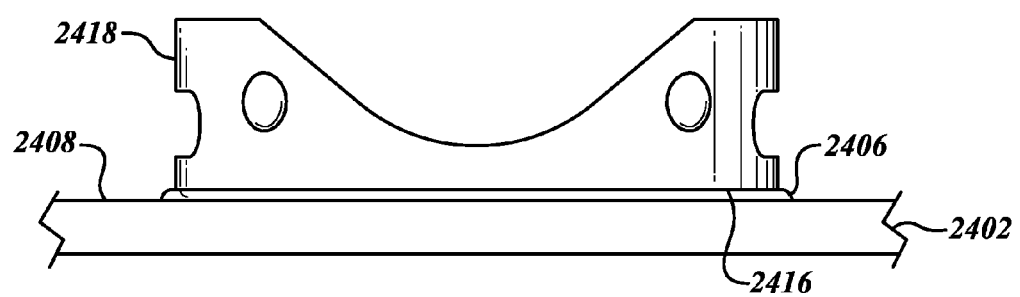
FIG. 58 is a side elevational view of the cage assembly of FIG. 57 sealed to the workpiece.

Sealants can be used to enhance sealing. FIGS. 57-60 show one method of installing a nut plate assembly with enhanced sealing capabilities. FIG. 57 shows a nut plate assembly 2400 ready to be installed into a workpiece 2402. A sealing material 2406 has been applied to a surface 2408 facing the cage 2400. The sealing material 2406 can be in the form of a liquid, a gel, a flowable material, etc., and can comprise one or more polymers (e.g., polysulfide, silicone, or the like), rubber, or other suitable sealing materials. In some embodiments, the sealing material 2406 is a bead of polysulfide sealant applied about the entire periphery of an opening 2410 (illustrated in dashed line). The sealing material 2406 can be selected to withstand working pressures and/or provide corrosion protection, electrical installation, mechanical properties (e.g., high strength properties), and the like. An expandable portion 2412 can be inserted into the opening 2410. A face 2416 of a cage 2418 can spread the flowable sealing material 2406 as the expandable portion 2412 is moved into the hole 2410. FIG. 58 shows the sealing material 2406 that has been spread between the face 2416 and the surface 2408 of the workpiece 2402.

Figure 59:
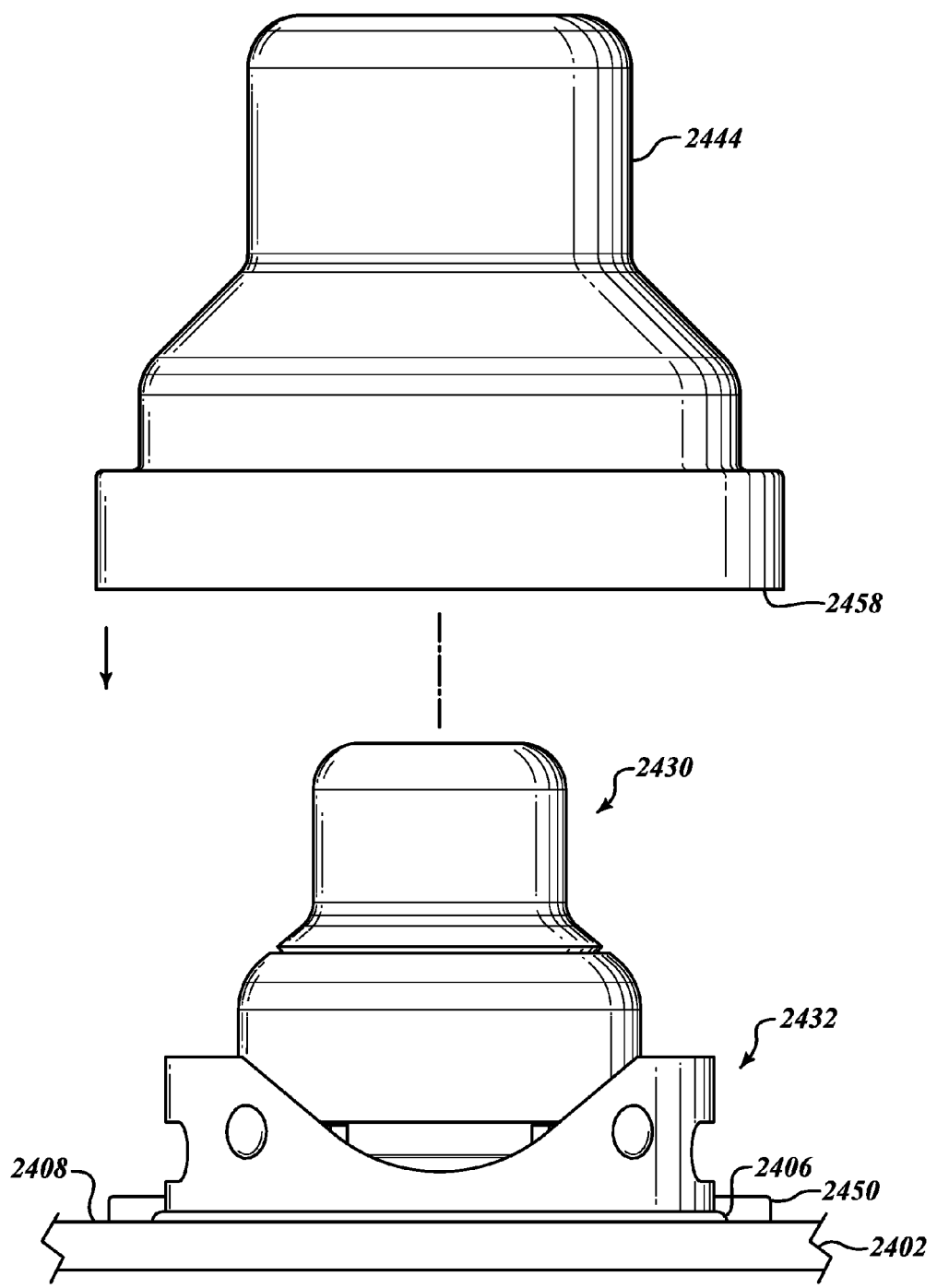
FIG. 59 is a side elevational view of a protective cap ready to be installed over the installed nut plate assembly.

FIG. 59 shows a dome nut assembly 2430 installed in the cage assembly 2432. A protective cap 2444 can be installed to seal the entire installation. In some embodiments, the protective cap 2444 is held against the workpiece 2402 while a sealing material is applied along an interface of the cap 2444 and the workpiece 2402, as discussed in connection with FIGS. 42-44. Alternatively, sealing material can be applied to the workpiece 2402 prior to placing the protective cap 2444 over the installation. As shown in FIG. 59, sealing material 2450 has been applied to the surface 2408 of the workpiece 2402. A cap bottom 2458 can spread the material 2450 as it is pressed against the workpiece 2402.

Figure 60:
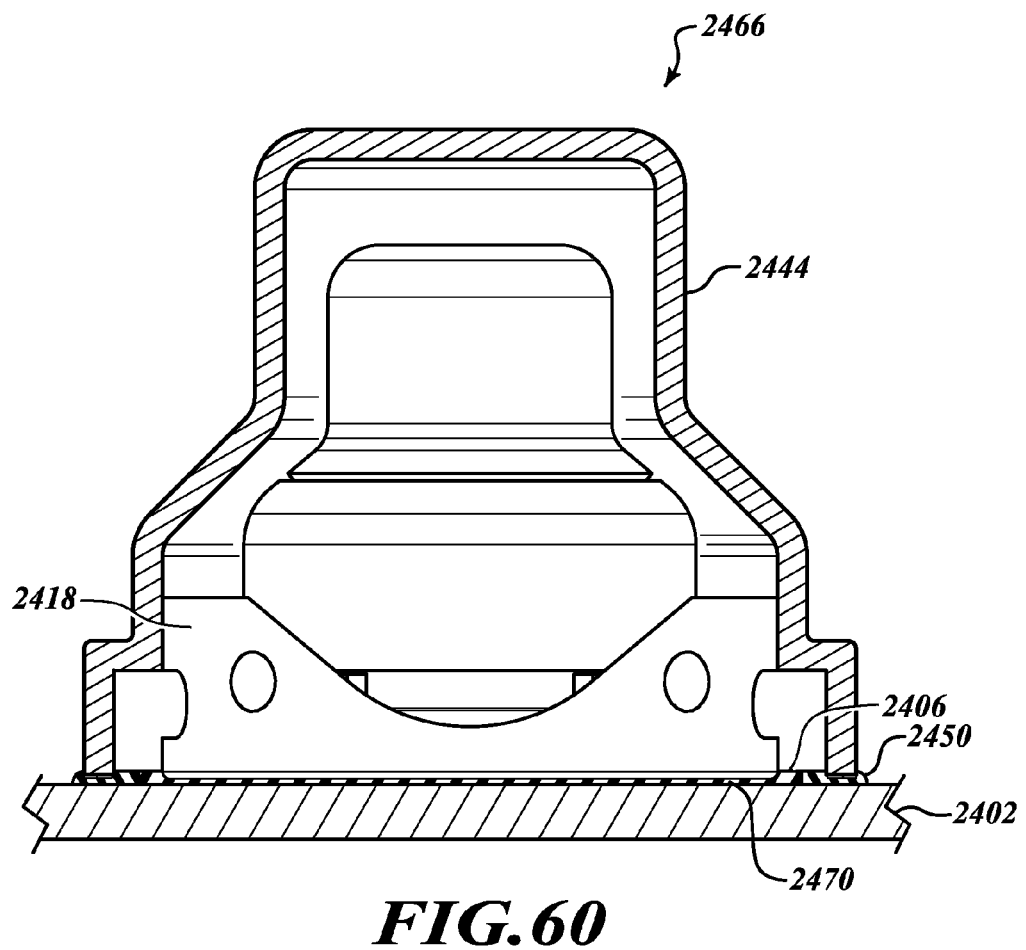
FIG. 60 is a side elevational view of the protective cap sealed to the workpiece.

FIG. 60 shows a final installation 2466. The sealant 2406 forms an inner seal between the cage 2418 and the workpiece 2402 and fills a gap 2470. The sealant 2450 forms an outer seal between the protective cap 2444 and the workpiece 2402.

Sealing materials can be applied between various components of the installation as desired. Additionally, different sealants can be used to provide different types of seals. Various types of coatings can be applied to contact surfaces, including the contact surfaces between nut plate assemblies and the workpiece, to mitigate or avoid corrosion. Coatings can also be applied to contact surfaces between components of the nut plate assemblies. The coatings may comprise, without limitation, one or more anti-corrosion materials, lubricants, sealants, combinations thereof, or the like. Components can also be passivated to provide non-reactive surfaces.

The various embodiments described above can be combined to provide further embodiments. All of the above U.S. patents, patent applications and publications referred to in this specification, as well as U.S. Pat. Nos. 3,566,662; 3,892,121; 4,187,708; 4,423,619; 4,425,780; 4,471,643; 4,524,600; 4,557,033; 4,809,420; 4,885,829; 4,934,170; 5,083,363; 5,096,349; 5,405,228; 5,245,743; 5,103,548; 5,127,254; 5,305,627; 5,341,559; 5,380,136; 5,433,100; 6,183,180; 6,487,767; 6,990,722; and 7,509,829; and U.S. patent application Ser. Nos. 09/603,857; 10/726,809; 10/619,226; 10/633,294; 10/928,641; 11/653,196; 11/445,951; 11/796,545; 12/399,817; 61/082,098; and International Patent Application No. PCT/US2009/051065 are incorporated herein by reference. Aspects can be modified, if necessary or desired, to employ devices, features, elements (e.g., housings, caps, nut elements, sealing assembly, fasteners, bushings, mandrels, and other types of expandable members), and concepts of the various patents, applications, and publications to provide yet further embodiments. For example, the nut plate assemblies disclosed herein can be installed using the mandrels or other installation tools disclosed in the incorporated patents and applications.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. An assembly installed in a hole of a workpiece, the assembly comprising:
   a cage assembly including an expandable portion, the expandable portion dimensioned to fit in the hole of the workpiece and to form an interference fit with the workpiece; and
   a sealed dome nut assembly including
      a cap retainer coupled to the cage assembly and including a retainer body and a retainer sealing member, the retainer body defining a retainer passage, the retainer sealing member compressed between facing parallel surfaces of the retainer body and the cage assembly,
      a dome cap having a closed end, a cap base, and a cap sealing member, the cap base positioned within the cap retainer such that the cap sealing member sealingly engages a portion of the cap retainer surrounding the dome cap,
      a nut element having a first end, a second end, and a nut body, the nut body defining a passage for receiving a fastener extending through the expandable portion of the cage assembly and the second end of the nut element.

2. The assembly of claim 1 wherein the sealed dome nut assembly has a plastic-to-metal interface between the cap retainer and the dome cap.

3. The assembly of claim 1 wherein the dome cap includes a plastic main body having the closed end and the cap base, and the retainer body comprises mostly metal by weight.

4. The assembly of claim 1 wherein the dome cap is a non-metallic cap.

5. The assembly of claim 1 wherein the dome cap comprises mostly plastic by weight.

6. The assembly of claim 1 wherein the dome cap is a unitary molded non-metallic part.

7. The assembly of claim 1 wherein the cap retainer and the cage assembly each comprise mostly metal by weight.

8. The assembly of claim 1 wherein the retainer body includes an open end that has been deformed against the dome cap to hold the dome cap in the cap retainer.

9. The assembly of claim 1 wherein the cap base is positioned in a channel extending about an inner circumference of the cap retainer.

10. The assembly of claim 1 wherein the expandable portion has a first end coupled to the mounting plate, a second end opposing the first end, and a passageway extending between the first end and the second end.

11. The assembly of claim 1, further comprising:
a protective cap configured to surround the cage assembly and sealingly engage the workpiece.

12. The assembly of claim 11, further comprising:
a first sealing material sealing the cage assembly to a portion of the workpiece surrounding the hole; and
a second sealing material sealing the protective cap to the workpiece.

13. An assembly installable in a hole of a workpiece, the assembly comprising:
a cage assembly installable in the hole of the workpiece, the cage assembly having a receiving opening; and
a sealed nut assembly installable in the cage assembly, the sealed nut assembly including
a cap including a plastic main body, the plastic main body having a closed end, a cap base, and a cap sidewall between the closed end and the cap base,
a cap retainer including a retainer base, a retainer sealing member an open end, and a retainer sidewall between the retainer base and the open end and the cap and cap retainer are separate pieces, the retainer base configured to be received and held by the cage assembly whereby the retainer sealing member is compressed between parallel facing surfaces of the cap retainer and the cage assembly, the retainer sidewall dimensioned to surround and sealingly engage the cap base such that the cap sidewall extends out of the open end of the cap retainer, and
a nut element dimensioned to be positioned within the cap retainer such that the nut element is retained by the cap and the cap retainer, the nut element is positioned to receive a component that has been moved through the receiving opening of the cage assembly when the sealed nut assembly is coupled to the cage assembly.

14. The assembly of claim 13 wherein the cap further includes a sealing member positioned in a circumferential groove of the cap base, the cap base is positionable between the open end of the cap retainer and the retainer base such that the sealing member sealingly engages the retainer sidewall.

15. The assembly of claim 13 wherein the plastic main body of the cap comprises a polyamide-imide material.

16. A method of installing a sealed nut plate assembly in a workpiece, the method comprising:
positioning a nut element in a passage of a cap retainer;
moving a base of a cap into the passage of the cap retainer such that the cap and the cap retainer cooperate to retain the nut element;
deforming an open end of the cap retainer to couple the cap and the cap retainer together to form a sealed nut assembly;
positioning a cage assembly in an opening of a workpiece; and
coupling the sealed nut assembly such that a retainer sealing member is compressed between parallel facing surfaces of the cap retainer and the cage assembly to the cage assembly.

17. The method of claim 16 wherein coupling the sealed nut assembly to the cage assembly comprises physically coupling the cap retainer to the cage assembly to sealingly engage the cap retainer and the cage assembly.

18. The method of claim 16 wherein deforming the open end of the cap retainer includes deforming the open end inwardly to prevent axial movement of the base of the cap out of the cap retainer.

19. The method of claim 16, further comprising:
sealing the cage assembly to the workpiece using a flowable sealing material.

* * * * *

UNITED STATES PATENT AND TRADEMARK OFFICE
CERTIFICATE OF CORRECTION

| | | |
|---|---|---|
| PATENT NO. | : 9,114,449 B2 | Page 1 of 1 |
| APPLICATION NO. | : 13/523641 | |
| DATED | : August 25, 2015 | |
| INVENTOR(S) | : Ross et al. | |

It is certified that error appears in the above-identified patent and that said Letters Patent is hereby corrected as shown below:

On the title page

Item (56):
Insert --5,069,586 A 12/1991 Casey--.

"JP 9-99334 A 1/2014" should read, --JP 9-99334 A 4/1997--.

"WO 00/28221 A2 5/2000" should read, --WO 00/028221 A2 5/2000--.

"WO 2009-111745 A2 9/2009" should read, --WO 2009/111745 A2 9/2009--.

Signed and Sealed this
Fifteenth Day of March, 2016

Michelle K. Lee
*Director of the United States Patent and Trademark Office*